(12) United States Patent
Peoples

(10) Patent No.: US 11,753,155 B2
(45) Date of Patent: Sep. 12, 2023

(54) AIRCRAFT PROPULSION AND TORQUE MITIGATION TECHNOLOGIES

(71) Applicant: DeWalch Diversified LP, Houston, TX (US)

(72) Inventor: Daniel Kekoa Peoples, Cypress, TX (US)

(73) Assignee: THRUST DRIVE LLC, Houston, TX (US)

( * ) Notice: Subject to any disclaimer, the term of this patent is extended or adjusted under 35 U.S.C. 154(b) by 317 days.

(21) Appl. No.: 15/733,659

(22) PCT Filed: Mar. 27, 2019

(86) PCT No.: PCT/US2019/024294
§ 371 (c)(1),
(2) Date: Sep. 25, 2020

(87) PCT Pub. No.: WO2019/191240
PCT Pub. Date: Oct. 3, 2019

(65) Prior Publication Data
US 2021/0039776 A1    Feb. 11, 2021

Related U.S. Application Data

(60) Provisional application No. 62/783,293, filed on Dec. 21, 2018, provisional application No. 62/764,840, (Continued)

(51) Int. Cl.
*B64C 27/18* (2006.01)
*B64C 27/82* (2006.01)

(52) U.S. Cl.
CPC ............. *B64C 27/18* (2013.01); *B64C 27/82* (2013.01)

(58) Field of Classification Search
CPC .......... B64C 27/18; B64C 27/82; B64C 27/04; B64C 29/0033; B64C 27/52
See application file for complete search history.

(56) References Cited

U.S. PATENT DOCUMENTS 1,540,754 A * 6/1925 Blackmore ............. B64C 27/08
244/66
2,472,917 A    6/1949 Nicolaeff
(Continued)

FOREIGN PATENT DOCUMENTS

CH          120686       8/1927
DE      202015001341     2/2016
(Continued)

OTHER PUBLICATIONS

International Search Report and Written Opinion dated Sep. 5, 2019, issued in PCT International Patent Application No. PCT/US2019/024294, 8 pages.
(Continued)

*Primary Examiner* — Tien Q Dinh
*Assistant Examiner* — Katherine June Bolek
(74) *Attorney, Agent, or Firm* — Grossman, Tucker, Perreault and Pfleger, PLLC

(57) ABSTRACT

Aircraft propulsion and torque mitigation technologies for aircraft are described. In embodiments, the disclosed technologies enable the provision of rotational torque for rotating the rotor blades of a vertical lift aircraft, while mitigating or even eliminating the need for counter torque methods and apparatuses such as tail rotors and counter rotating blades.

17 Claims, 51 Drawing Sheets

Related U.S. Application Data filed on Aug. 16, 2018, provisional application No. 62/702,618, filed on Jul. 24, 2018, provisional application No. 62/649,334, filed on Mar. 28, 2018.

(56) References Cited

U.S. PATENT DOCUMENTS

| | | | | |
|---|---|---|---|---|
| 2,585,468 | A * | 2/1952 | Vittorio | B64C 27/18 416/22 |
| 2,689,615 | A * | 9/1954 | Fletcher | B64C 27/18 416/123 |
| 2,739,769 | A * | 3/1956 | Rogers | B64C 27/12 244/17.27 |
| 2,761,635 | A | 9/1956 | Hiller et al. | |
| 3,059,877 | A * | 10/1962 | Lee | B64C 27/82 244/17.19 |
| 3,163,378 | A | 12/1964 | Balke et al. | |
| 3,195,649 | A | 7/1965 | Nichols et al. | |
| 3,669,564 | A | 6/1972 | Garfinkle | |
| 6,655,915 | B2 * | 12/2003 | Gmirya | B64C 27/28 416/88 |
| 7,871,032 | B2 | 1/2011 | Zhao et al. | |
| 8,764,397 | B1 | 7/2014 | Wittig | |
| 2004/0217229 | A1 * | 11/2004 | Arlton | B64C 27/12 244/17.11 |
| 2010/0252673 | A1 | 10/2010 | Tourn | |
| 2017/0043867 | A1 | 2/2017 | Ulrich et al. | |
| 2018/0022450 | A1 * | 1/2018 | Tourn | B64C 27/12 244/17.19 |
| 2019/0210717 | A1 * | 7/2019 | Lauder | B64C 27/32 |

FOREIGN PATENT DOCUMENTS

| | | |
|---|---|---|
| GB | 1041116 | 9/1966 |
| JP | H09150797 A | 6/1997 |
| JP | 2016172556 A | 9/2016 |

OTHER PUBLICATIONS

Extended Search Report in related European Application No. 19776955.7 dated Dec. 11, 2021.

Office Action from related Japanese Appln. No. 2021-502713 dated Jan. 31, 2023. English translation attached. 9 pages.

International Preliminary Report on Patentability from corresponding PCT Appln. No. PCT/US2019/024294, dated Sep. 29, 2020. 5 pages.

* cited by examiner

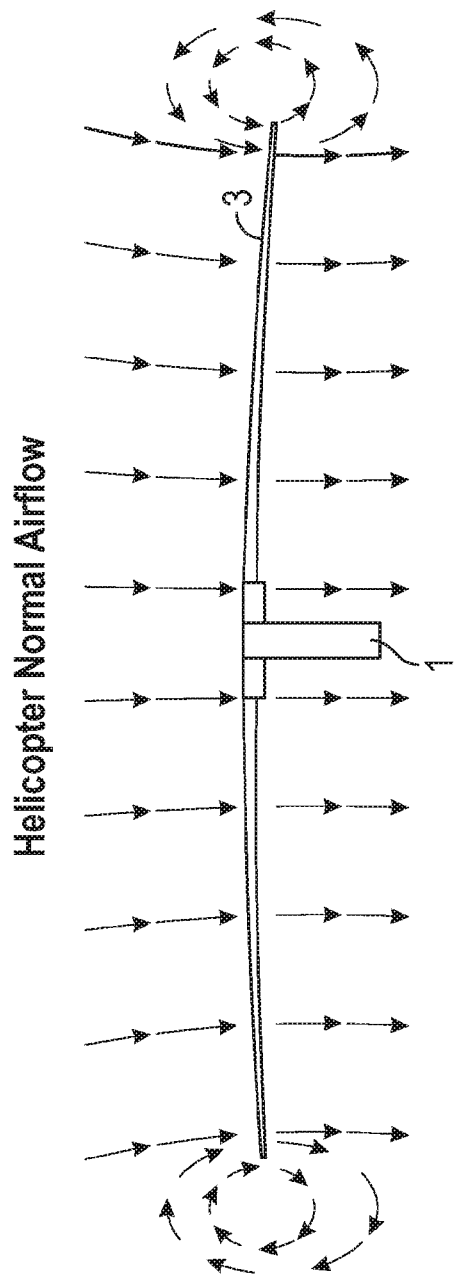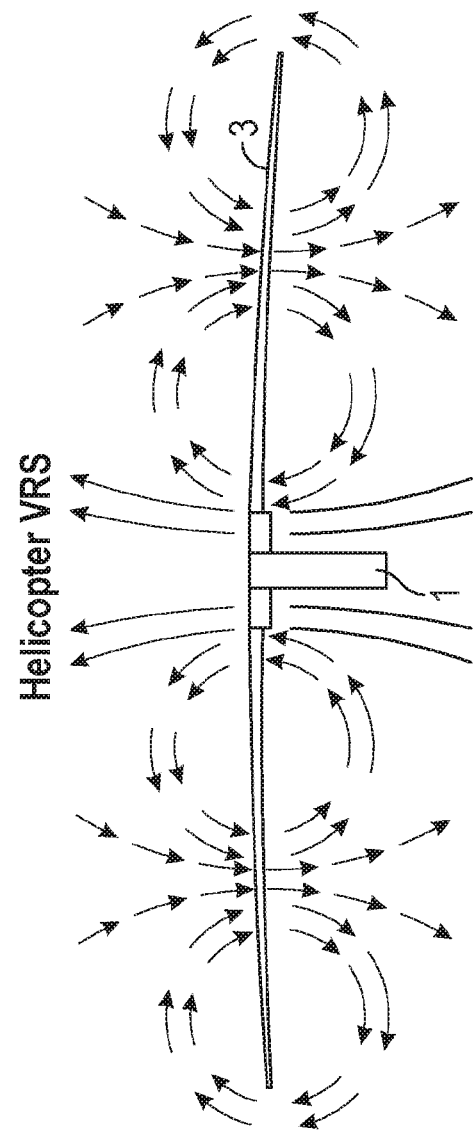
FIG. 31 Helicopter Normal Airflow
FIG. 32 Helicopter VRS

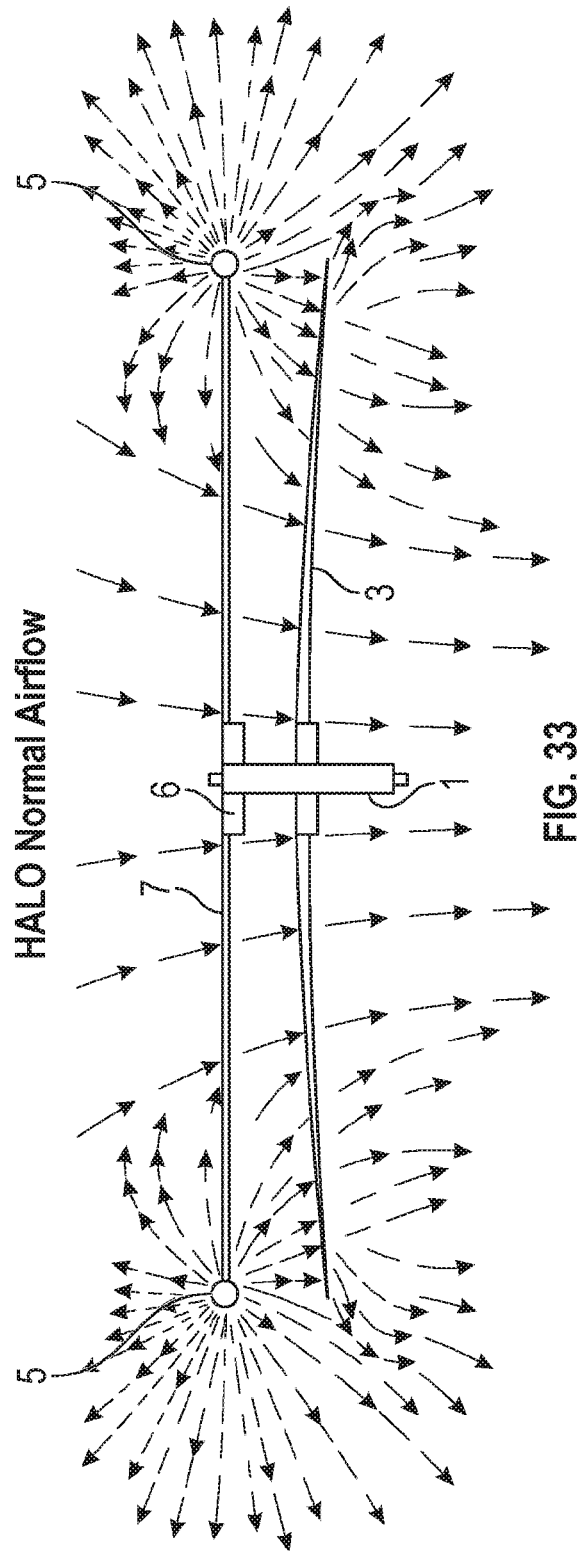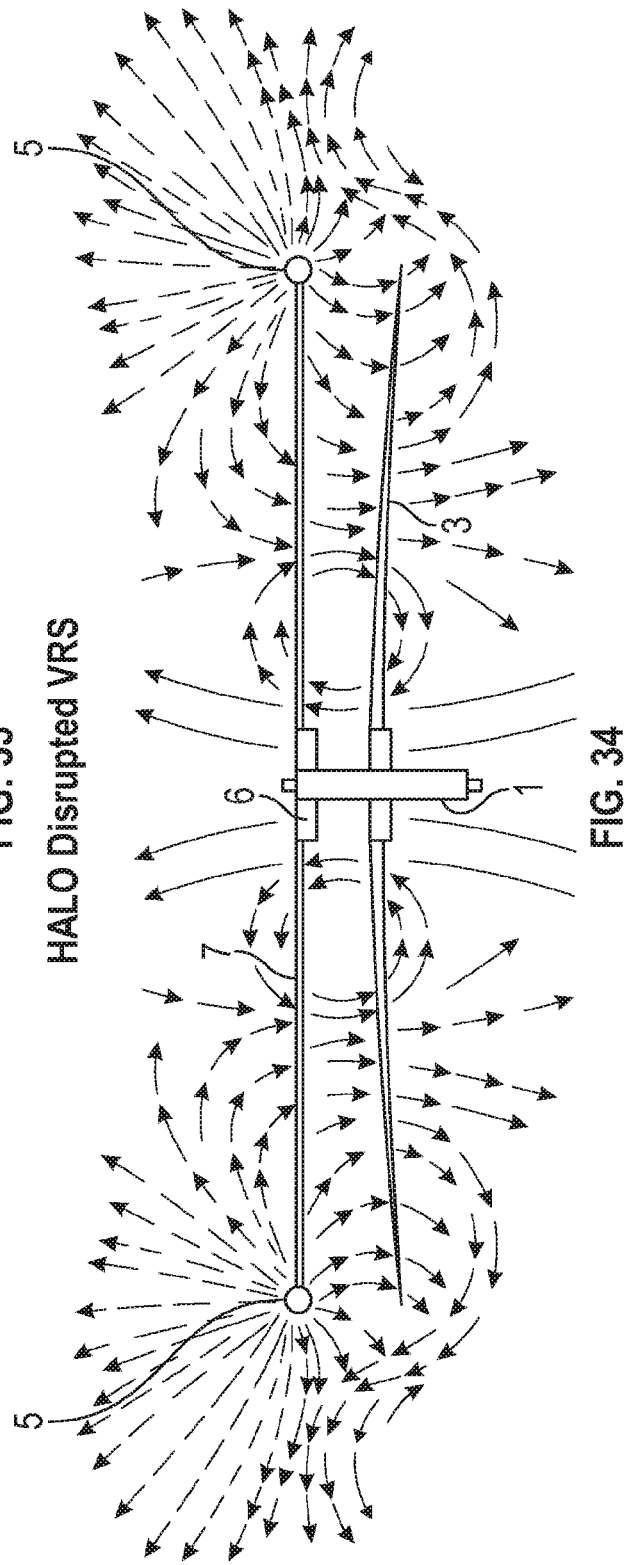

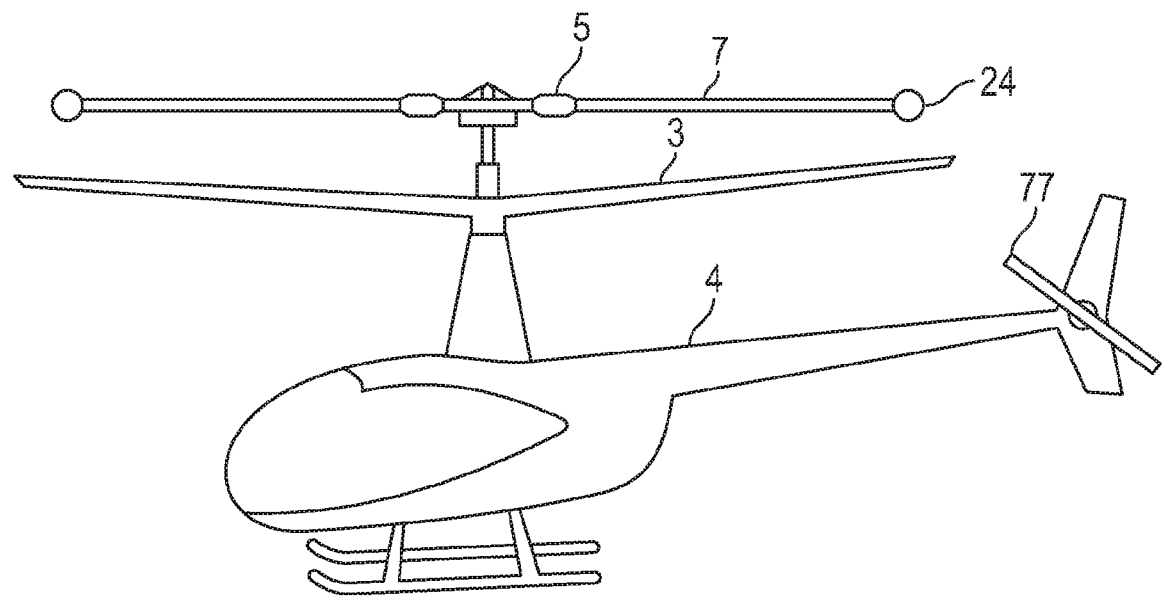
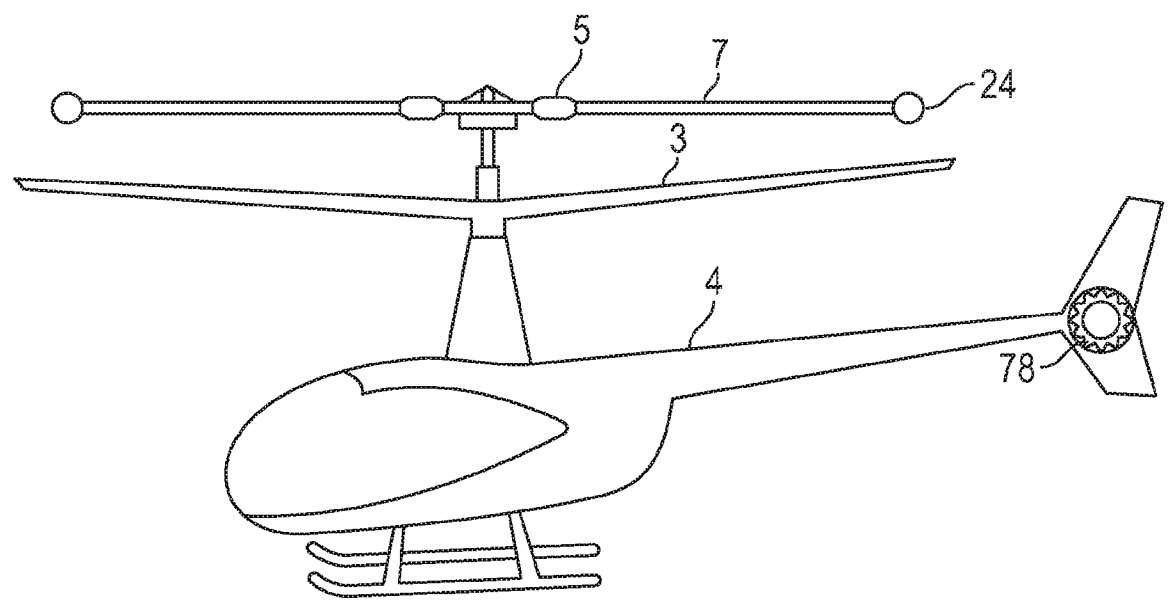
FIG. 40

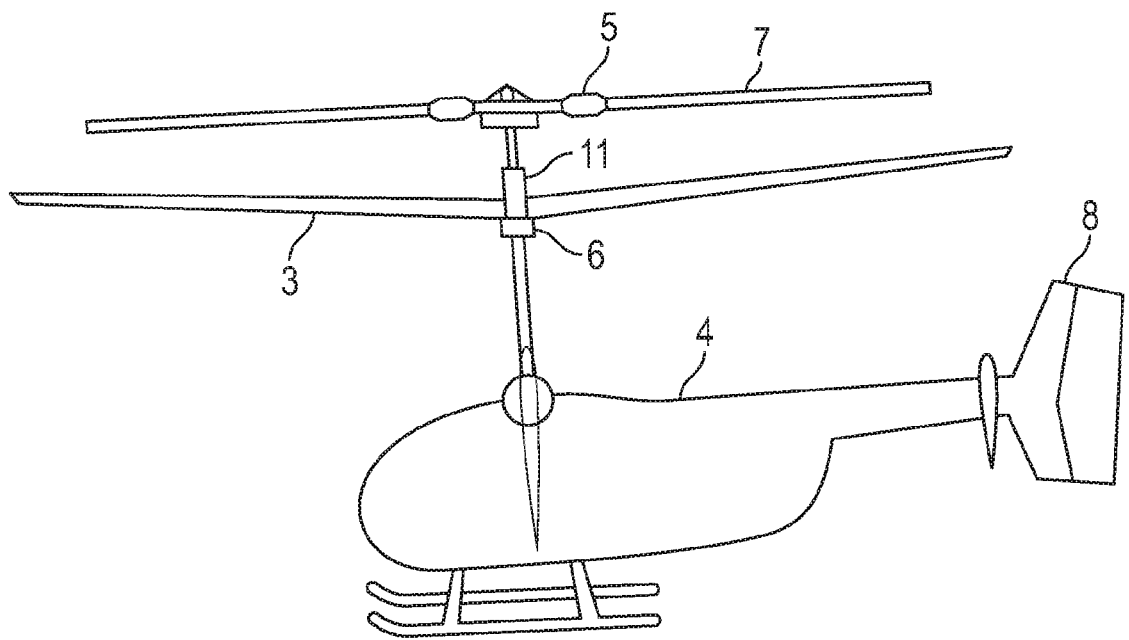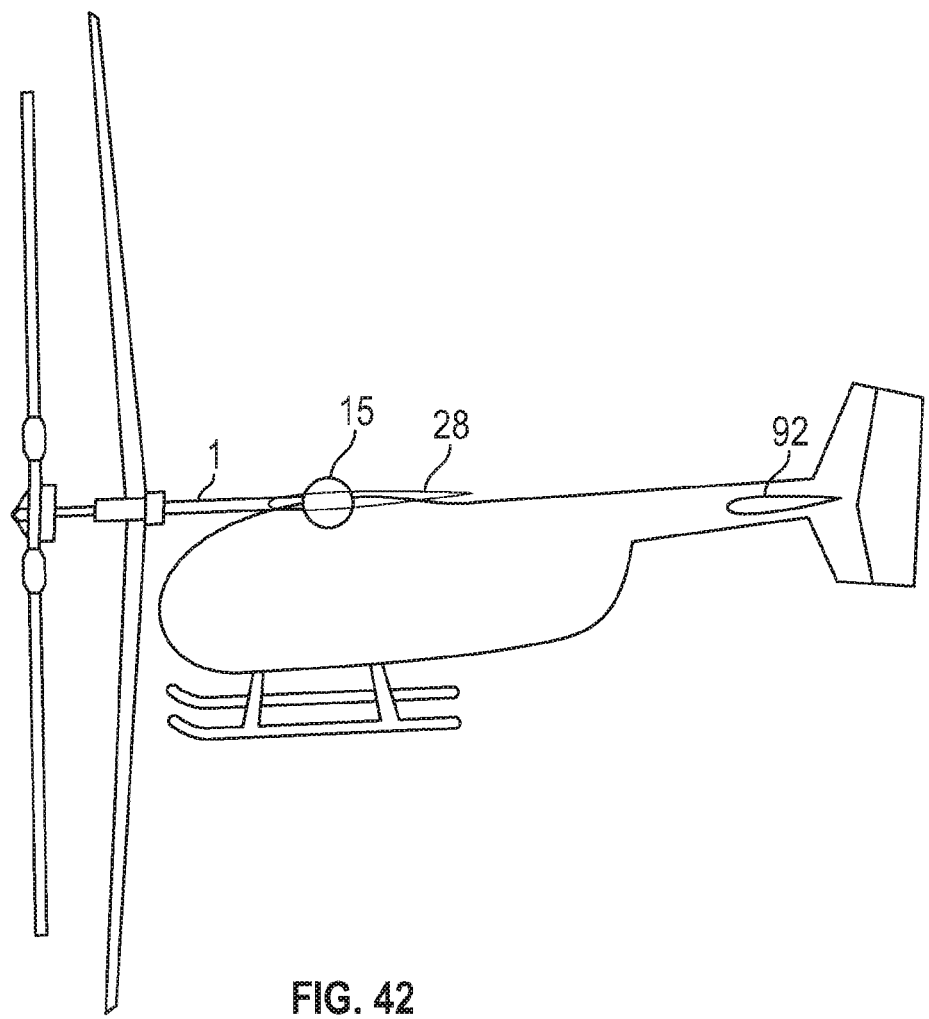
FIG. 42

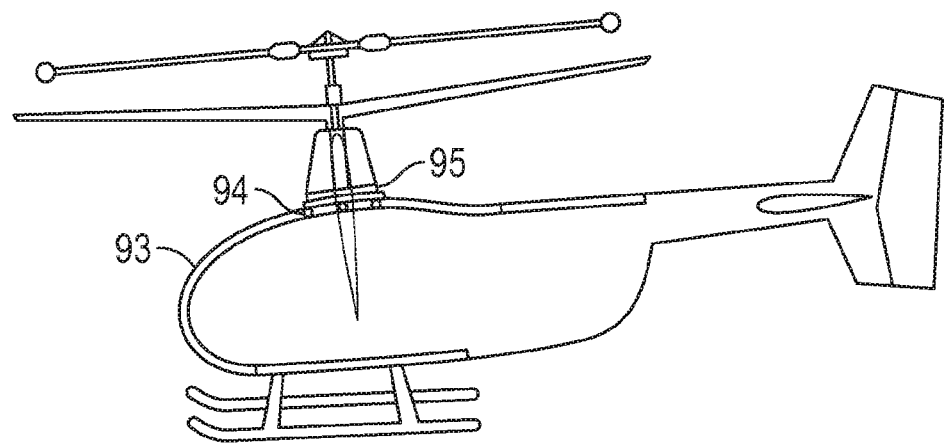
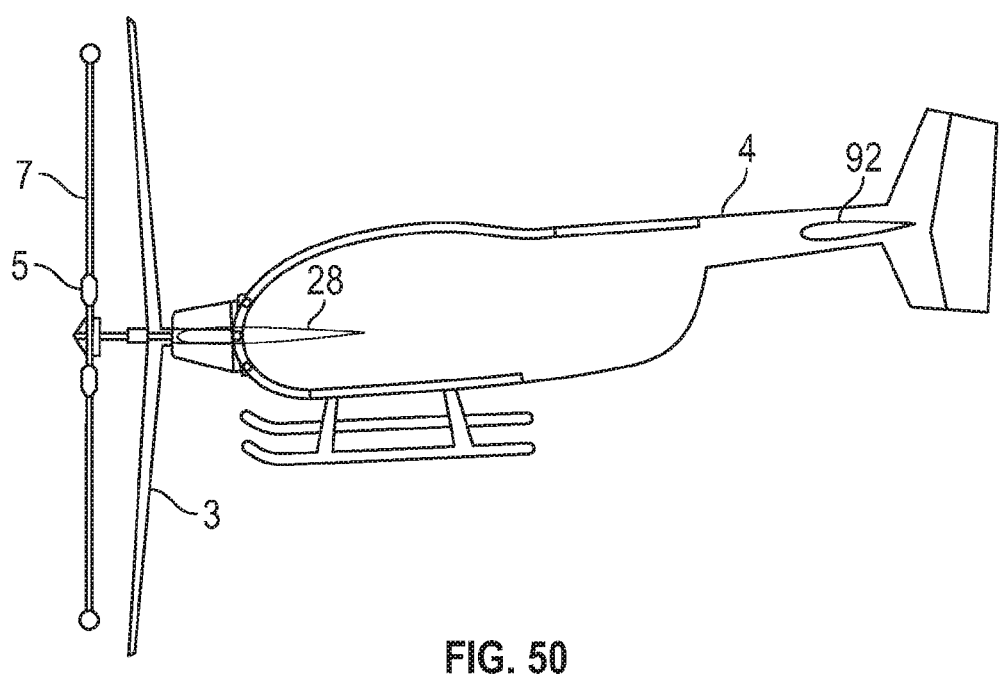
FIG. 50

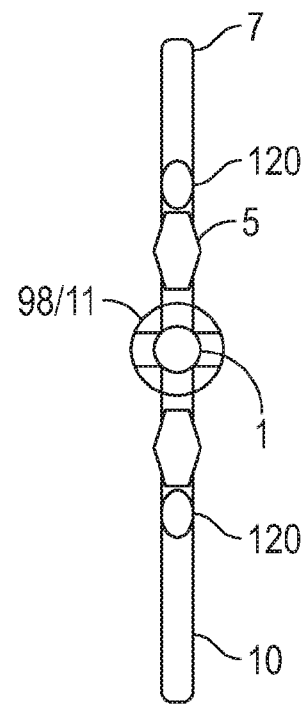
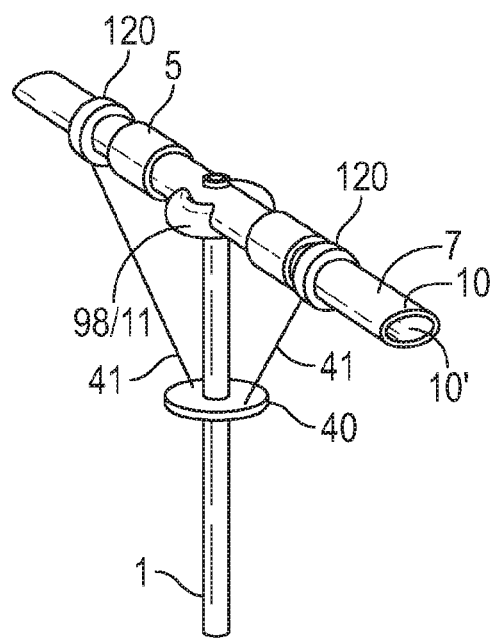
FIG. 61

AIRCRAFT PROPULSION AND TORQUE MITIGATION TECHNOLOGIES

FIELD

The present disclosure relates generally to aircraft propulsion and torque mitigation technologies for aircraft, and particularly for vertical lift aircraft. More particularly, the present disclosure relates to technologies for providing rotational torque for rotating the rotor blades of an aircraft while mitigating or even eliminating the need for counter torque methods and apparatuses such as tail rotors and counter rotating blades.

BACKGROUND

Various methods exist for causing rotor blades of a vertical lift aircraft, such as a helicopter, to rotate. One approach utilizes a rotor shaft connected to rotor blades, where the rotor shaft is mechanically connected to the engine and the fuselage of the aircraft. In that approach when the engine is operational the torque created to rotate the rotor blades also creates an opposing torque on the body (fuselage) of the aircraft in the opposite direction. If not counteracted, the opposing torque can cause the body of the aircraft to rotate around the axis of the rotor shaft, potentially causing the aircraft to spin out of control. To that end, counter-torque mechanisms have been developed to mitigate or eliminating the opposing torque imposed on the body of the aircraft, so as to facilitate controlled flight.

One method for counteracting torque is to fit an aircraft with a tail rotor that produces torque in a direction opposite torque that is produced by rotation of a main rotor by an engine that is attached to the fuselage of an aircraft. The tail rotor and its related assembly often include a linkage to the main engine, a gearbox, tail boom drive shaft, gearing at the tail rotor, the tail rotor itself, and related structural members. Such components add considerable weight, power consumption, complexity, initial manufacturing cost, and ongoing maintenance cost to the aircraft. If the tail rotor (and/or related components) has mechanical failure, is damaged, or is lost, the aircraft often spins out of control and crashes. Use of a tail rotor also imparts design, acoustic, and operational challenges to the aircraft, such as but not limited to increased weight, increased noise production, increased vibration, increased landing and increased parking footprint. The tail rotor, which spins in operation, also presents a safety hazard to individuals outside of the aircraft.

Another method for counteracting torque in a vertical lift aircraft involves fitting an aircraft with rotor blades that rotate in a counter rotating direction. Such counter rotating rotor blades can be coaxial with the main rotor wings or on an axis differing from the main rotor wings. Yet another method for counteracting torque utilizes a plurality of rotating propellers on a vertical lift aircraft. Like tail rotors, such methods come at the expense of added complexity, loss of efficiency, increased weight, and added maintenance and manufacturing cost to the aircraft. Failure of the counter rotating wing elements or propellers can compromise or eliminate the ability to auto rotate, and may lead to loss of control of the aircraft. A plurality of rotating propeller systems are also often less efficient than a single rotor vertical lift system and may include electrical engines powered by presently available battery technology, which may shorten flight time due to battery energy density limitations and added weight as compared to using liquid fuel as an energy source.

Efforts have been made in the past to develop technologies that eliminate the need for a counter torque mechanism on a vertical lift aircraft. Such efforts have led to the development of two methods for eliminating a counter torque mechanism, namely: (1) engines mounted on the tips of the rotor wings themselves as disclosed in U.S. Pat. No. 2,761,635 dated Sep. 4, 1956 to S. Heller, Jr. et al; and (2) tubes or ducts along or inside the rotor blades themselves whereby thrust from an engine is delivered through such tubes or ducts to the outer extremities of the rotor blades causing them to rotate. Both of those methods provide for rotation of the rotor blades without producing torque on the body of the aircraft by using the rotor blades themselves as a means of creating the torque necessary for flight, i.e., by utilizing thrust apparatus on, in, directly attached to and in the same plane as the rotor blades. However, those methods come with various challenges, such as added weight and instability to the main rotor blades of the aircraft, increased parasitic drag, and excessive noise. The first method also compromises the ability of the aircraft to auto rotate. Consequently those two methods have not been widely used.

Accordingly, in the field of vertical lift aircraft, there remains a need for other methods and apparatus that reduces or eliminates torque transfer to the body of the aircraft by the engine thus mitigating or even eliminating the need for the use of a counter torque mechanism. The technologies of the present disclosure address that need, and in embodiments provide an effective mechanism for reducing or eliminating torque transfer and its related challenges while maintaining the ability of the aircraft to auto rotate.

BRIEF DESCRIPTION OF DRAWINGS

Features and advantages of embodiments of the claimed subject matter will become apparent as the following Detailed Description proceeds, and upon reference to the Drawings, wherein like numerals depict like parts, and in which:

FIG. 31 illustrates conventional helicopter airflow under normal conditions;

FIG. 32 illustrates conventional helicopter airflow in vortex ring state;

FIG. 33 illustrates an embodiment of present invention showing airflow under normal conditions;

FIG. 34 illustrates an embodiment of present invention showing disrupted vortex ring state;

FIG. 40 is a schematic view of an aircraft consistent with the present disclosure of the current disclosure that utilizes either motorized tail blades 77 or tail fan 78 assemblies for directional (yaw) control;

FIG. 42 is a schematic side view of illustrating one example of an aircraft including propulsion elements that may be moved between a vertical orientation and a horizontal orientation, consistent with the present disclosure;

FIG. 50 illustrates an embodiment of an aircraft propulsion system including a sliding rail system, consistent with the present disclosure;

FIG. 61 depicts top and side views of one example of a propulsion system consistent with the present disclosure, wherein the propulsion system includes a thrust support structure configured to function as a rotor blade for an aircraft;

DETAILED DESCRIPTION

Figure 1:
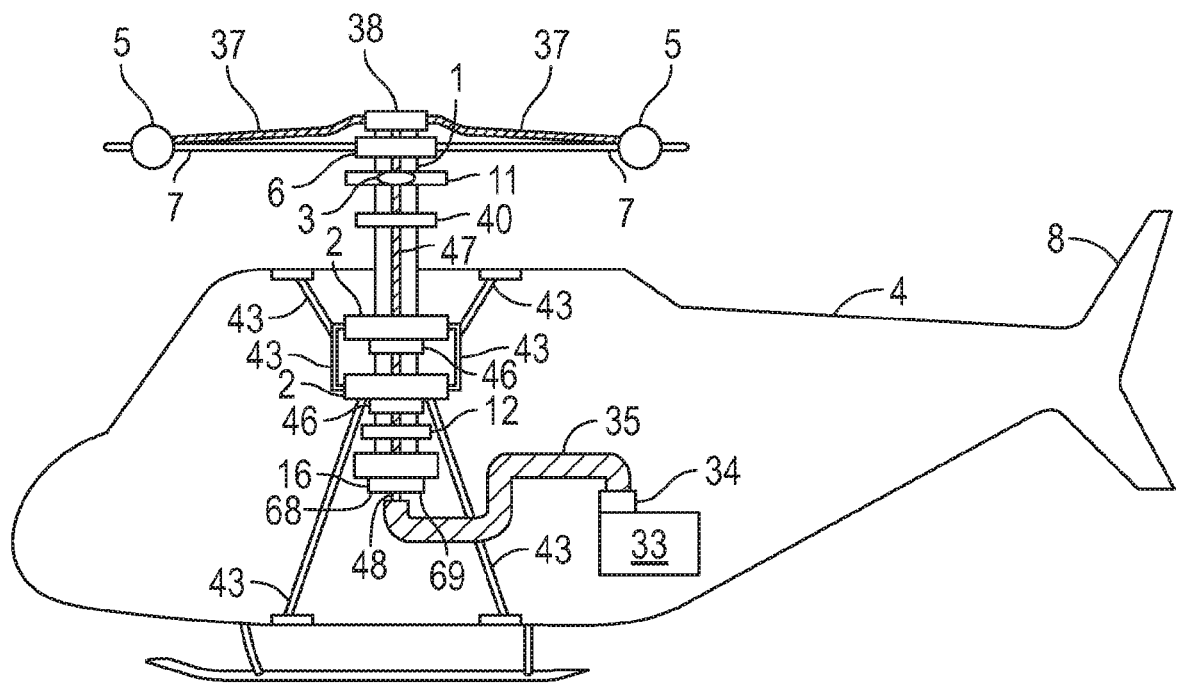
FIG. 1 is a schematic side view of an embodiment of the present disclosure omitting some elements of a conventional helicopter from the view for clarity and showing an overview of how rotational torque is isolated from fuselage and where rotor blades are below the rotary thrust support structure.

Aspects of the present disclosure relate to systems, apparatus, and methods for reducing or eliminating torque transfer in an aircraft, such as a vertical lift aircraft. In embodiments, aspects of the present disclosure include methods and apparatus where the transmission of torque produced by one or more engine(s) 5 to a fuselage 4 of an aircraft is reduced or even eliminated, e.g., by one or more support bearings 2. In some instances the amount of torque produced by one or more engine(s) 5 does not exceed the ability of support bearings 2 of isolating the engine(s) 5, rotor shaft 1, and its associated components from the fuselage 4. Mitigation/elimination of torque transmission to the fuselage 4 of the aircraft reduces or eliminates the need for counter torque mechanisms such as tail rotors or counter rotating blades. Notably, the technologies described herein maintain the ability of the aircraft to auto rotate in the event of loss of rotational thrust from the engine(s) 5.

The body of the aircraft may include or be coupled to one or more transportable units such as, but not limited to for example: fuselage 4, a cargo box, a camera and surveillance package, ordnance, aircraft superstructure, and aeronautical and control apparatus. In one embodiment, the technologies of the present disclosure employ engine(s) 5 which can provide thrust to thrust support structure 7. Thrust support structure 7 is not in the same plane as the rotor blades 3, but is co-axial with and extend to either side of rotor shaft 1. In response to thrust applied by engine(s) 5, thrust support structure 7 rotates around the axis of rotor shaft 1. Such rotation causes the clutch 6 (which is attached to thrust support structure 7) to engage rotor shaft 1 and causes rotor shaft 1 to rotate. Rotation of rotor shaft 1 in turn causes rotor hub 11 and attached rotor blades 3 to rotate.

When thrust support structure 7 is not receiving thrust from engine(s) 5, clutch 6 disengages thrust support structure 7 from rotor shaft 1. In that condition the rotor shaft 1, rotor hub 11, and rotor blades 3 can feely rotate. In embodiments rotor shaft 1 is attached to fuselage 4 only by one or a plurality of support bearings 2 that always allows rotor shaft 1 (and the attached rotor blades 3) to freely rotate with respect to the fuselage 4. In some embodiments the technologies described herein include tubes/ducts that are configured to provide air flow (e.g., generated by engine(s) 5) to the outer extremities of the thrust support structure 7. Such tubes/ducts may be included in, coupled to, or otherwise provide airflow to the outside or inside of the thrust support structure 7, e.g., via one or more channels or cavities inside or outside of the thrust support structure 7. In embodiments, an end of the tube(s)/duct(s) is disposed at an exit from the extremities of thrust support structure 7. Air flow through the tube(s)/duct(s) may therefore cause rotation of the thrust support structure 7 around the axis of the rotor shaft 1. Rotation of the thrust support structure 7 in turn causes clutch 6 to engage rotor shaft 1, thus causing rotation of rotor hub 11 and attached rotor blades 3. As before, when engine 5 is not providing thrust to the thrust support structure 7 the clutch 6 disengages the thrust support structure 7 from the rotor shaft 1, allowing the rotor shaft 1 and the attached rotor blades 3 to freely auto rotate.

Support bearing 2 generally functions to isolate torque produced by engine(s) 5 and/or rotation of the above described elements from the fuselage 4. In embodiments the torque produced by the engine 5 and or the rotation of the above described components does not exceed the ability of the support bearing 2 to isolate such torque from the fuselage 4. Due to such isolation, counter torque apparatus is not required and may be eliminated from the aircraft design. More specifically, the technologies described herein can eliminate the need for counter torque apparatus such as tail rotors or counter rotating wings and all their associated cost, power consumption, weight, maintenance, and safety problems.

In still further embodiments, the technologies described herein utilize engine(s) 5 that are positioned at various locations relative to thrust support structure 7. Moreover, the thrust support structure 7 can be positioned at various locations relative to other components of the aircraft. For example, thrust support structure 7 may be co-axial with rotor blades 3 and perpendicular to rotor shaft 1, and may be placed above, below, or above and below rotor blades 3. It should be noted that there can me more than one thrust support structure 7, either all on the same plane or on different planes coaxial to the rotor shaft 1. For example, in embodiments a first thrust support structure 7 may be disposed coaxial with and above the rotor blades 3, and a second thrust support structure 7 may be disposed coaxial with and below the rotors blade 3, with the first and second thrust support structures 7 each coupled to one or more engine(s) 5.

The technologies of the present disclosure can provide numerous benefits, particularly when compared with a counter torque rotation solution. Such benefits include but are not limited to: (1) elimination of anti-torque mechanisms like tail rotors and counter rotating wings; (2) the aircraft does not have to have a tail at all as yaw control can be provided by a yaw control device 12, or similar device which performs the same function such that yaw control device 12 imposes rotational force on the fuselage for directional control and stabilization, or yaw control can be provided by a tail rudder 8, or yaw control can be provided by a combination of a tail rudder 8 and a yaw control device 12; (3) the risk of boom strike can be eliminated because there is no longer a requirement for the tail rotor and its extended tail boom; (4) deliverable payload for like power capacity may be increased due to elimination of the weight and drag of the tail rotor, boom, gearbox and related structural components; (5) tail rotor noise is eliminated since no tail rotor required; (6) disk tilt is eliminated as the aircraft can take off, land, and hover without the need to offset tail rotor thrust with cyclic trim because the tail rotor is eliminated; (7) auto rotation performance may be improved due to the elimination of the need to drive a tail rotor or a second set of rotor blades and/or due to the added inertia of the thrust support structure 7 and its appendages; (8) manufacturing and maintenance costs may be reduced; (9) dangers associated with a rotating tail rotor can be eliminated; (10) danger associated with loss of control due to loss, failure, or damage to tail rotor and its structural and operational components can be reduced or even eliminated; (11) takeoff, landing, and parking footprint may be reduced; (12) the ability to utilize presently available ground facilities, already trained pilots and pilot training procedures, federal, state, and local governing rules, existing manufacturing and testing techniques with the added benefit of increased fuselage capacity and increased safety. (13) easy adaptability of the technologies for use with a variety of aircraft sizes from smaller drones to large civilian and military aircraft; (14) the ability to utilize a wide variety of engines; (15) enhanced auto rotation capability of present invention provides huge safety advantage over the numerous multi rotor designs being proposed by others; (16) vortex ring state mitigation due to the thrust line of the engine(s) 5 creates a high velocity flow of air that fans out horizontally above the rotor blades 3, resulting in a low pressure area being formed above the rotor blades 3 further improving lift, etc. Such advantages are enumerated for the sake of example, and other advantages will be apparent to those skilled in the art.

Figure 2:
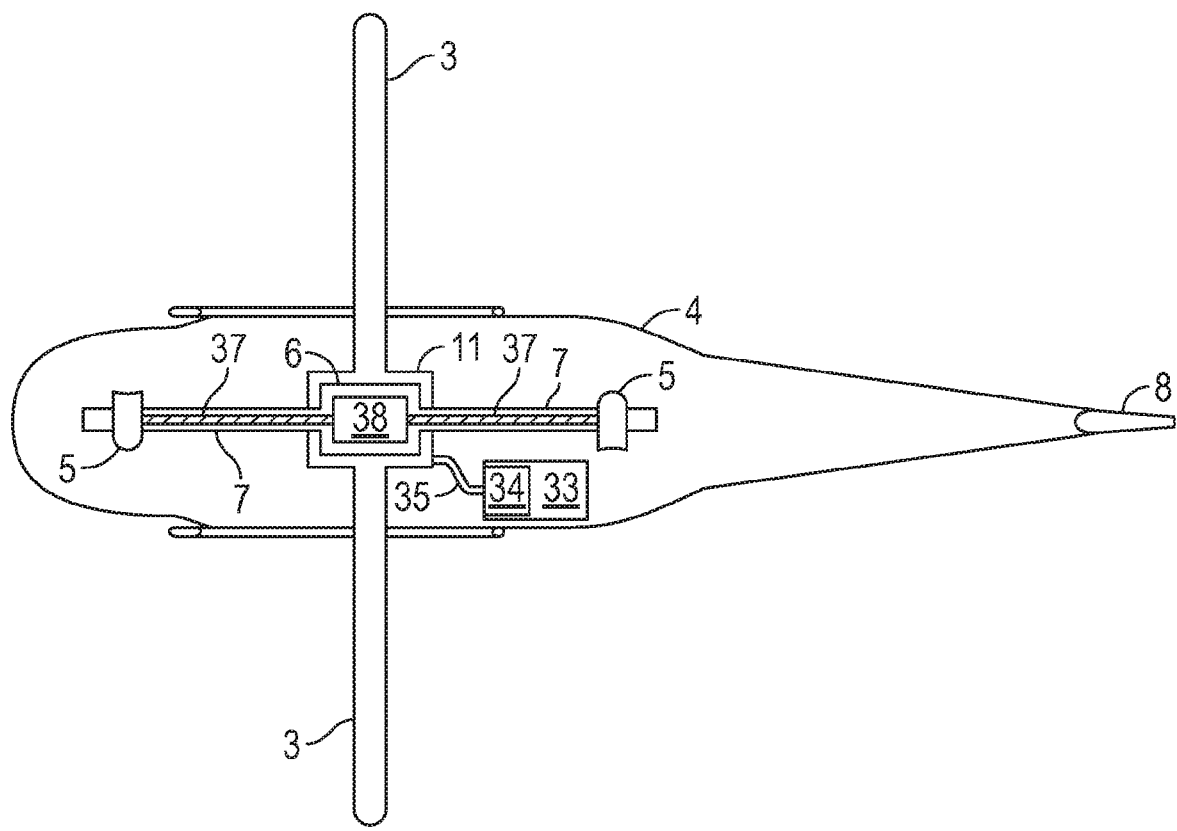
FIG. 2 is a top plan view of FIG. 1.
Figure 3:
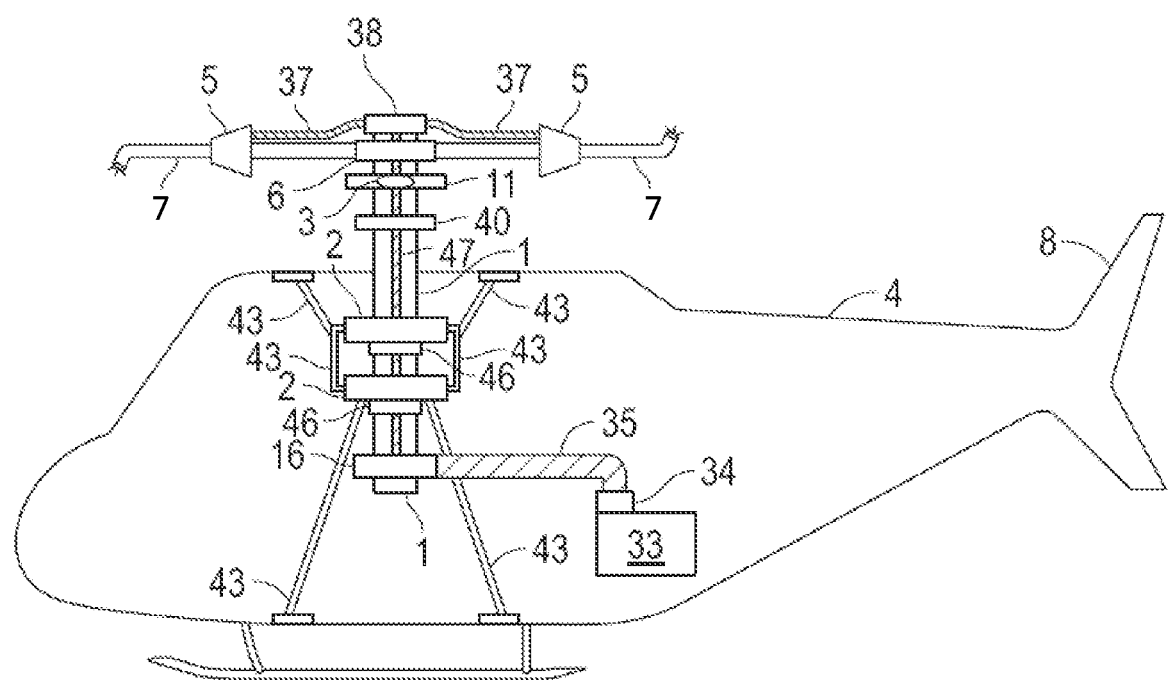
FIG. 3 is a side schematic view of an embodiment of the present disclosure showing thrust delivery along passages to the outer extremities of a thrust support structure.
Figure 4:
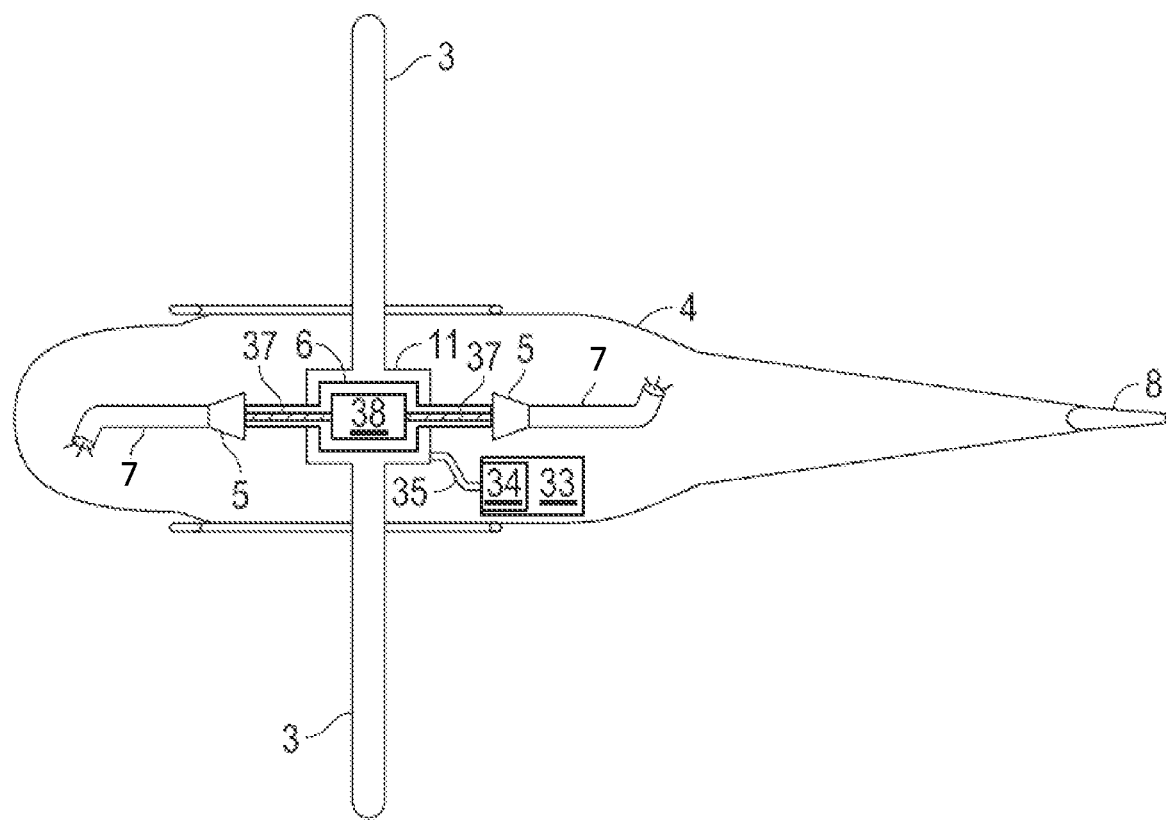
FIG. 4 is a top view of FIG. 3.
Figure 5:
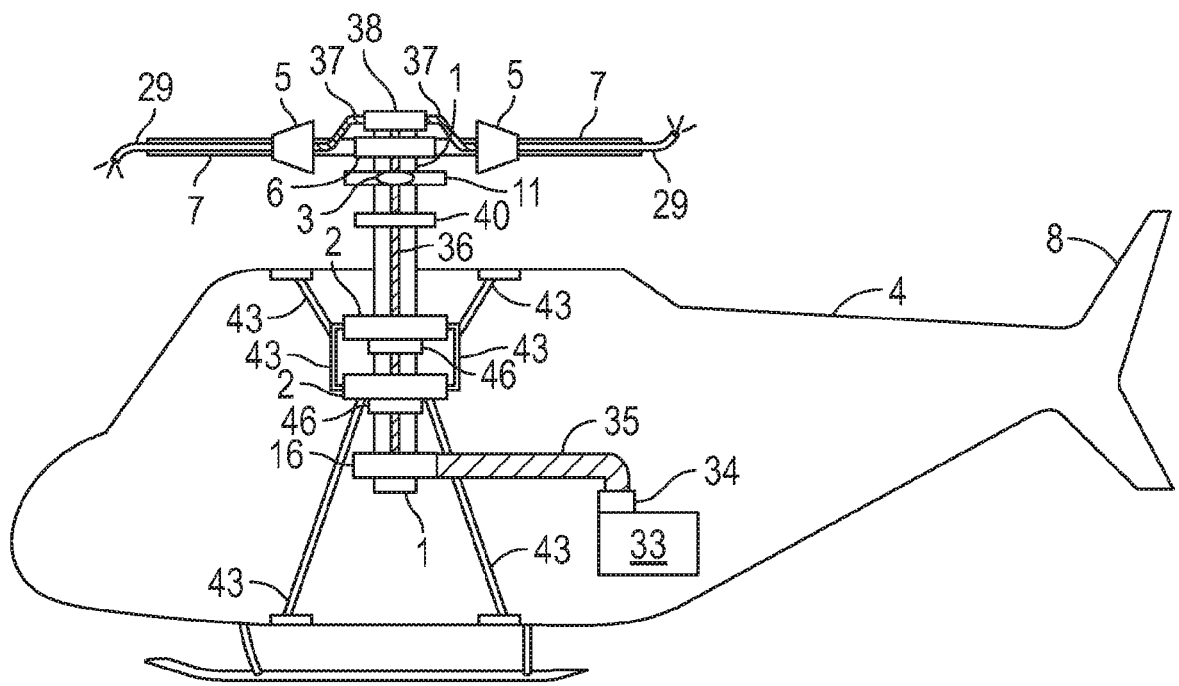
FIG. 5 is a schematic side view of engine(s) and thrust support structure mounted above rotor blades and where engines deliver thrust longitudinally along thrust support structure.
Figure 6:
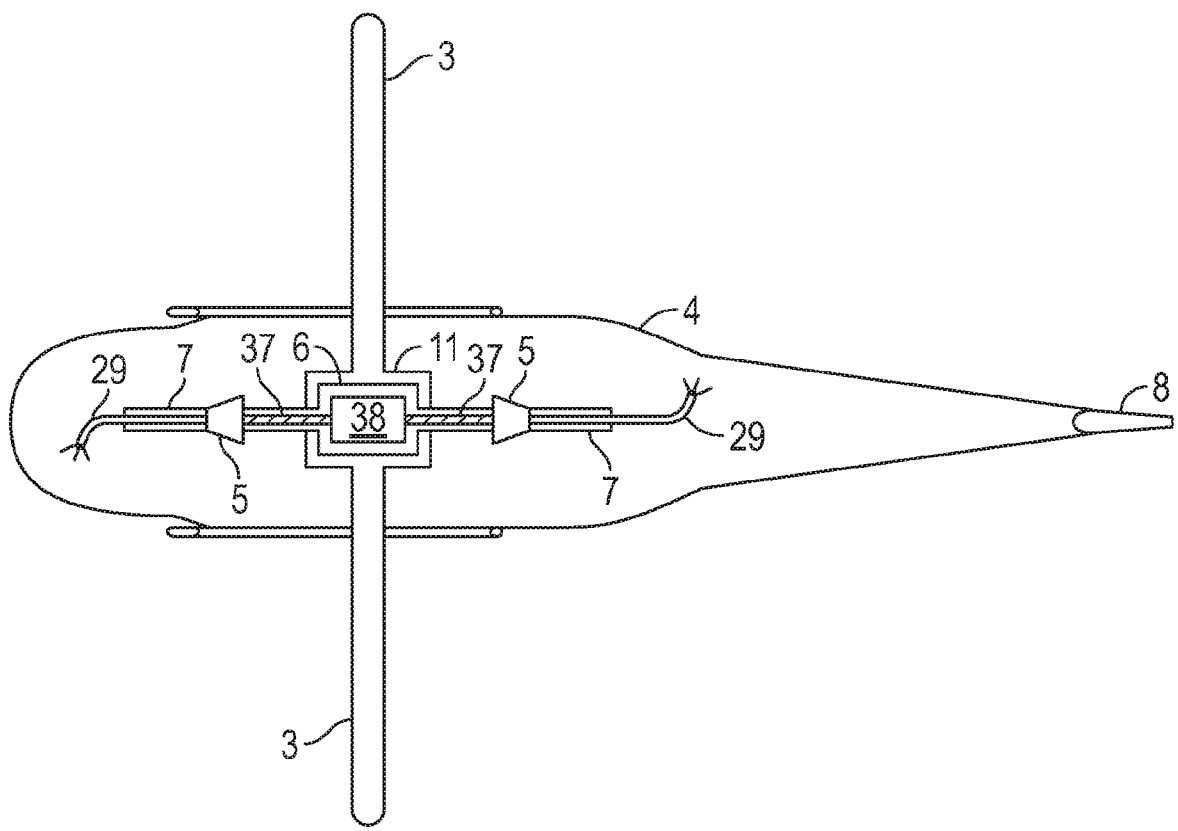
FIG. 6 is a top view of FIG. 5.
Figure 7:
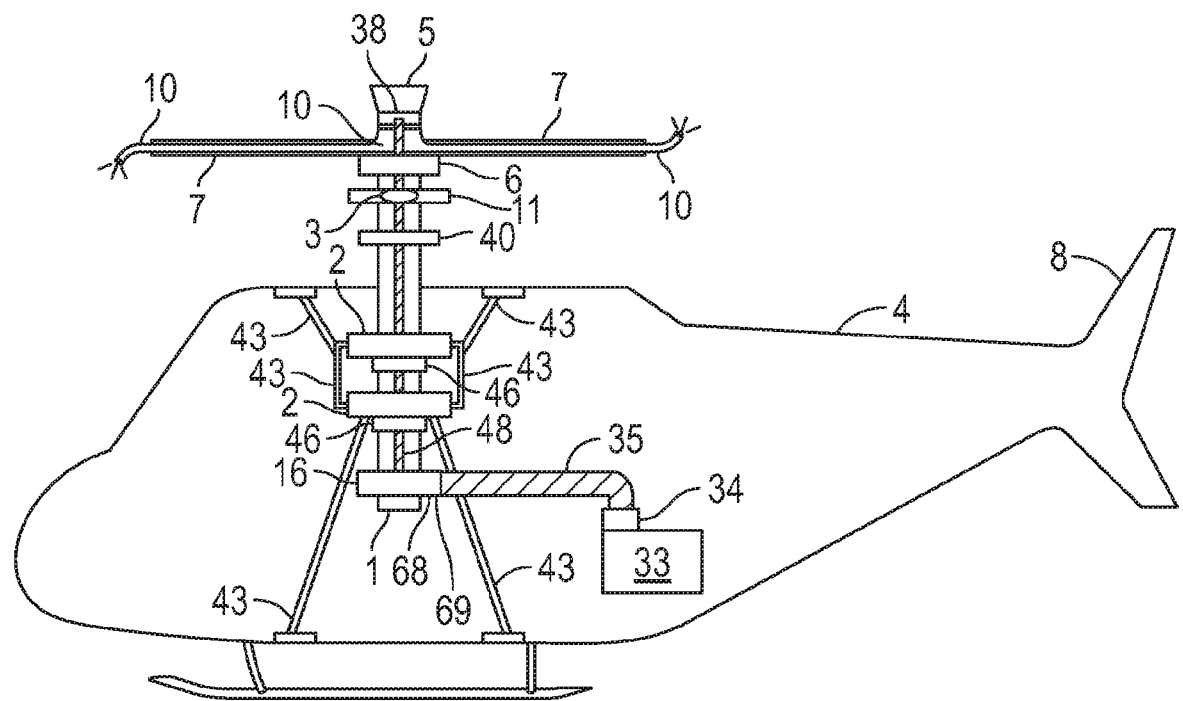
FIG. 7 is a schematic side view showing engine(s) that produce thrust mounted perpendicular to and on top of thrust support structure and delivering such thrust to the outer extremities of such thrust support structure.
Figure 8:
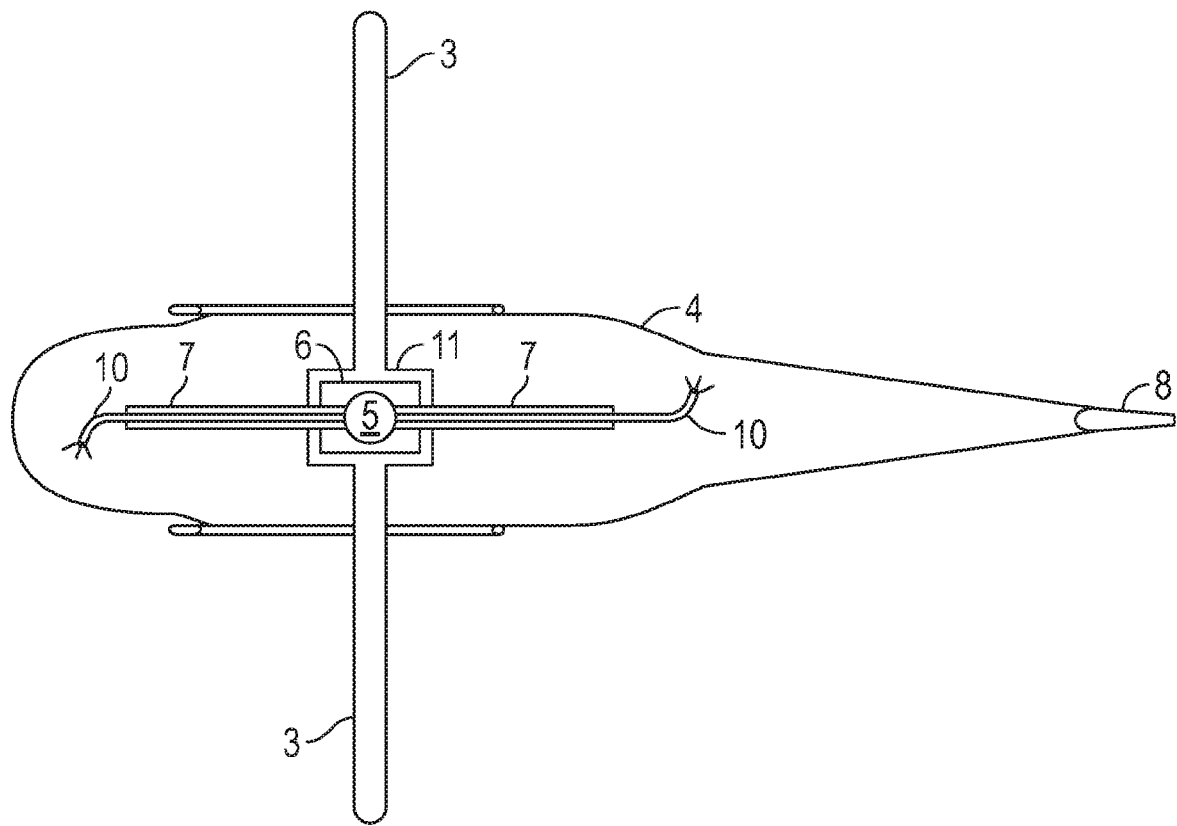
FIG. 8 is a top view of FIG. 7.
Figure 9:
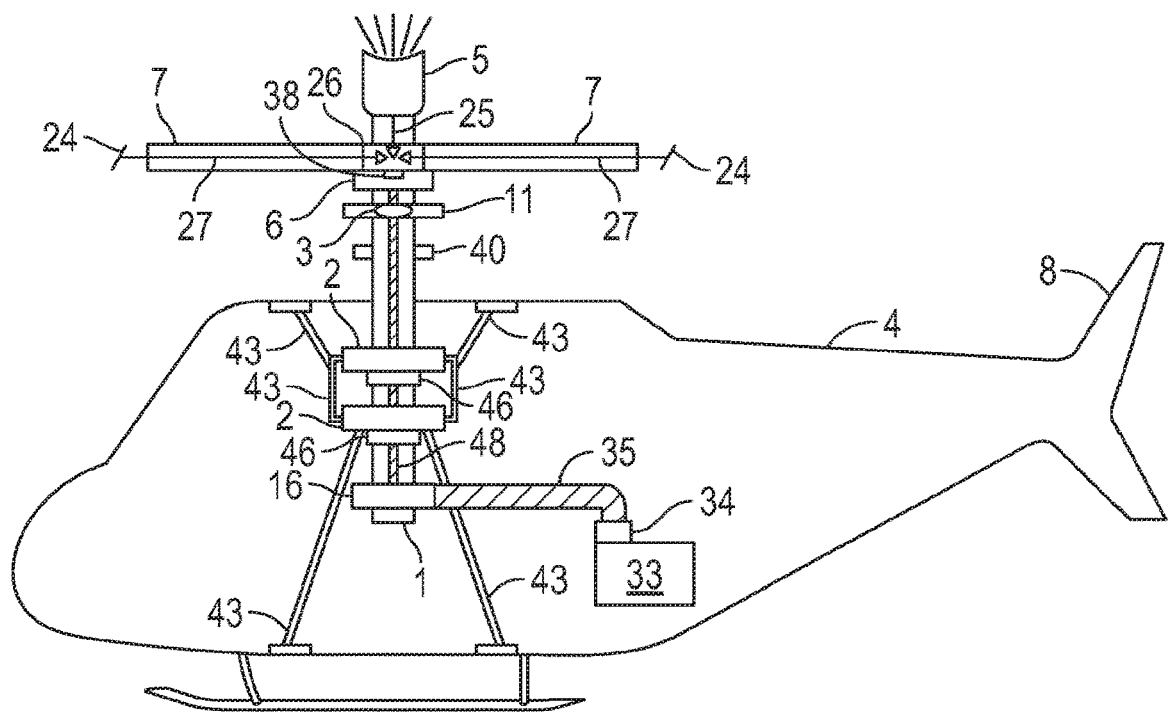
FIG. 9 is a schematic side view showing engine(s) mounted on top of and perpendicular to thrust support structure with gear box and drive shaft delivering power via drive shafts to propulsion means at the extremities of such structure and with such structure being above the rotor blades.
Figure 10:
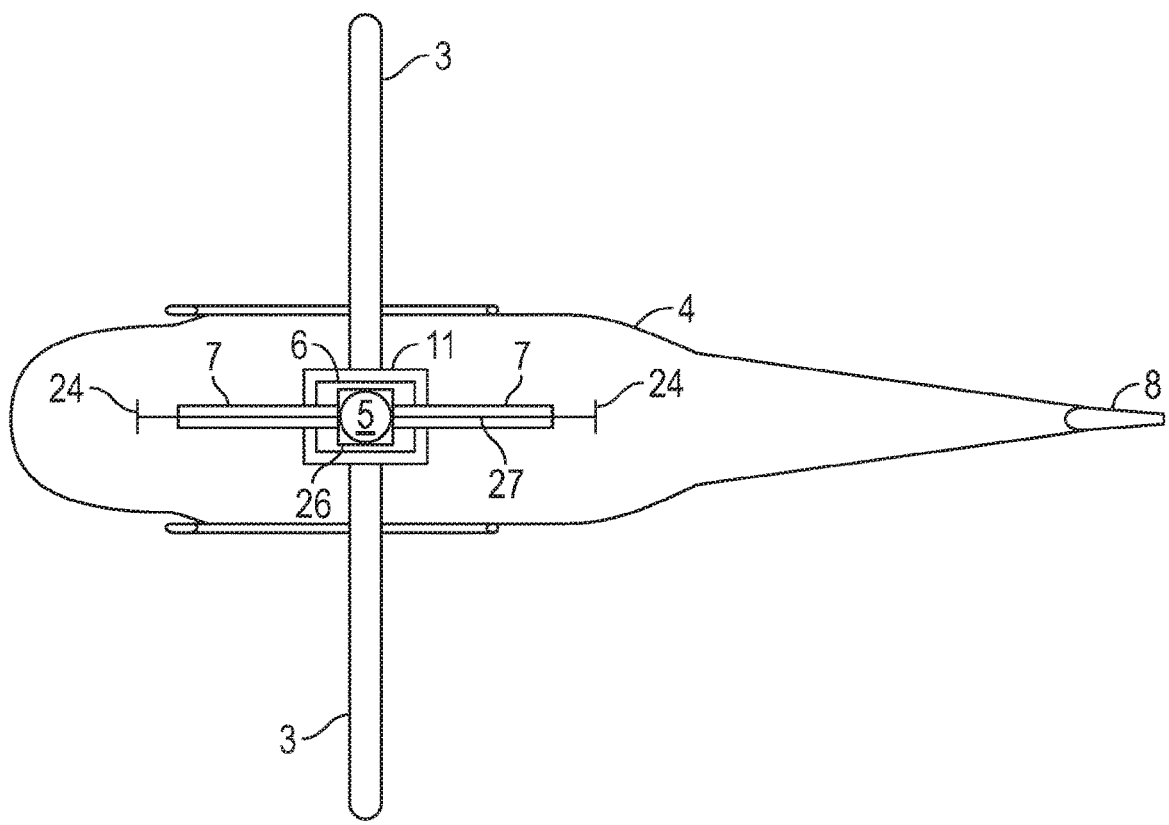
FIG. 10 is a top view of FIG. 9.
Figure 11:
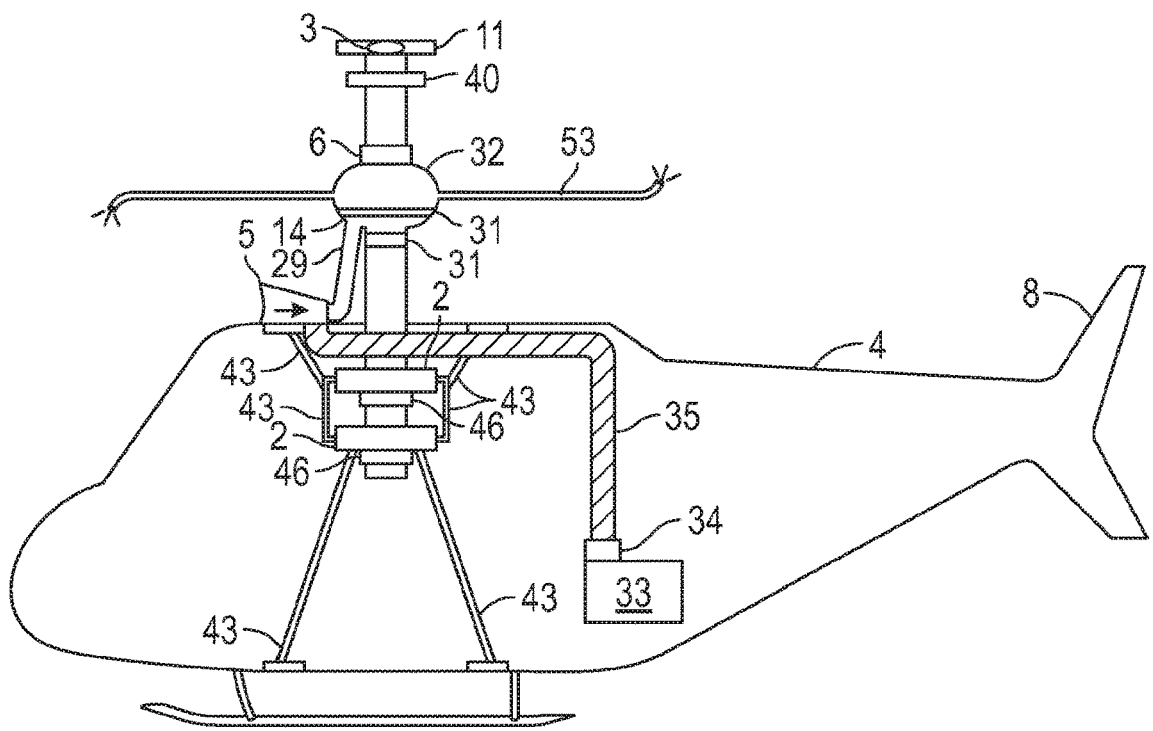
FIG. 11 is a schematic side view of engine(s) delivering thrust to a manifold which delivers thrust through passages in a thrust delivery structure to the outer extremities of such structures which then rotate and provide toque to rotor shaft and where the rotor blades are above such thrust delivery structures.
Figure 12:
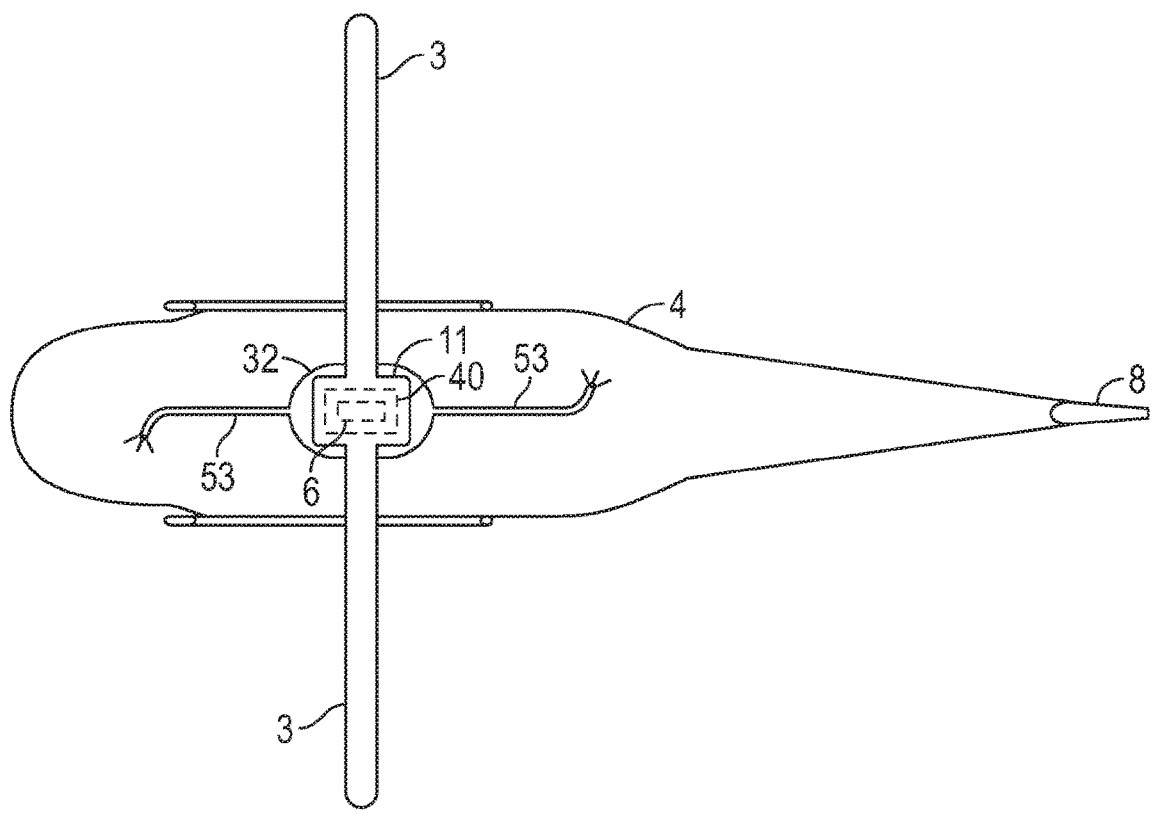
FIG. 12 is a top view of FIG. 11.
Figure 13:
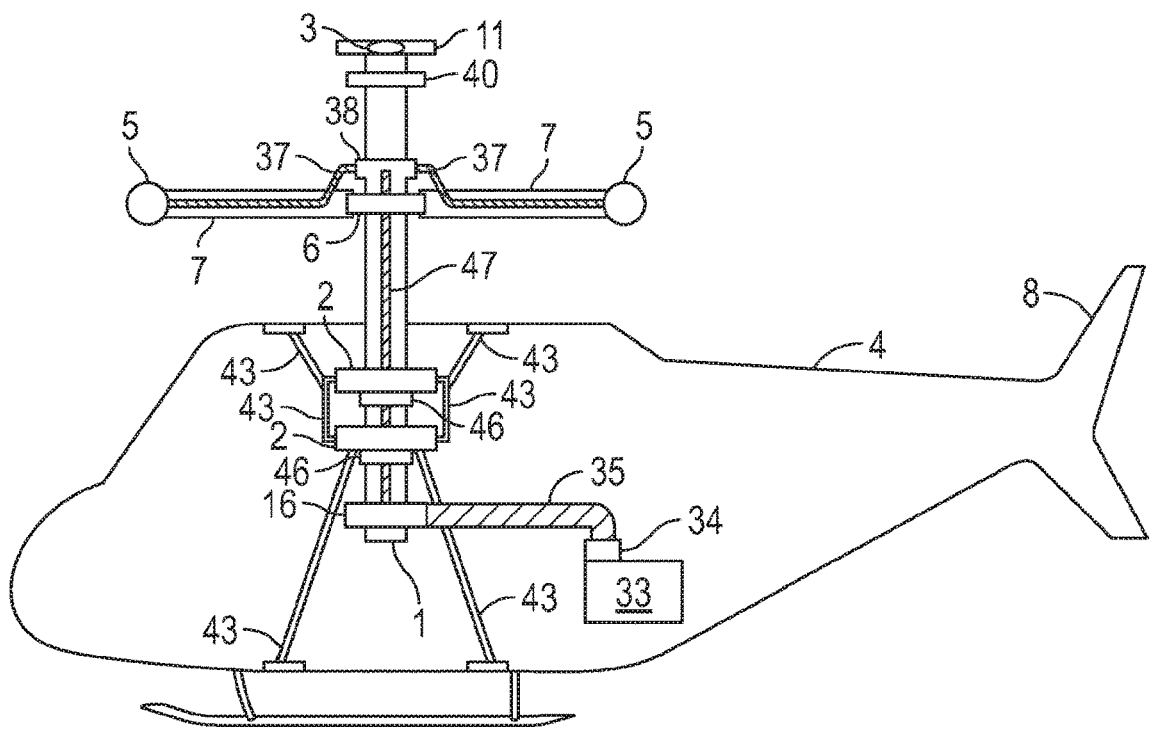
FIG. 13 is a schematic side view of an embodiment which arranges the components shown in FIG. 1 such that the rotor blades are above the thrust support structure.
Figure 14:
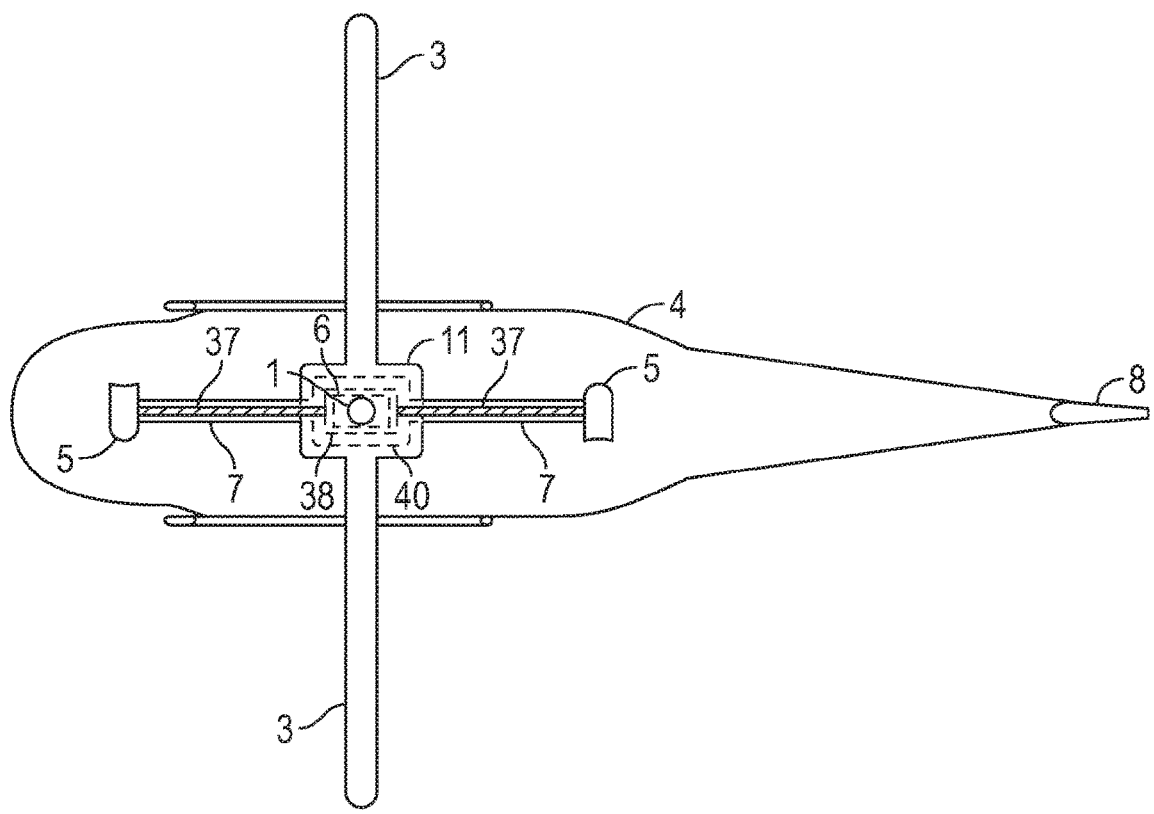
FIG. 14 is a top view of FIG. 13.

FIG. 1 is a representative side view of one embodiment of the present disclosure, and shows components which allow aircraft of the present invention to operate without counter torque apparatus such as a tail rotor or counter rotating rotor blades. FIG. 2 is a top view of the same embodiment. As shown, in FIG. 1 the rotor shaft 1 and all its appendages are supported by an assembly composed of support bearings 2, bearing support 46, and bearing support structure 43. The resulting assembly is attached to fuselage 4 such that the only contact of rotor shaft 1 and its appendages with the fuselage is the bearing support structure 43 and the support bearings 2. The torque exerted by the rotor shaft 1 and its appendages does not exceed the ability of support bearings 2 to isolate the fuselage 4 from said torque. Because torque is not transferred to the fuselage, the requirement for counter torque apparatus used in conventional helicopters may be eliminated.

Rotating Thrust Support Structure

Figure 15:
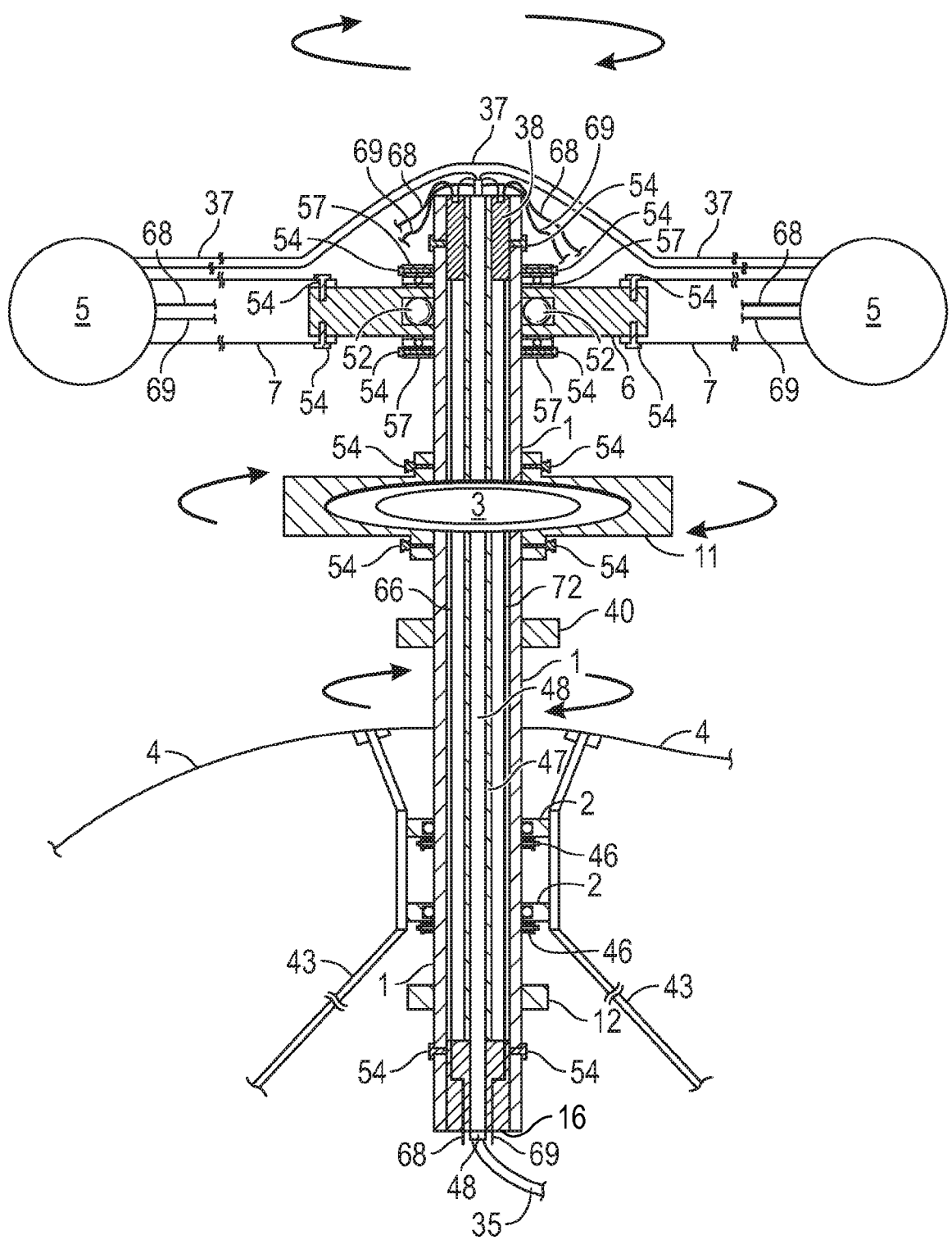
FIG. 15 is a zoomed in sectional view of components of the present disclosure for the embodiment shown in FIG. 1 where the thrust support structure is above the rotor blades.
Figure 16:
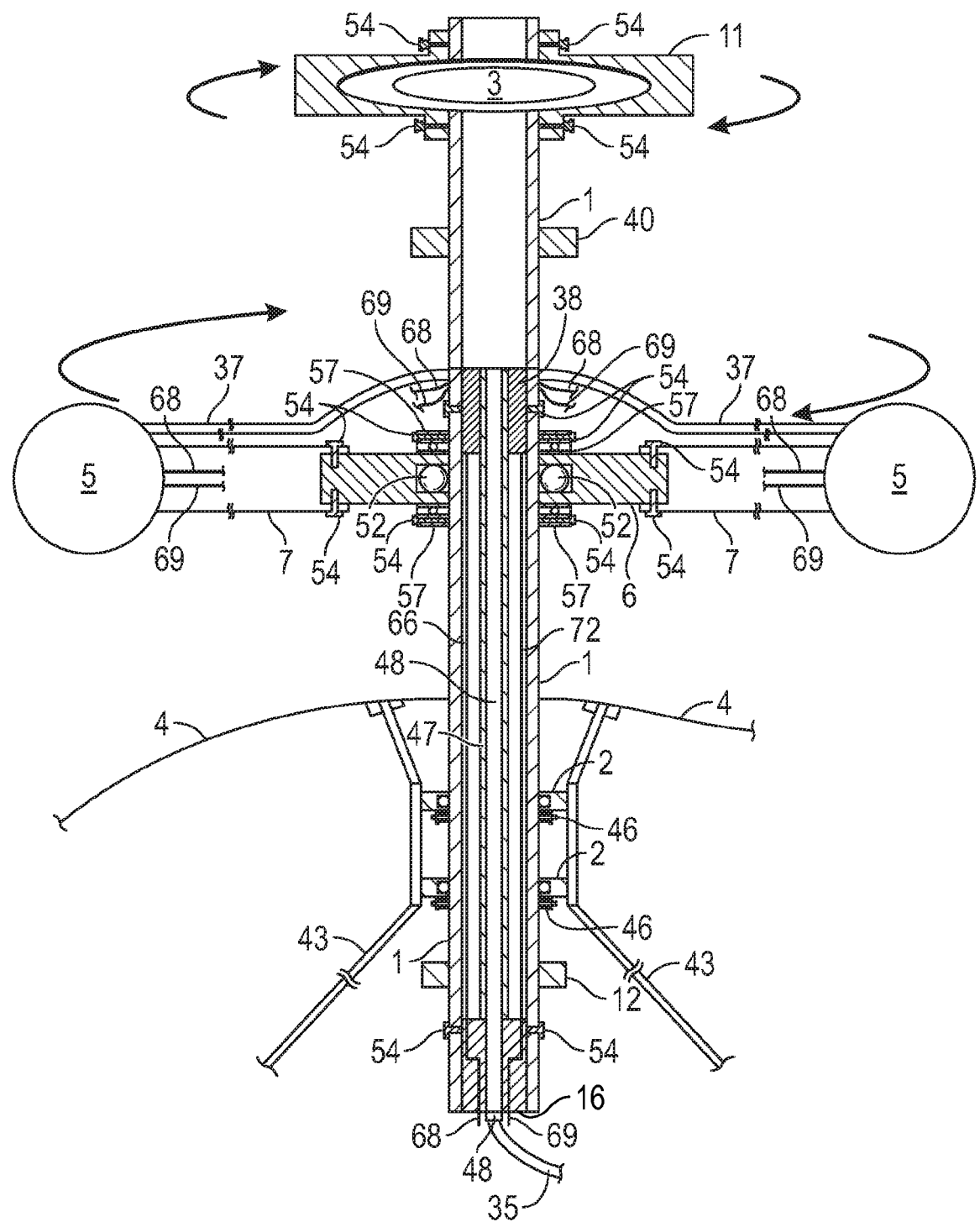
FIG. 16 is a zoomed in sectional view of components of the present disclosure for the embodiment shown in FIG. 13 where the thrust support structure is below the rotor blades.

As is illustrated in FIGS. 1, 2 & 15 the torque produced by the engine(s) 5 is delivered to the rotor shaft 1 by the rotation of thrust support structure 7. Thrust support structure 7 is a structural member that supports engine(s) 5 located at the outer extremities thereof. In the illustrated embodiments thrust support structure 7 is coaxial and perpendicular to rotor shaft 1, and is located in a different plane than rotor blades 3 (e.g., above the rotor blades 3). However, thrust support structure 7 and rotor blades 3 may be in a common plane as described later. In any case, when the engine(s) 5 are operational thrust support structure 7 rotates around the rotor shaft 1.

Clutch

FIG. 15 is a partial sectional view of components of the present disclosure for the embodiment of FIG. 1, in which the thrust support structure 7 is above the rotor blades 3. As shown the thrust support structure 7 with engine(s) 5 attached at its outer extremities is coaxial to rotor shaft 1 and is disposed above the rotor blades 3. Thrust support structure 7 is attached to clutch 6 which has an engaged state and a disengaged state. When engine(s) 5 are operational they cause rotation of thrust support structure 7, causing rotational torque. Such torque causes the attached clutch 6 to go into the engaged state and tightly grip the rotor shaft 1 and cause rotor shaft 1 to rotate which in turn causes the rotor hub 11 and attached rotor blades 3 to rotate. Clutch 6 can be a one way bearing or any suitable device that preforms the same function. Numerous devices that perform this function in varying ways are known to those skilled in the art.

Figure 17:
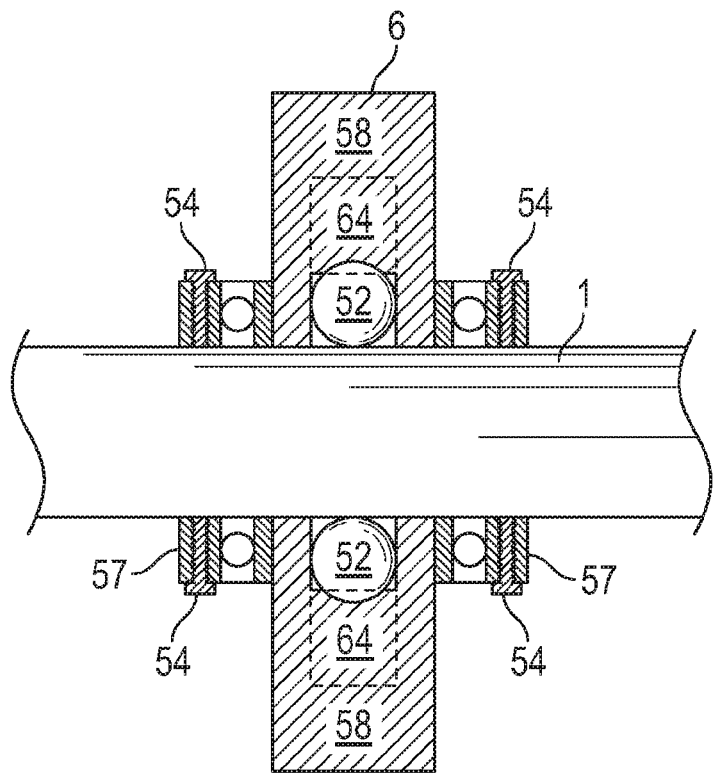
FIG. 17 is a schematic section side view showing one type of clutch in the engaged position.
Figure 18:
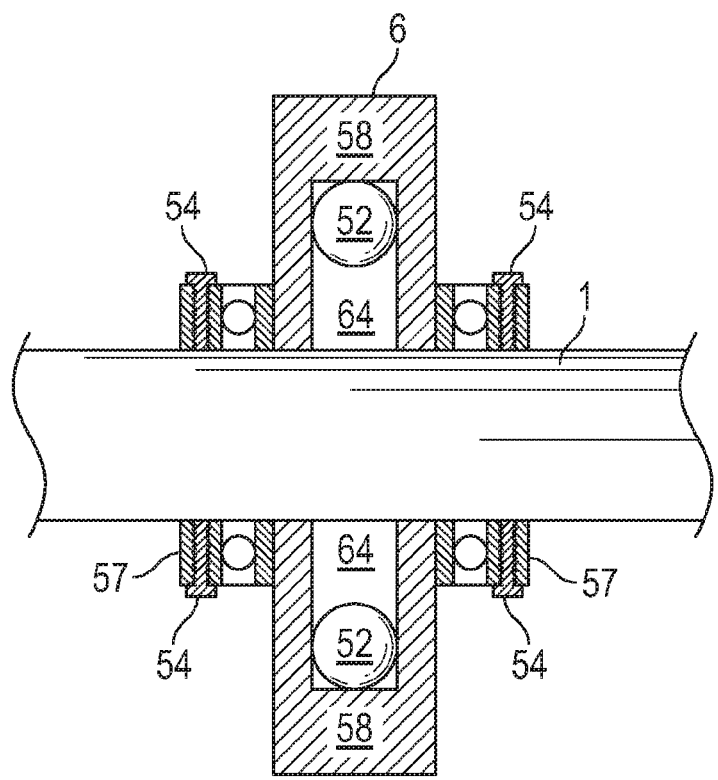
FIG. 18 is a schematic side view of one type of clutch in the disengaged position.
Figure 19:
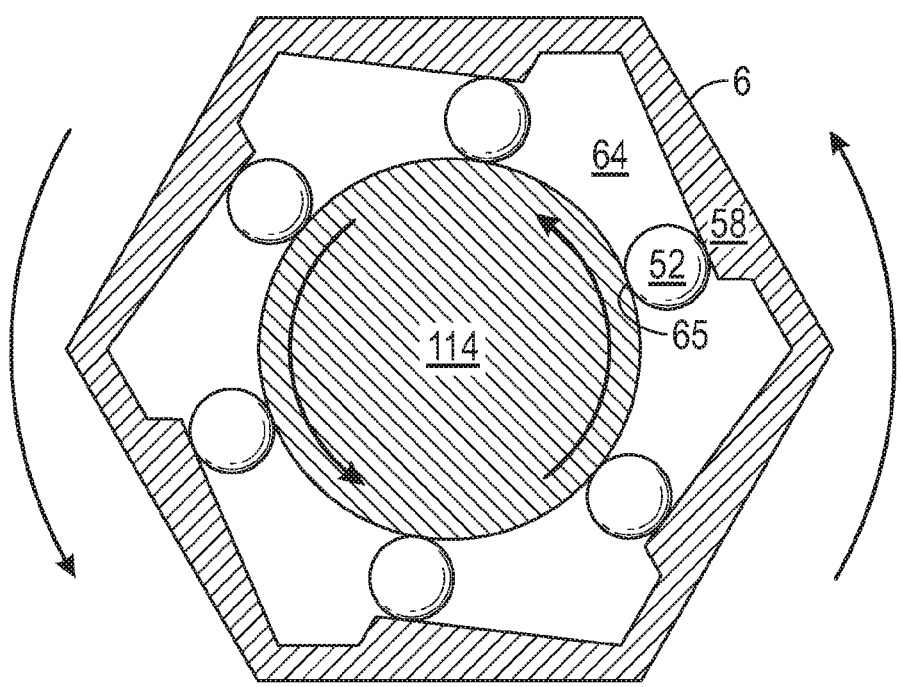
FIG. 19 is a schematic end view showing one type of clutch in the engaged position.
Figure 20:
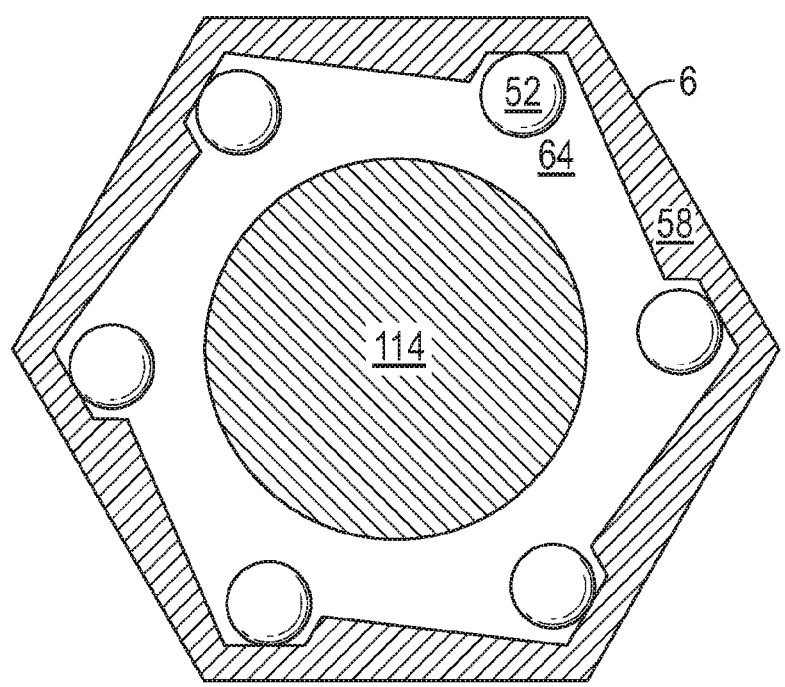
FIG. 20 is a schematic end view of one type of clutch in the disengaged position.
Figure 21:
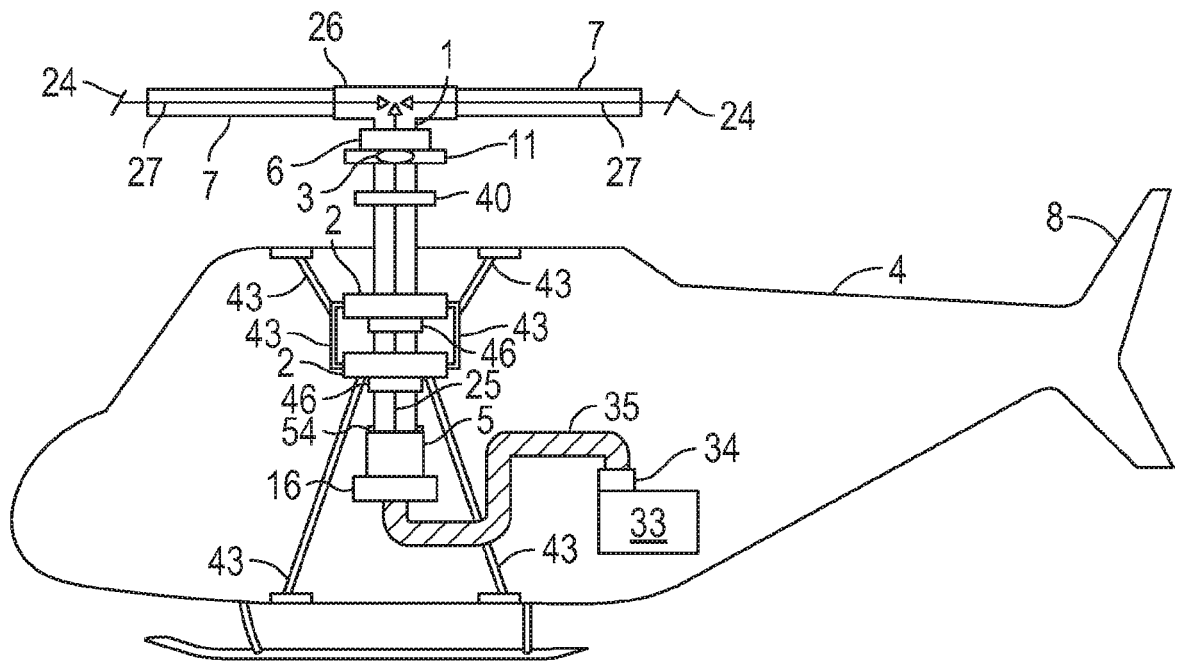
FIG. 21 is a schematic side view showing an embodiment of the present disclosure where the engine is affixed to the base of the rotor shaft and engine drive shaft extends through interior of the rotor shaft to gear box and other drive shafts extending along thrust support structure to drive propulsion means at its extremities.
Figure 22:
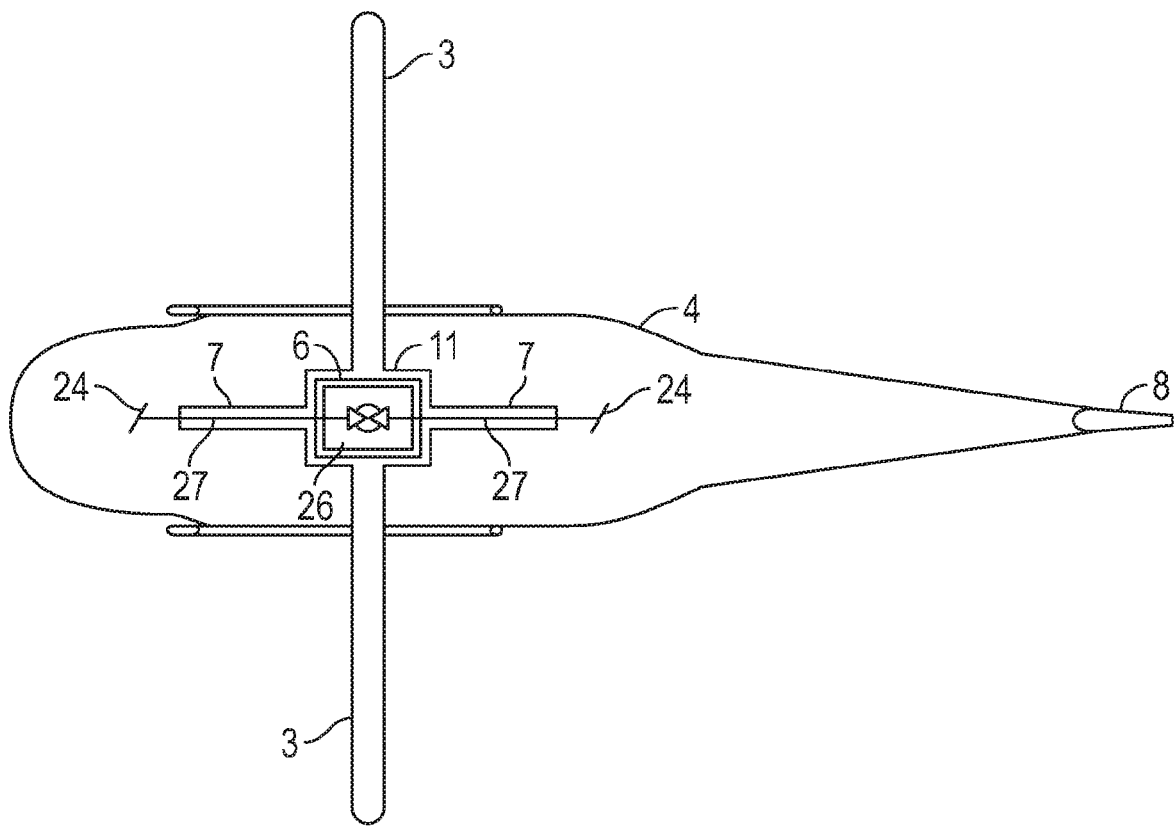
FIG. 22 is a top view of FIG. 21.

One type of clutch that may be used is illustrated in more detail in FIGS. 17, 18, 19 and 20. FIGS. 17 and 19 illustrate clutch 6 in the engaged state and firmly gripping rotor shaft 1. FIGS. 18 and 20 illustrate clutch 6 in the disengaged state where the engines 5 are not operational and the rotational speed of thrust support structure 7 is less than the rotational speed of rotor shaft 1. That causes clutch 6 and its attached thrust support structure 7 to automatically disengage from rotor shaft 1 and allow rotor shaft 1 to freely rotate which allows rotor blades 3 attached to rotor shaft 1 to auto rotate.

The operation of one example of clutch 6 will now be described in connection with FIGS. 17, 18, 19, and 20. FIG. 19 is a schematic view of clutch 6 in an engaged position. The rotational movement of the clutch outer case 58 causes the clutch movable bearings 52 to move along a ramp to the position shown in the clutch bearing cavity 64. When clutch movable bearings 52 are in this position they cause the clutch outer case 58 to contact both the clutch outer case 58 and the clutch inner race 114. In that position the clutch movable bearings 52 firmly grip clutch inner race 114 (which is directly attached to rotor shaft 1) and cause rotor shaft 1 to rotate in the same direction as the clutch outer case 58. FIG. 17 is a sectional schematic side view of the type of clutch 6 shown in FIG. 19 which is in the engaged position. Thrust bearing assemblies 57 are attached to rotor shaft 1 by fasteners 54 which hold clutch 6 in place in its position on rotor shaft 1 while allowing clutch 6 to either engage rotor shaft 1 or disengage rotor shaft 1. As shown in FIG. 17, the clutch movable bearings 52 can engage tightly against rotor shaft 1 and thus cause clutch 6 and rotor shaft 1 to rotate together in unison.

Reference is now made to FIG. 20, which is a schematic view of clutch 6 in a disengaged position. When rotational momentum of clutch outer case 58 is absent or diminished, clutch outer case 58 starts to decelerate in its relation to rotor shaft 1. Clutch movable bearings 52, because of their momentum and centrifugal force move away from and loosens their grip on clutch inner race 114 (which again, is attached to rotor shaft 1), thus decoupling rotor shaft 1 from clutch outer case 58 and allowing rotor shaft 1 to rotate freely in relation to clutch 6. Also, when the rotor shaft 1 speed is greater than the rotational speed of clutch 6, clutch 6 is disengaged from rotor shaft 1. The disengaged condition of clutch 6 allows rotor shaft 1 to rotate freely and allow auto rotation without any induced drag from the thrust support structure 7 and the power system. Also during auto rotation any time the speed of rotor shaft 1 is equal to or less than the rotational speed of clutch 6, the stored inertia of the power system will be transferred to rotor shaft 1. While this condition is existing, this power system inertia transfer provides more time for lowering the collective pitch to a safe angle needed for auto rotation of the aircraft.

Figure 38:
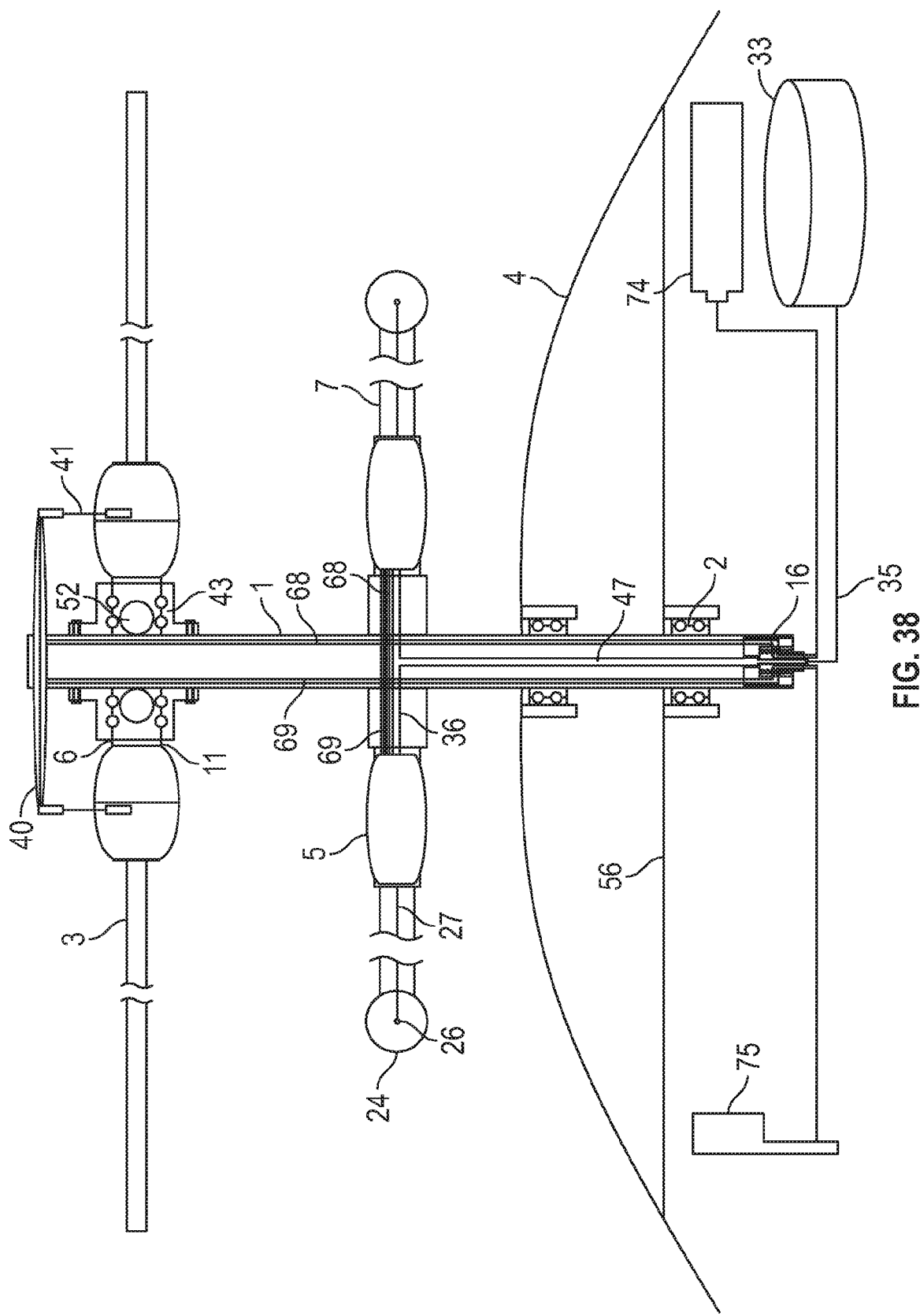
FIG. 38 is a side cross sectional view of an embodiment consistent with the present disclosure, in which one or more engines are directly integrated into a thrust support structure, which is directly connected to a rotor shaft.

FIG. 38 shows another embodiment of a clutch 6, which in this case is directly connected to rotor hub 11. This configuration allows rotor blades 3 to rotate independent of rotor shaft 1 and all other drive system components. Engines 5 are integrated into thrust support structure 7 which is directly connected to and drive rotor shaft 1. This configuration with respect to its location on the rotor shaft can be applied with the thrust support structure 7 located above, below, and/or in the same plane as the rotor blades 3.

Fuel, Electrical Power, Data Delivery System

Figure 35:
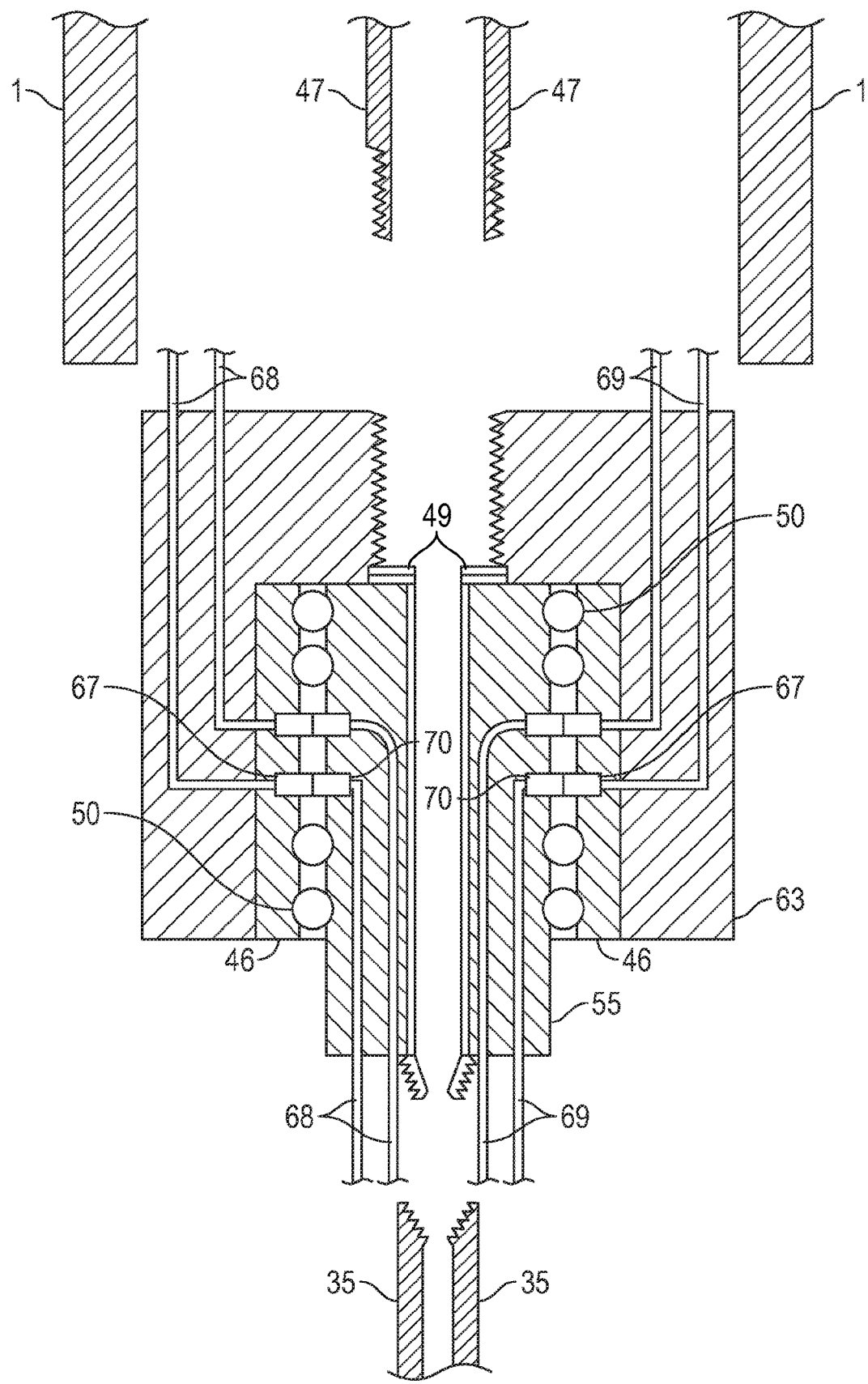
FIG. 35 depicts one example of a rotary union consistent with the present disclosure.

FIGS. 1 and 2 show a fuel tank 33 and a fuel pump 34 connected to a lower fuel line 35. FIGS. 1 and 15 show lower fuel line 35 connected to fuel line shaft 48 which is connected to lower rotary union 16. Lower rotary union 16 is shown in more detail in FIG. 35. In embodiments lower rotary union 16 and upper rotary union 38 may be the same apparatus with different orientations. As shown in FIG. 35 and FIG. 15, lower rotary union 16 has fuel input coming from lower fuel line 35, data input coming from data wiring 68, and power input coming from power wiring 69. FIG. 15 shows data conduit 66 through which data wiring 68 extends from lower rotary union 16 up through rotor shaft 1 and into upper rotary union 38. FIG. 35 shows how fuel, data, and power are transferred through lower rotary union 16 and upper rotary union 38. In the embodiment of FIG. 15, after exiting upper rotary union 38 data wiring 68 is directed through appropriate protective shielding along or through thrust support structure 7 to engines 5 or to such other apparatus requiring data. Power wiring 69 is directed from the bottom of rotor shaft 1 to the top of rotor shaft 1 to engines 5 or other apparatus requiring power in the same manner as data wiring except through separate power conduit 72. FIG. 35 also shows detail of lower rotating union 16 and upper rotating union 38, as they are one in the same piece of apparatus with different orientations.

Fuel may be pumped through lower rotary union 16 to rotor shaft interior fuel line 47 which rotates in unison with rotor shaft 1. FIG. 15 shows how fuel can be pumped through rotor shaft interior fuel line 47 extending up through the inside of rotor shaft 1 to the upper rotary union 38. In the embodiment of FIG. 35 the rotary union seal 49 prevents fuel leakage as lower rotary union 16 and upper rotary union 38 rotate with rotor shaft 1. Rotary union bearings 50 allow lower rotary union 16 and upper rotary union 38 attached to rotor shaft 1 to freely rotate with respect to fuel line shaft 48 at the lower and upper extremities of rotor shaft 1. Fuel is then delivered from fuel line shaft 48 at upper extremity of rotor shaft 1 to engines 5 through upper fuel lines 37. In FIG. 15, upper fuel lines 37 are affixed to, or contained inside of the thrust support structure 7. These methods of fuel transport and delivery for a helicopter aircraft perform a function similar to means disclosed in U.S. Pat. No. 2,761,635 (Hiller). Other elements such as electrical power, pneumatics, and data are also able to be delivered from the lower part of rotor shaft 1 to the upper part of rotor shaft 1 by similar rotary union or slip ring type apparatus. The various figures do not show all the conventional helicopter operational and control devices, but do show as an example of such devices the swash plate 40 which is shown in representative form in FIGS. 1 & 15.

FIG. 35 depicts one example of a rotary union that performs the function of delivering fuel, electrical current and data to and from rotor shaft 1. The rotary union provides a simple method to connect components which may be rotating at different speeds in relation to each other while assuring continuity of those connections. The main structure of the rotary union is comprised of rotary union housing 63 which contains rotary union bearings 50 that allow the rotary union housing 63 to rotate freely in relation to rotary union shaft 55.

Lower fuel line 35 is connected to rotary union shaft 55 by means of a threaded connection allowing fuel to be transferred into the body of rotary union shaft 55. Rotary shaft interior fuel line 47 is threaded into rotary union housing 63 and presses up against rotary union seal 49 to allow transfer of fuel through rotary shaft 1. Data wires 68 and electrical power wires 69 run through machined passages in rotary union shaft 55. These wires are connected to contacts 70 that allow continuity of these connections to brushes 67 contained within bearing support 46. Wiring continues to run from brushes 67 through passages in rotary union housing 63 and out into conduits (not shown) that run along the inside of rotor shaft 1.

In embodiments the main structure of the rotary union includes rotary union housing 63, which contains rotary union bearings 50 that allow the rotary union housing 63 to rotate freely in relation to rotary union shaft 55. Lower fuel line 35 is connected to rotary union shaft 55 by any suitable means (e.g., a threaded connection), so as to allow fuel to be transferred into the body of rotary union shaft 55. For example, rotary shaft interior fuel line 47 may be threaded into rotary union housing 63 and presses up against rotary union seal 49 to allow transfer of fuel through rotary shaft 1. Data wires 68 and electrical power wires 69 run through machined passages in rotary union shaft 55. Such wires are connected to contacts 70 that allow continuity of these connections to brushes 67 contained within bearing support 46. Wiring continues to run from brushes 67 through passages in rotary union housing 63 and out into conduits (not shown) that run along the inside of rotor shaft 1.

Yaw Control Device

Figure 23:
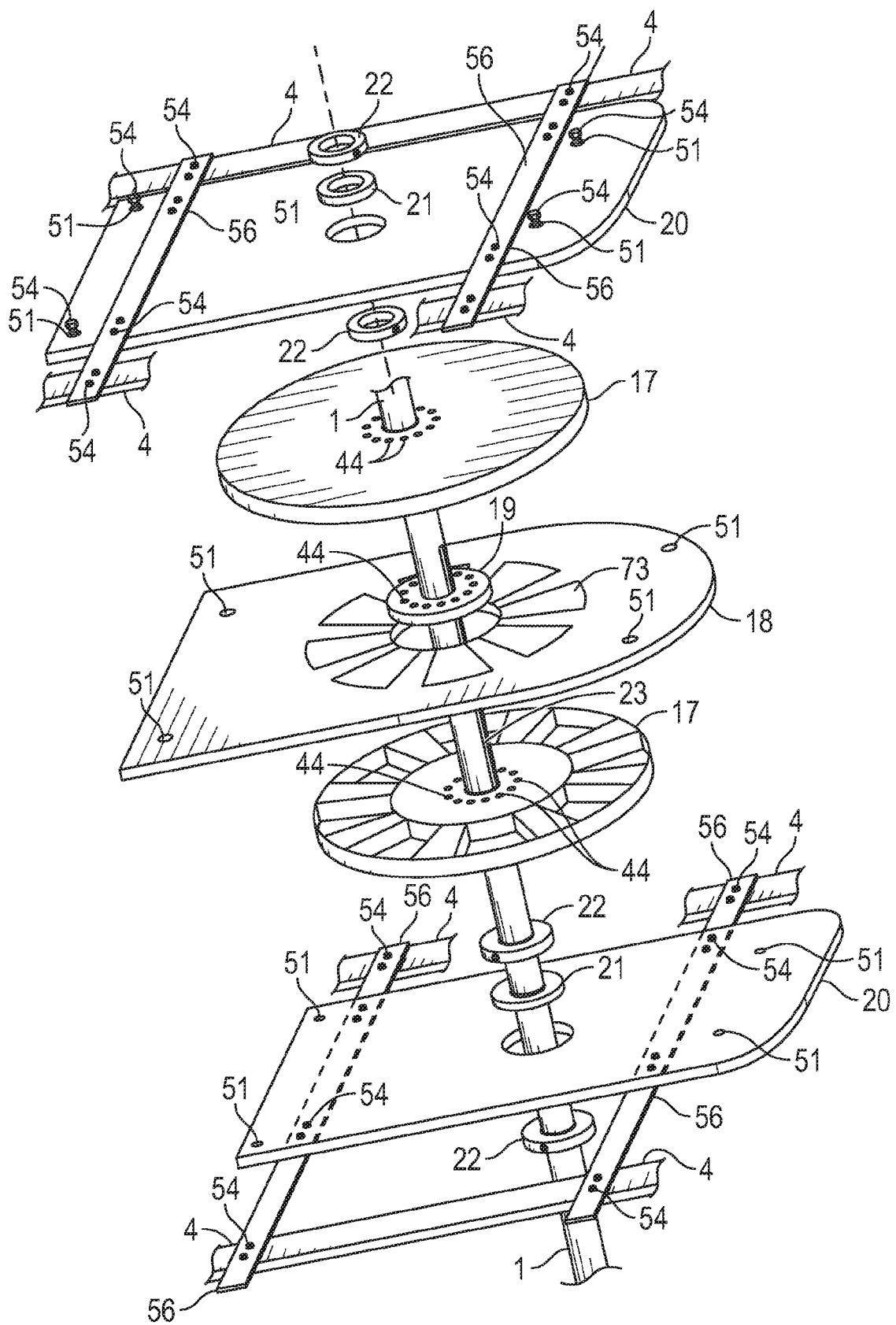
FIG. 23 is an exploded view of one type of yaw control device.
Figure 24:
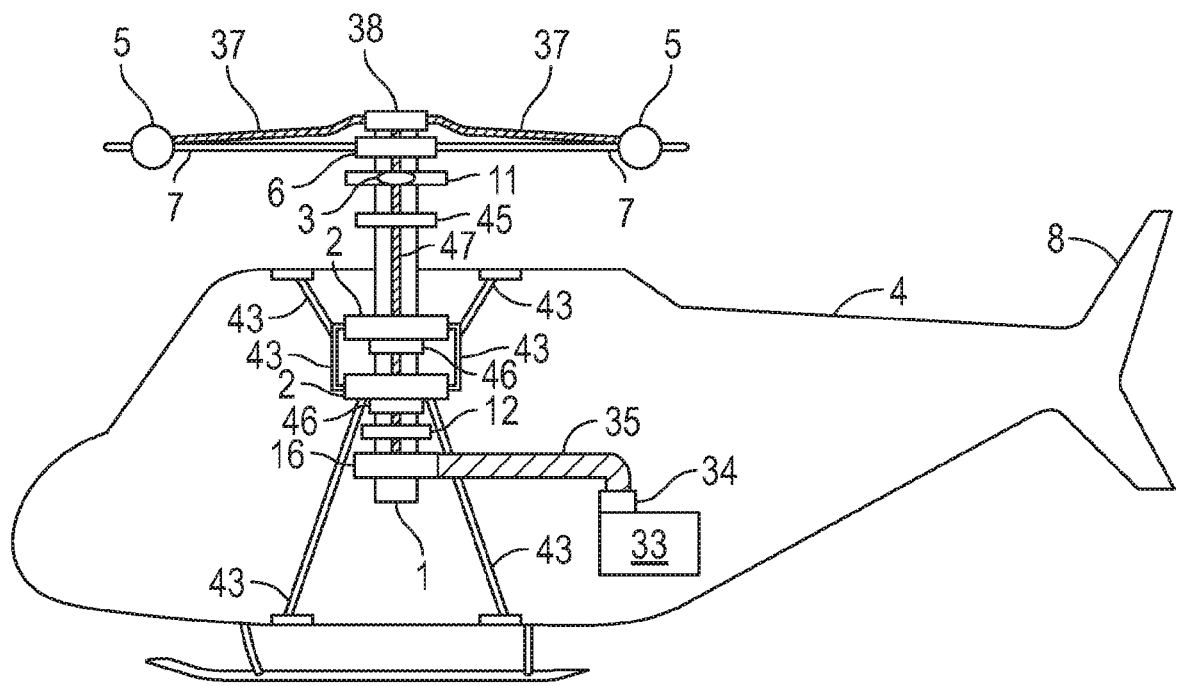
FIG. 24 is a schematic side view of the same aircraft shown in FIG. 1 except that this embodiment contains a yaw control device such as is shown in FIG. 23.
Figure 25:
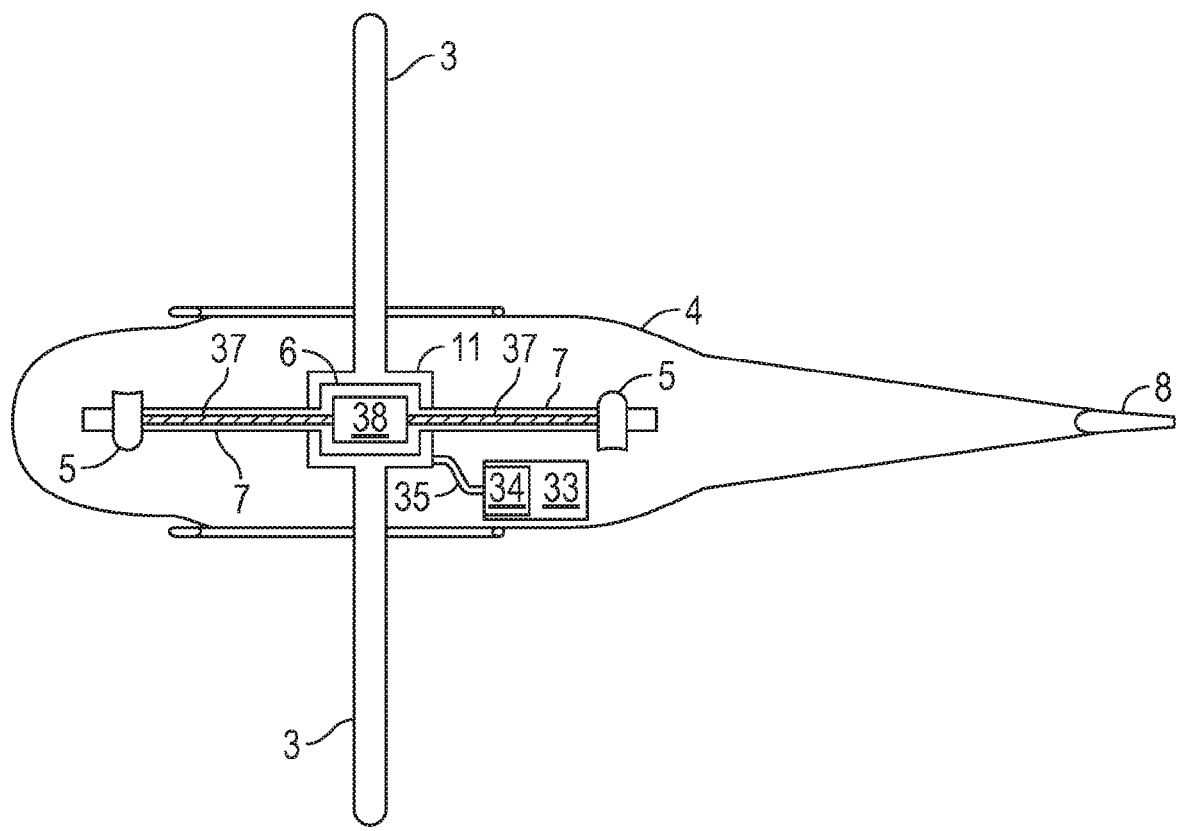
FIG. 25 is a top view of FIG. 24.

Yaw control device 12 is shown in representative form in FIGS. 1 and 15 and in an exploded view form in FIG. 23, and illustrates how such an assembly can be used for yaw control of an aircraft. In this embodiment yaw control device 12 is an electrically reversible motor, where the shaft of the motor is the rotor shaft 1. When yaw control is desired the motor is momentarily energized which creates a rotational force upon the fuselage. Due to the mass and rotational velocity of rotor shaft 1 and its ancillary components, the net effect of the stator 18 being energized is to cause an opposing force against the rotor magnets 17 which are attached to spacer 19 through yaw control device spacer holes 44 and spacer 19 is attached to rotor shaft 1 by key and keyway 23. Rotor shaft 1, being also the shaft of the yaw control device 12, is isolated from the motor body support plates 20 by yaw control motor bearings 21. Yaw control motor bearings 21 are retained by shaft clamps 22 which are affixed to rotor shaft 1. The motor body support plates 20 and stator 18 are all coupled together with fasteners 54 (e.g., bolts) through yaw control device stator retention holes 51 such that the stator 18 and the motor body support plates 20 assembly is attached to fuselage 4 by fuselage structural member 56. When stator motor windings 73 are energized they cause attached stator 18 and connected components and fuselage 4 to rotate. Since yaw control device 12 is essentially a reversible motor, the effect created by energizing yaw control device 12 can cause a clockwise or counter clockwise yaw of the aircraft. It should be noted that increasing the distance of the stator motor windings 73 and the magnets on the magnet rotors 17 from the center of the rotor shaft 1 provides more torque and efficiency of the yaw control device 12. Axial flux motors of this design are similar to those utilized in electric and hybrid vehicles.

Figure 28:
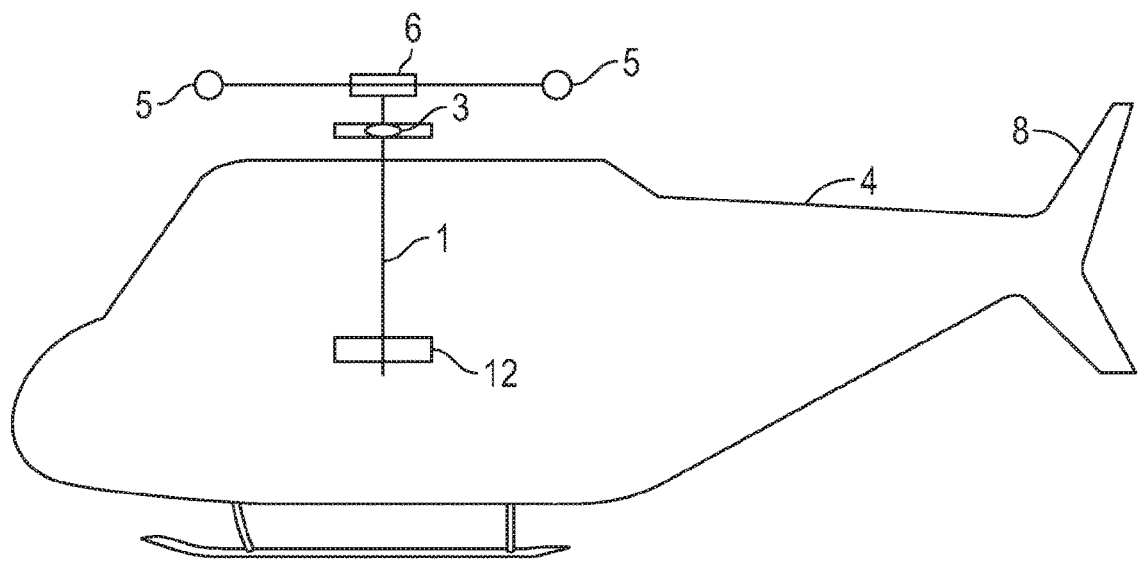
FIG. 28 is a schematic side view illustrating an embodiment of the present disclosure containing both a yaw control device and a tail rudder for yaw control.
Figure 29:
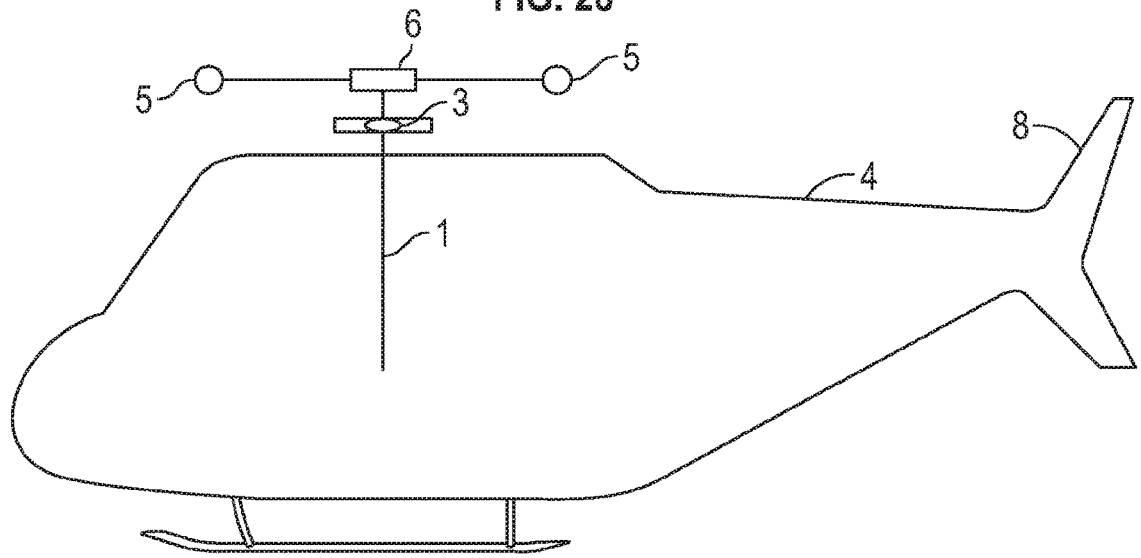
FIG. 29 is a schematic side view illustrating an embodiment of the present disclosure containing only a tail rudder for yaw control.
Figure 30:
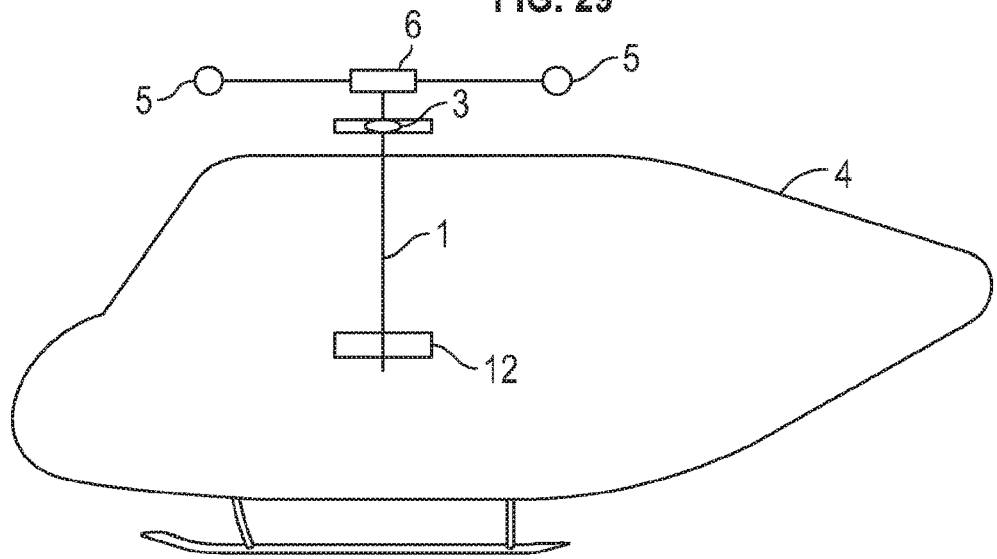
FIG. 30 is a schematic side view illustrating an embodiment of the present disclosure where there is no tail rudder and a yaw control device provides yaw control.

The present disclosure also provides other mechanisms for controlling yaw, several of which are illustrated in FIGS. 28, 29, and 30. FIG. 28 is a representative side view of an aircraft using both a tail rudder 8 and a yaw control device 12 for yaw control. FIG. 29 is a representative side view of an aircraft using only a tail rudder 8 for yaw control. FIG. 30 is a representative side view of an aircraft utilizing only a yaw control device 12 for yaw control.

Comparison with Anti-Torque Mechanisms

Figure 26:
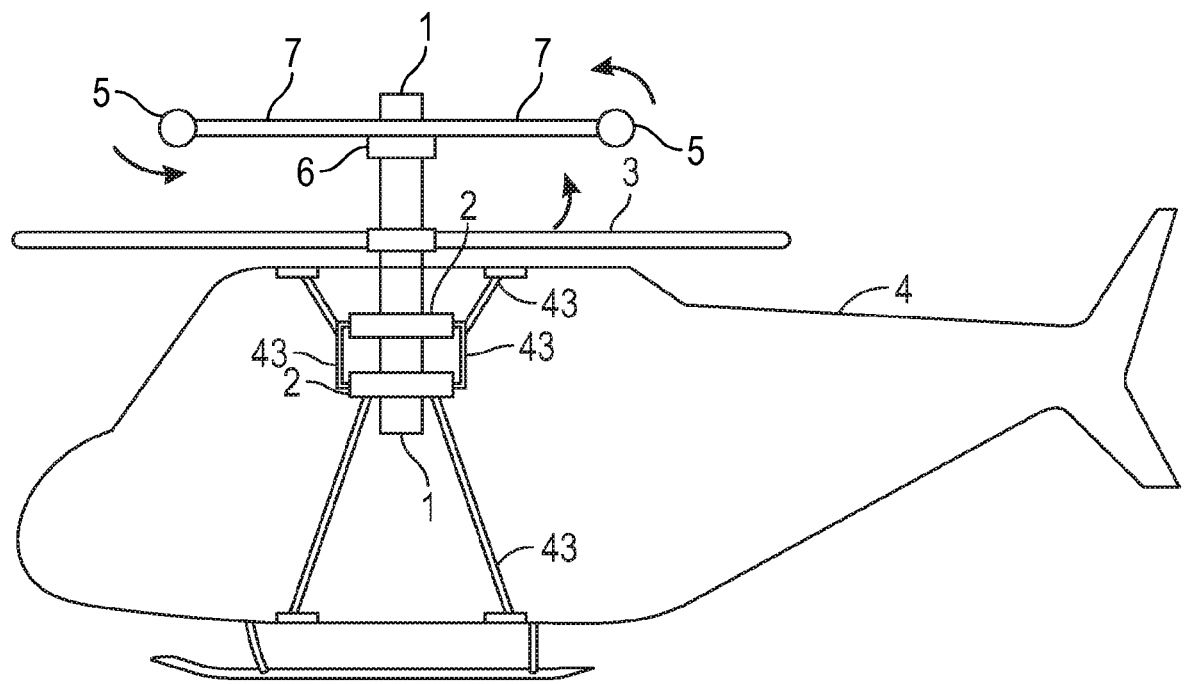
FIG. 26 is a schematic side view of an embodiment of the present disclosure illustrating torque being isolated from the fuselage, thus eliminating the need for counter torque mechanisms such as a tail rotor.
Figure 27:
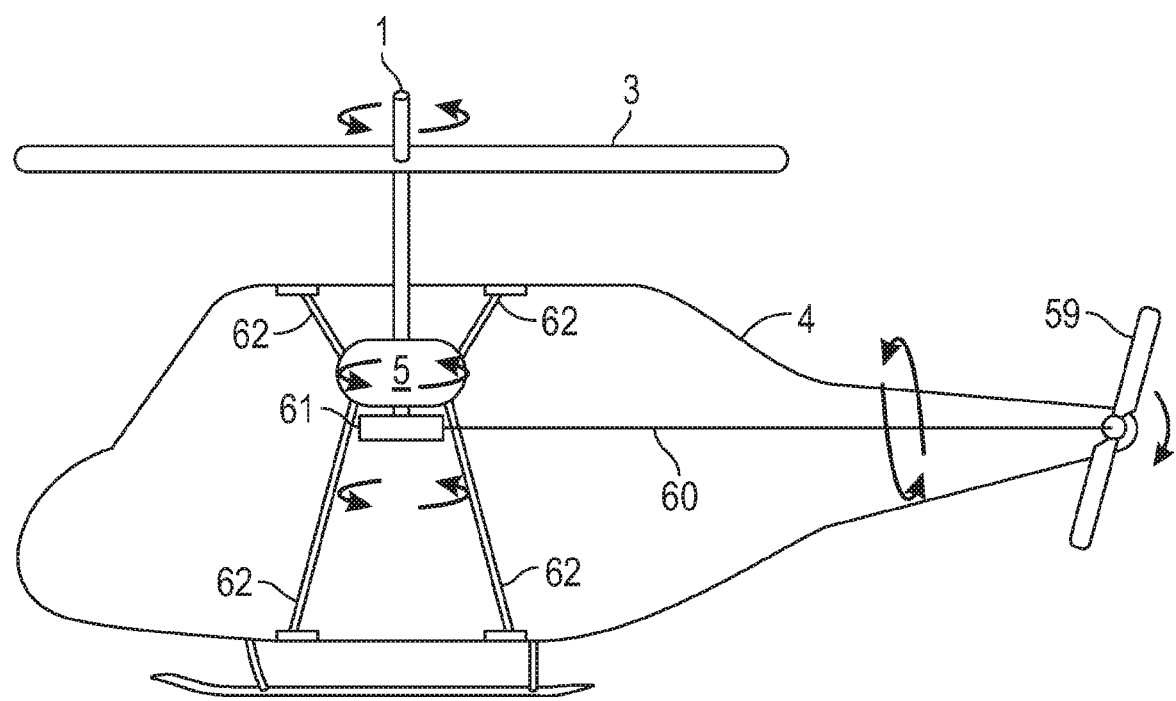
FIG. 27 is a schematic side view of a conventional helicopter illustrating torque being transferred to the fuselage thus requiring a counter torque mechanism—in this case a tail rotor.

FIG. 27 is a side schematic view of a conventional helicopter showing how engine(s) 5 and other rotating components such as the rotor shaft 1 and rotor blades 3 create rotational torque which is imposed on the fuselage 4 by the rigidly connected supporting mechanisms 62. Since such torque imposed on fuselage 4 is not isolated from fuselage 4, it will cause the fuselage 4 to rotate around the axis of rotor shaft 1 unless it is counteracted. Conventional helicopters use counter rotating (anti-torque) mechanisms for creating an offsetting torque in the onsite direction to keep the aircraft from spinning out of control. One example of this concept is shown in FIG. 27, which shows an aircraft with a tail rotor 59 and tail boom as an anti-torque mechanism. In contrast, FIG. 26 depicts an embodiment of the present disclosure, in which torque imposed by the rotor shaft 1 and its appendages is isolated from the fuselage 4, such that fuselage 4 is not caused to rotate around the rotor shaft 1 and the need for counter torque apparatus such as a tail rotor is eliminated.

Vortex Ring State Mitigation

Conventional helicopters are subject to a dangerous phenomenon called vortex ring state. This is an aerodynamic condition that is created when the tip vortices of the main rotors grow due to the aircraft staying within its own downwash and which allows the tip vortices to build and amplify in size and strength. If the aircraft doesn't move out of its downwash and into cleaner undisturbed air, the vortex ring state can reduce the amount of lift generated by the main rotors due to positive air pressure waves forming on top of the rotor. This can result in a sudden and uncontrolled drop in altitude which can lead to a crash.

The technologies of the present disclosure can introduce a strong counter flow of air that can disrupt or inhibit the formation of vortices and air pressure above the rotor blades. In some embodiments the counter flow is generated by placing the thrust line of the engine(s) 5 directly in the path of where the vortex would form. The thrust line of the engine(s) 5 creates a high velocity flow of air that fans out horizontally above/below the rotor blades 3, and generally in the same plane as the rotor blades 3. The high velocity air flow can also cause a low pressure area to be formed immediately behind the engine(s) 5 and above the rotor blades 3, further improving lift and mitigating the effect of the vortex ring state. The relationship of normal airflow and disturbed airflow due to the vortex ring state on conventional and aircraft of the present disclosure are illustrated in FIGS. 31, 32, 33, 34.

Additional Embodiments

While the above description focuses on embodiments in which elements of the propulsion system (e.g., rotor shaft 1, rotor blades, thrust support structure 7, etc.) of an aircraft remains in substantially the same orientation relative to the aircraft's fuselage 4, such configurations are not required. Indeed, the present disclosure encompasses and envisions embodiments in which the orientation of various elements of the propulsion system of an aircraft may change. Such embodiments may be useful, for example, in tilt rotor, vertical takeoff and landing (VTOL), short takeoff and landing (STOL), and short takeoff and vertical landing (STOVL) aircraft. In that regard reference is made to FIG. 42, which illustrates one example aircraft configuration in which elements of the aircraft propulsion system may transition between multiple orientations relative to the fuselage 4. More specifically, FIG. 42 depict one example of an aircraft that includes rotor shaft 1, rotor blades 3, fuselage 4, engine(s) 5, clutch 6, thrust support structure 7, tail rudder 8, and rotor hub 11, wherein such elements may transition from a vertical orientation as shown in FIG. 42 to a horizontal orientation. Movement of such components between the vertical orientation to the horizontal orientation (and vice versa) is accomplished using pivot 15. In this embodiment pivot 15 permits a range of motion of about 90 degrees, but pivot 15 may be configured to provide any desired range of motion. Moreover, in embodiments pivot 15 is configured to enable stable retention of the above noted elements of the propulsion system at any position between the vertical and horizontal orientations shown in FIG. 42. Thus, for example, where pivot 15 enables a 90-degree range of motion, it may be configured to stably retain the elements of the propulsion system at any angular orientation between about 0 and about 90 degrees, relative to fuselage 4.

The nature and function of the rotor shaft 1, rotor blades 3, engine(s) 5, clutch 6, thrust support structure 7, and rotor hub 11 in FIG. 42 are the same as described above, and for brevity are not reiterated. And consistent with the above description, the arrangement of such elements is not limited to the arrangement shown in FIG. 42. For example, thrust support structure 7 and engine(s) 5 may be positioned above rotor blades 3, below rotor blades 3, in the same plane as rotor blades 3, or a combination thereof. Thrust from a single engine 5 or multiple engine(s) 5 may be applied to thrust support structure 7 in any suitable manner. For example, engine(s) 5 may be directly coupled to thrust support structure 7, and/or thrust from engine(s) 5 may be applied by ducted flow to outer extremities of thrust support structure 7. Multiple repositionable propulsion units (each including a rotor shaft, rotor blades, engine(s), clutch, thrust support structure, rotor hub, etc.) may also be used on the aircraft, as would be understood by those skilled in the art. Moreover, and as shown in FIG. 42, wings 28 and one or more horizontal stabilizers 92 may be positioned at appropriate positions on the aircraft, e.g., to provide lift, control, and/or stabilization. When used, wings 28 and/or horizontal stabilizer(s) 92 may also re-oriented between multiple positions (e.g. horizontal and vertical orientations). To that end, one or more pivots or other control mechanisms for re-orienting wings 28 and/or horizontal stabilizer(s) 92 may also be included in the aircraft. Finally, while FIG. 42 depicts an embodiment in which a single set of rotor blades 3 and related drive elements, multiple sets (e.g., 2, 3, 4 or more) of rotor blades 3 and associated drive elements can also be used.

Vibration, harmonic motion, oscillations, instability of fuselage 4 or other components, and the like may impart mechanical or other stresses on various components of the aircraft described herein. For example when a traditional transmission is used to interconnect a rotor shaft to a fuselage of a rotary aircraft, vibration, harmonic motion and/or stresses from the rotor blades can be transmitted through the transmission to the fuselage. This may cause undesirable operating conditions for the aircraft and/or the pilot. Notably, the size and location of a conventional transmission can hinder or even prevent the use of certain options for mitigating the transmission of vibration and/or harmonic motion from the rotor blades to the fuselage of the aircraft.

With that in mind, the propulsion systems described herein do not require the use of a traditional transmission to interconnect a rotor shaft with a fuselage, as described above. Rather, the propulsion systems described herein make use of clutch 6, which may be located external to fuselage 4. As a result, volume within fuselage 4 that may have been occupied by a traditional transmission may be available for other uses in the aircraft of the present disclosure. For example, such volume may be used to house one or more dampening elements, wherein the dampening elements are configured to mitigate or even prevent the transmission of vibration and/or harmonic motion from rotor blades 1 to fuselage 4 (or elements therein).

To address such issues, one or more dampening elements may be utilized to dampen or otherwise mitigate undesirable forces/stresses. In that regard reference is made to FIG. 43, which is a schematic side view of one example of an aircraft propulsion system that includes one or more active and/or passive dampening elements, consistent with the present disclosure.

In that embodiment, fuselage 4 includes or defines an interior volume, in which fuselage structural members 56 are disposed. Rotor shaft 1 is coupled to clutch 6 and rotor blades 3, and extends into fuselage 4. Multiple dampening elements are included within fuselage 4 to mitigate, attenuate, or even prevent the transmission of vibration and/or undesirable (e.g., harmonic) motion from rotor blades 3 to fuselage 4.

Figure 43:
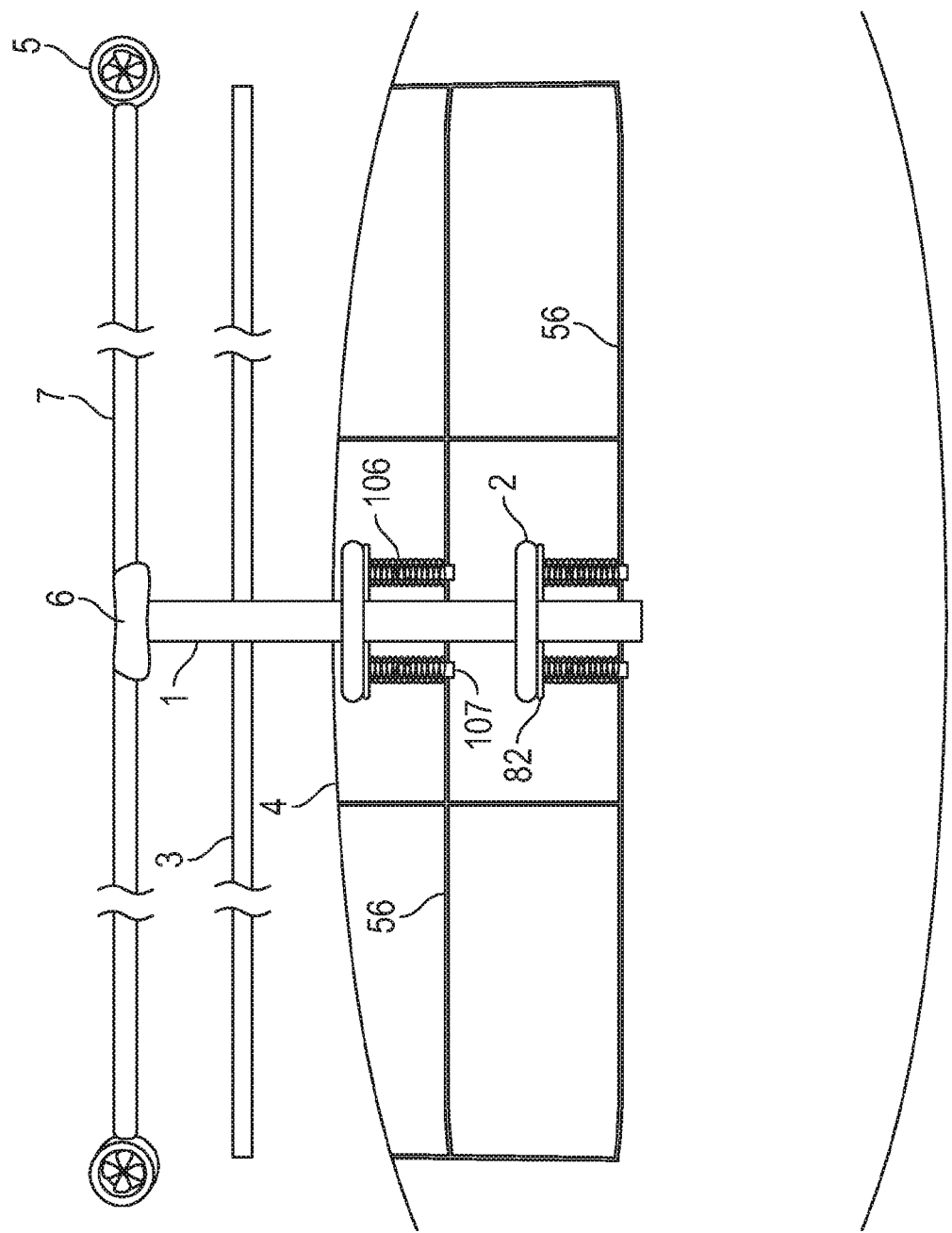
FIG. 43 is a schematic side view of one example of an aircraft propulsion system including one or more dampening elements, consistent with the present disclosure.

More specifically, FIG. 43 depicts an example embodiment in which a shock absorber 82 is disposed between support bearing 2 and fuselage structural member 56. In general, shock absorber 82 is configured to dampen or otherwise mitigate the transmission of mechanical and other forces (e.g., due to vibration, harmonic motion, instabilities, and the like) from rotor shaft 1 (and/or rotor blades 3) to fuselage 4, and vice versa. In embodiments, shock absorber(s) 82 may be in the form of a passive dampening element such as a gas, liquid, or mechanical shock absorber (e.g., a gas/liquid strut, one or more dampening springs, combinations thereof, and the like. For example, in some embodiments shock absorber 82 includes a housing (e.g., a metal body) and an elastic substance (e.g., a polymer such as rubber) that can absorb or otherwise mitigate vibration or other undesirable motion, thus limiting or preventing the transmission of such forces from rotor shaft 1 to fuselage structural member 56.

One or more active dampening elements may also be used to mitigate or prevent the transmission of vibration or other undesirable forces from rotor shaft 3 to fuselage 4. This concept is shown in FIG. 43, which depicts an example embodiment in which a vibration reducing actuator 106 is utilized. In general, vibration reducing actuator 106 is an active dampening element that acts to cancel or dampen vibration by the application of an appropriate force. For example vibration reducing actuator 106 may be configured to match and/or offset the harmonic frequency or vibrations coming from rotor blades 3 or thrust support structure 7, thereby mitigating or even eliminating their transmission to fuselage 4. In embodiments, the vibration reducing actuator 106 includes an outer (e.g., copper) coil, wherein an inner element (e.g. a ferrous rod or tube) is located within an open center of the coil. Appropriate application of electrical energy to the coil can result in the generation of an electromagnetic field that causes the position of the inner element to change. Movement of the inner element can be controlled by application of electrical energy to the coil in such a way as to cancel or mitigate incoming vibration, harmonic frequency, etc. as would be understood by one of ordinary skill in the art.

While FIG. 43 depicts the use of a single shock absorber 82 in combination with a single vibration reducing actuator 106, such a configuration is not required. It should be understood that any number of shock absorbers 82 and vibration reducing actuators 106 can be used, and that such elements may be used independently of one another. Moreover, the position and configuration of such elements is not limited to the locations shown in FIG. 43.

Figure 44:
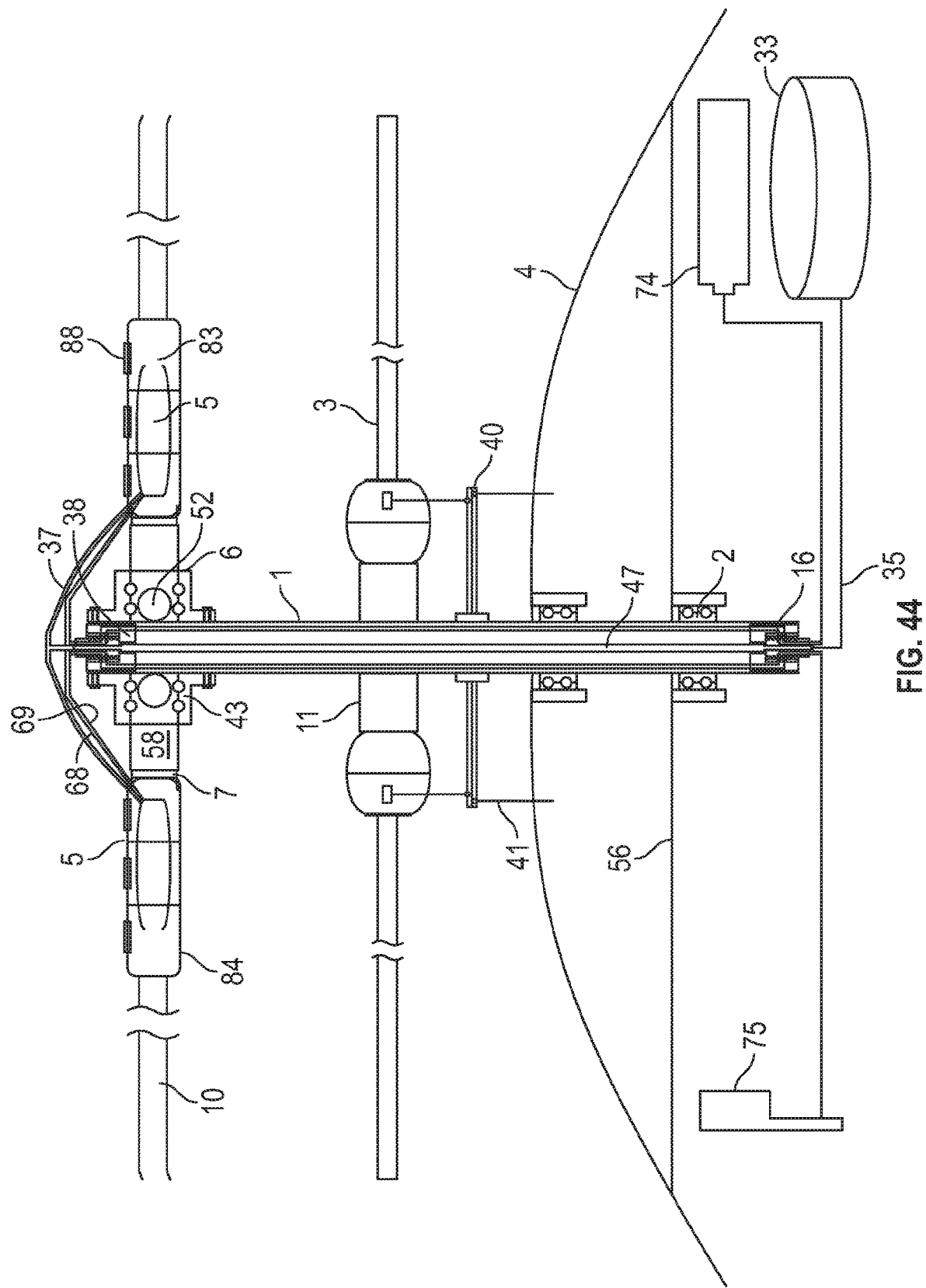
FIG. 44 is a schematic side view of an aircraft including pulsejet engine(s) consistent with the present disclosure.

Various types of engines may be used as engine(s) 5. Non-limiting examples of suitable engines that may be used as engine(s) include shaft engines such as reciprocating (piston) engines and turbine engines; reaction engines such as jet engines, pulse-jet engines, turbofan engines, and rocket engines; Wankel engines, diesel engines; electric engines; combinations thereof, and the like. In some embodiments engine(s) 5 may be a pulsejet engine. For example, in the embodiment of FIG. 44, engine(s) 5 is/are in the form of a pulsejet engine. In this embodiment, each of the engine(s) 5 is surrounded by a shell 84 and includes a vertical air intake 88. Without limitation, in embodiments shell 84 and vertical air intake 88 are configured to limit, attenuate, or even prevent sound from escaping from engine(s) into the surrounding environment and, in particular, towards the ground and/or the fuselage 4. In this instance thrust from engine(s) 5 is directed through an air gap 83 before entering ducting 10, which acts as a thrust augmenter that entrains additional air from air gap 83 to boost engine output. The thrust is then exhausted from extremities of ducting 10, causing thrust support structure to rotate. As may be appreciated, the use of shell 84 and ducting 10 can limit or prevent sound waves from escaping into the environment, reducing the amount of noise produced during operation of the aircraft.

Figure 45:
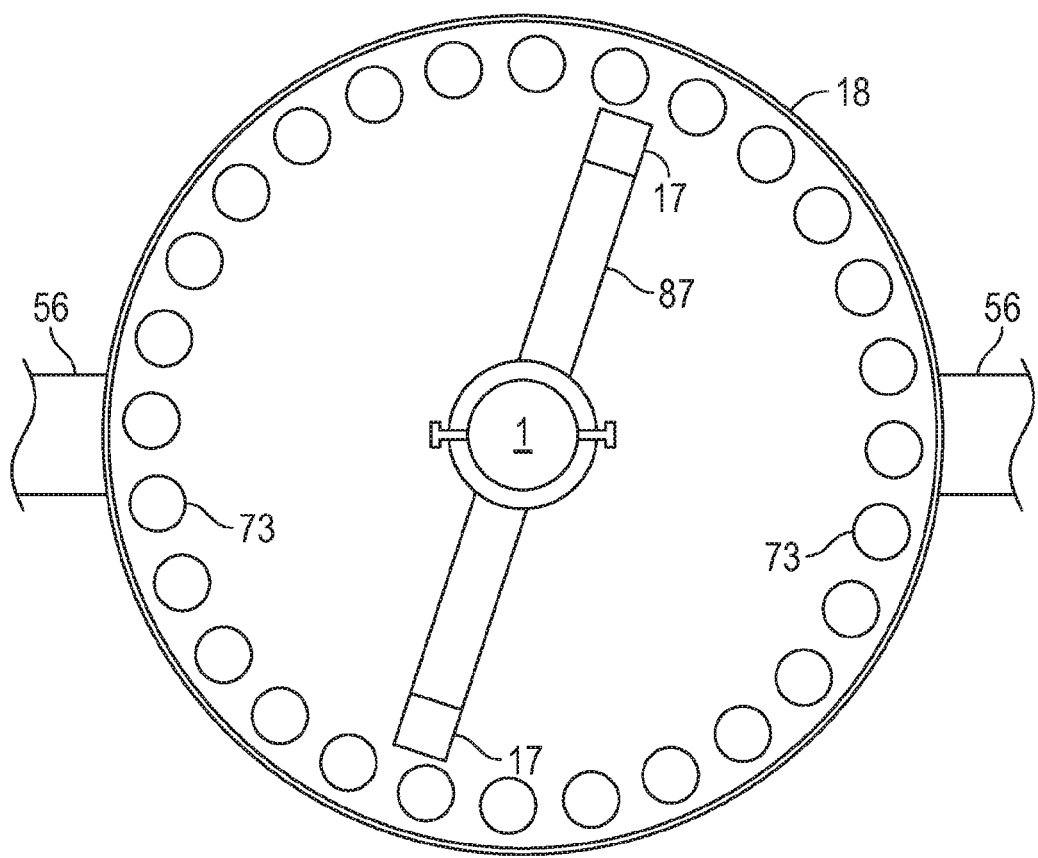
FIG. 45 depicts an example of a yaw control device consistent with the present disclosure.

As noted above various mechanisms may be utilized to provide yaw control to an aircraft consistent with the present disclosure. With that in mind, FIG. 45 depicts another example of a yaw control device consistent with the present disclosure. Like yaw control device 12 described above, FIG. 45 depicts an embodiment of a yaw control device that is in the form of an electrically reversible motor, where the shaft of the motor is the rotor shaft 1. In this case, however, the motor is a reversible motor that includes rotor magnets 17 and a rotor magnet support 87, both of which are coupled to the rotor shaft 1. The stator 18 is coupled to the fuselage 4 of the aircraft by fuselage structural member 56. By energizing the motor in one direction or another, an opposing force may be transmitted to the stator 18, which (because it is attached to the fuselage 4) causes force to be applied to the fuselage 4 for yaw control.

Figure 46:
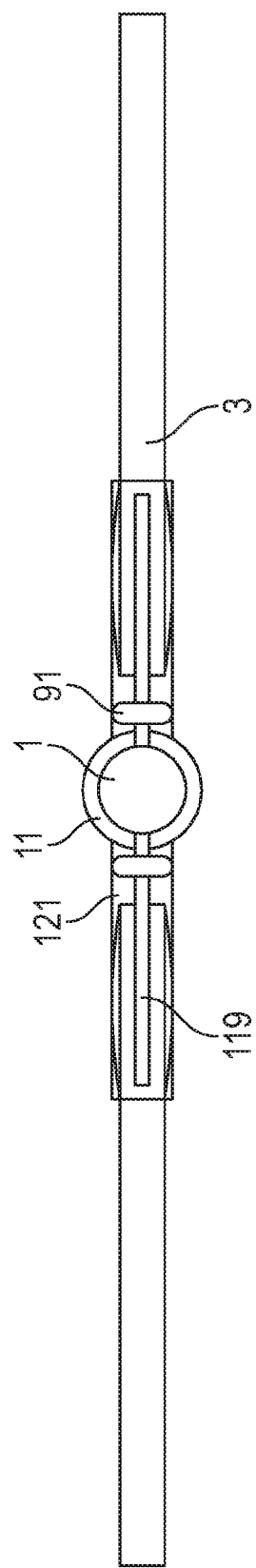
FIG. 46 is a schematic view of one example of a propulsion system including adjustable rotor blades consistent with the present disclosure.

The foregoing description focuses on embodiments in which rotor blades 3 are of a fixed length. Such a configuration is not required, however, and rotor blades of any fixed or variable length may be used as rotor blades 3. In embodiments rotor blades 3 are variable length, and may be configured to adjust and/or augment thrust produced by aircraft. For example to improve dynamic thrust in a rotor aircraft, variable length rotor blades 3 may be used, wherein the length of the rotor blades 3 may be reduced when transitioning from vertical lift to horizontal thrust for faster forward flight. In that regard reference is made to FIG. 46, which is a schematic view of one example of a system including adjustable rotor blades consistent with the present disclosure. As shown, the system includes a blade grip 121 that is attached to one (first) end of each of the rotor blades 3 (in this case, proximate rotor shaft 1). Each blade grip 121 includes a motor 91 (e.g., a linear electric or hydraulic motor) that is coupled to a lead screw 119, which in turn is coupled to (e.g., screwed) to each rotor blade 3. Operation of the motor 91 may cause lead screw to rotate, resulting in the extension or retraction of rotor blades 3. In embodiments, motor(s) 91 on opposing blade grips 94 can be linked to a common shaft (e.g., a common lead screw) to provide linear positioning of the opposing rotor blades. Of course, any other suitable mechanism for extending and retracting rotor blades 3 may also be used.

During operation, engine(s) 5 produce heat and one or more exhaust flows, which may alter the infrared signature of the aircraft. Operation of engine(s) 5 and rotation of thrust support structure 7 may cause the temperature of the thrust support structure 7 to rise. This may be undesirable in some applications, particularly military applications in which infrared signature of the aircraft is of concern. With that in mind, some aspects of the present disclosure relate to systems and methods for adjusting the temperature of a thrust support structure consistent with the present disclosure. In that regard reference is made to FIG. 47, which depicts one example of a propulsion system consistent with the present disclosure, in which various components are cooled by an air flow. In the illustrated embodiment, engine(s) 5 are in the form of jet engines that direct thrust into ducting 10 within thrust support structure 7. Compressor bleed air 85 (i.e., air taken from the compressor stage upstage of the fuel-burning section(s) of the jet engine) is directed around or injected into the thrust. Because the compressor bleed air 85 is cooler than thrust, mixing of compressor bleed air 85 with the thrust cools ducting 10 and, consequently, thrust support structure 7. This technique may be similarly applied with other types of engine(s) 5. The foregoing description often focuses on embodiments in which all or a portion of thrust support structure 7 is exposed to the external environment. While such embodiments are useful, the aerodynamics of thrust support structure 7 itself may not be ideal for some applications. For example, the shape of the thrust support structure 7 can impact the drag coefficient and efficiency of the aircraft during flight. For example if the shape of the thrust support structure 7 is spherical then the drag coefficient will be the same regardless of the aircrafts attitude during hover or in forward flight. While a spherical shaped thrust support structure can simplify the aircraft design, it may not provide a desired drag coefficient. For example, a lower drag coefficient could be obtained using airfoil shape, as opposed to a sphere.

Figure 48:
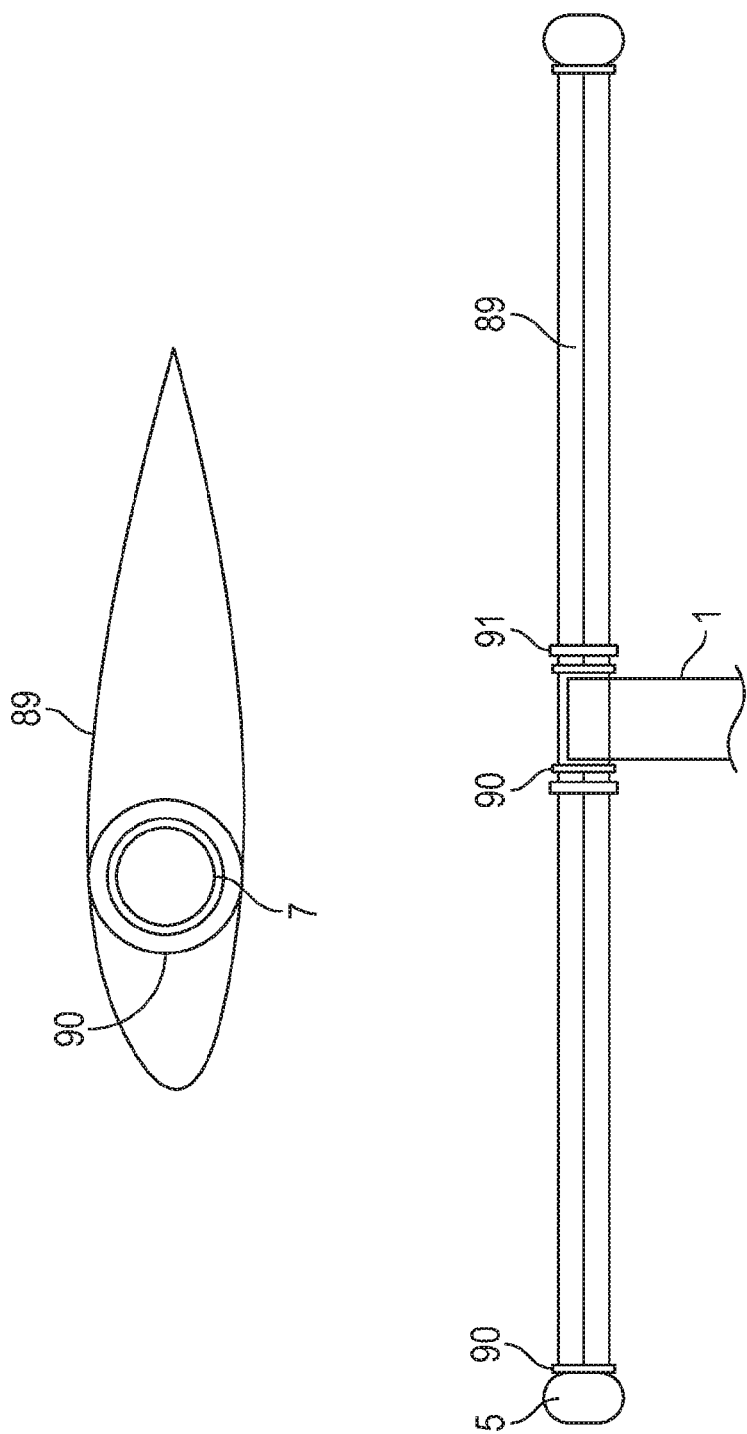
FIG. 48 depicts side and profile views of one example of a thrust support structure that includes a fairing, consistent with the present disclosure.

With that in mind, aspects of the present disclosure relate to propulsion systems that permit aerodynamic adjustment of a thrust support structure. In that regard reference is made to FIG. 48, which depicts side and profile views of one example of a thrust support structure 7 including a fairing consistent with the present disclosure. In the illustrated embodiment, thrust support structure 7 is surrounded by an airfoil shaped fairing 89. As is understood in the art, the angle of an airfoil relative to oncoming air impacts its drag profile. Thus if airfoil shaped fairing 89 is always perpendicular with rotor shaft 1 and the rotor shaft 1 is tilted forward during forward flight, the aircraft direction of travel is no longer parallel with the airfoil shaped fairing 89 and can result in unwanted drag. One option for addressing this issue is to use an airfoil shaped shell that encompasses the thrust support structure along with bearings that allow the airfoil shaped fairing 89 to rotate along the length of the thrust support structure to maintain a low drag coefficient regardless of the attitude or movement of the aircraft. In this way the airfoil shaped fairing 89 is allowed to "weathervane" into the prevailing airflow encountered by the thrust support structure 7. Motors can also be used to move the airfoil automatically based on possible sensor input to optimize its angle or motors can be manually controlled by the pilot to improve overall lift of the aircraft or create an aerodynamic braking effect as needed.

Thus, in embodiments fairing 89 is configured to allow the aerodynamics of the thrust support structure to be streamlined relative to the prevalent air flow moving around the thrust support structure 7. To that end, fairing support bearings 90 are located at each end of fairing 89, and allow fairing 89 to move freely in relation to thrust support structure 7 and engine(s) 5. One or more positioning motors 91 are included in thrust support structure 7, and may be disposed relatively close to rotor shaft 1. Such motor(s) 91 may be energized to actively change the orientation (and, hence, the aerodynamics) of fairing 89 and thrust support structure 7. Exercising appropriate control over the position of the fairing 89 (and, hence, thrust support structure 7) can allow the structure to be aerodynamically streamlined into the airflow moving around the thrust support structure 7, regardless of changes in orientation of the thrust support structure relative to the air flow.

Figure 49:
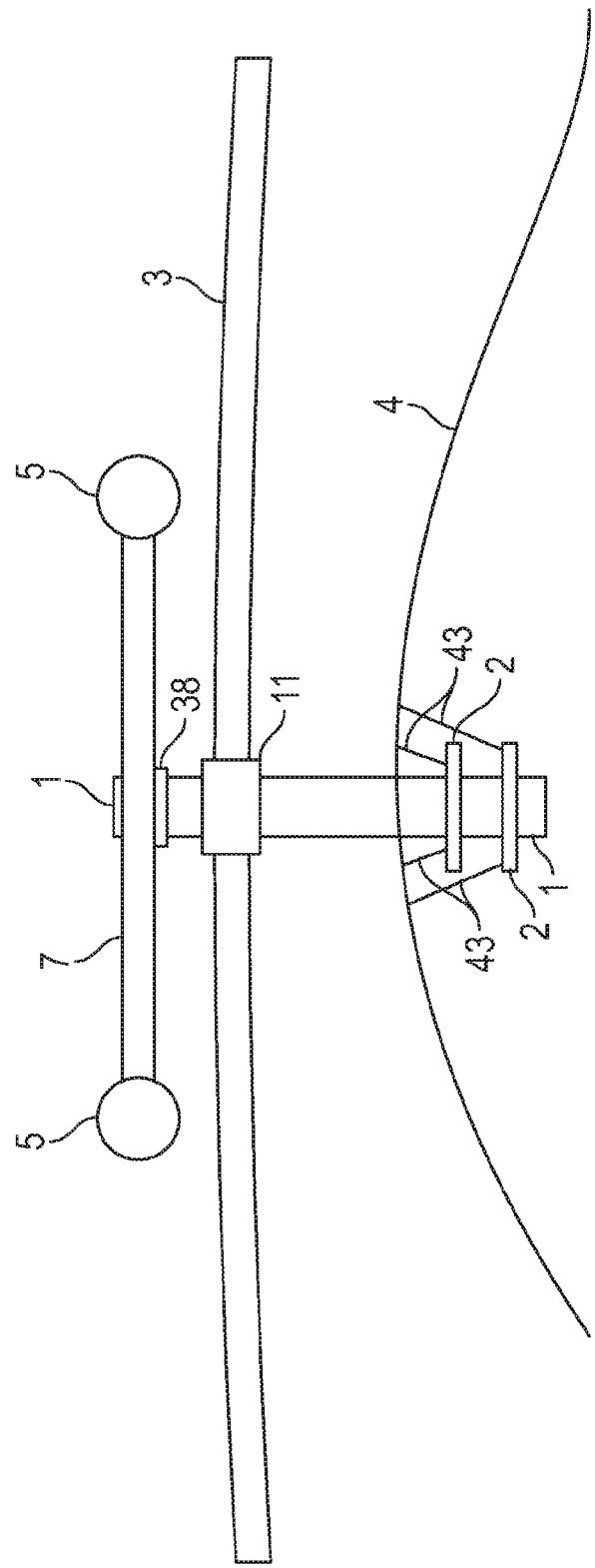
FIG. 49 illustrates an embodiment of a propulsion system in which a thrust support structure and rotor blades are connected to a rotor shaft without the use of clutch, consistent with the present disclosure.

The foregoing description often focuses on embodiments in which thrust support structure 7 and rotor blades 3 are connected to rotor shaft 1 with a clutch 6. While clutch 6 can provide numerous benefits as previously described, its use is not required. For example, FIG. 49 illustrates an embodiment of a propulsion system in which a thrust support structure 7 and rotor blades 3 are connected (e.g., rigidly connected) to rotor shaft 1 without the use of clutch 6. While the illustrated embodiment may nor provide the auto-rotation benefits of the other described embodiments, it may be of interest where such benefits are not desired. For example, such a configuration could be used for special purpose aircraft such as unmanned aerial vehicles.

As explained above regarding FIG. 42, the orientation of a propulsion system consistent with the present disclosure may transition from a vertical to a horizontal orientation, and vice versa. In such embodiments any suitable mechanism for orienting the propulsion system may be used. In that regard reference is made to FIG. 50, which illustrates an embodiment of an aircraft propulsion system in which a sliding rail system facilitates re-orientation of all or a portion of the propulsion system between a vertical orientation and a horizontal orientation. In this embodiment a frame rail guide 93 is disposed along the exterior of the fuselage 4 of an aircraft. The frame rail guide may be positioned in any suitable location, but in embodiments it is located along the middle of the fuselage 4. In addition, a rotor system cart housing 95 coupled to a base of the propulsion system of the aircraft, such that the rotor system cart housing is between the fuselage and the propulsion system. The frame rail guide 93 is configured to guide rollers 94 (or other guide elements) that are coupled to rotor system car housing 95 as the propulsion system transitions between vertical and horizontal orientations, as shown. The rollers 94 (or other guide elements) can be moved directly or indirectly (e.g., using electrical or hydraulic motors) to reposition the rotor system cart housing 95 in a vertical or horizontal orientation depending on the desired thrust line for vertical lift or horizontal thrust for forward flight. Wings 28 and horizontal stabilizer 92 may be oriented to stay relatively perpendicular to the rotor blades to provide lift and stability during forward flight.

Figure 36:
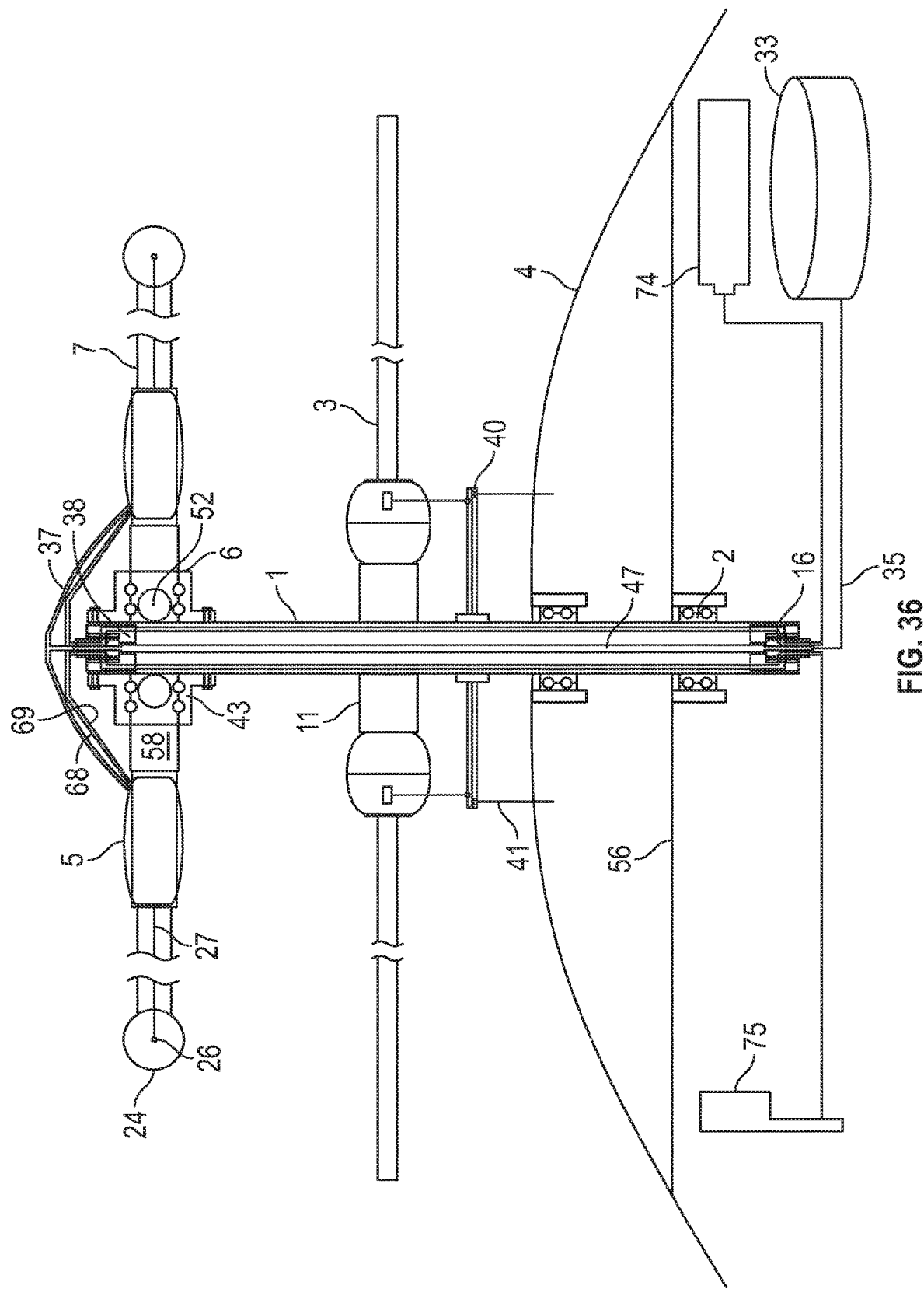
FIG. 36 is a side cross sectional view of one embodiment consistent with the present disclosure in which one or more engines are directly integrated into a thrust support structure.
Figure 37:
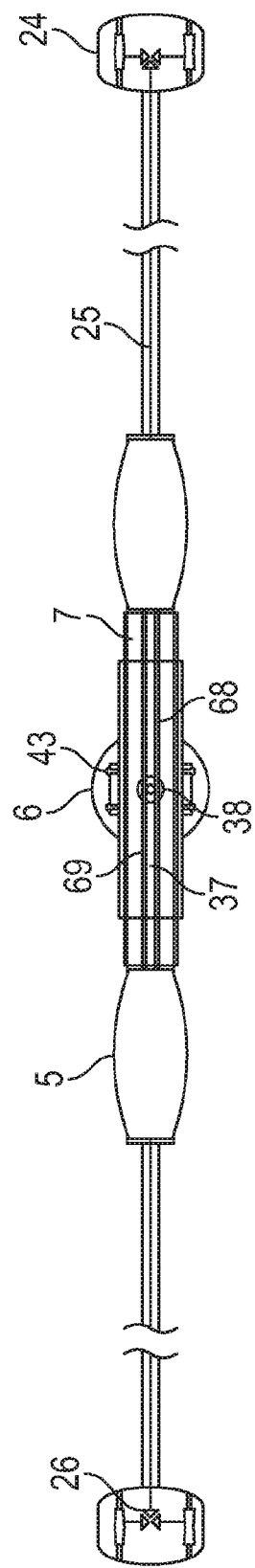
FIG. 37 is a top view of one embodiment consistent with the present disclosure in which one or more engines are directly integrated into a thrust support structure.
Figure 39:
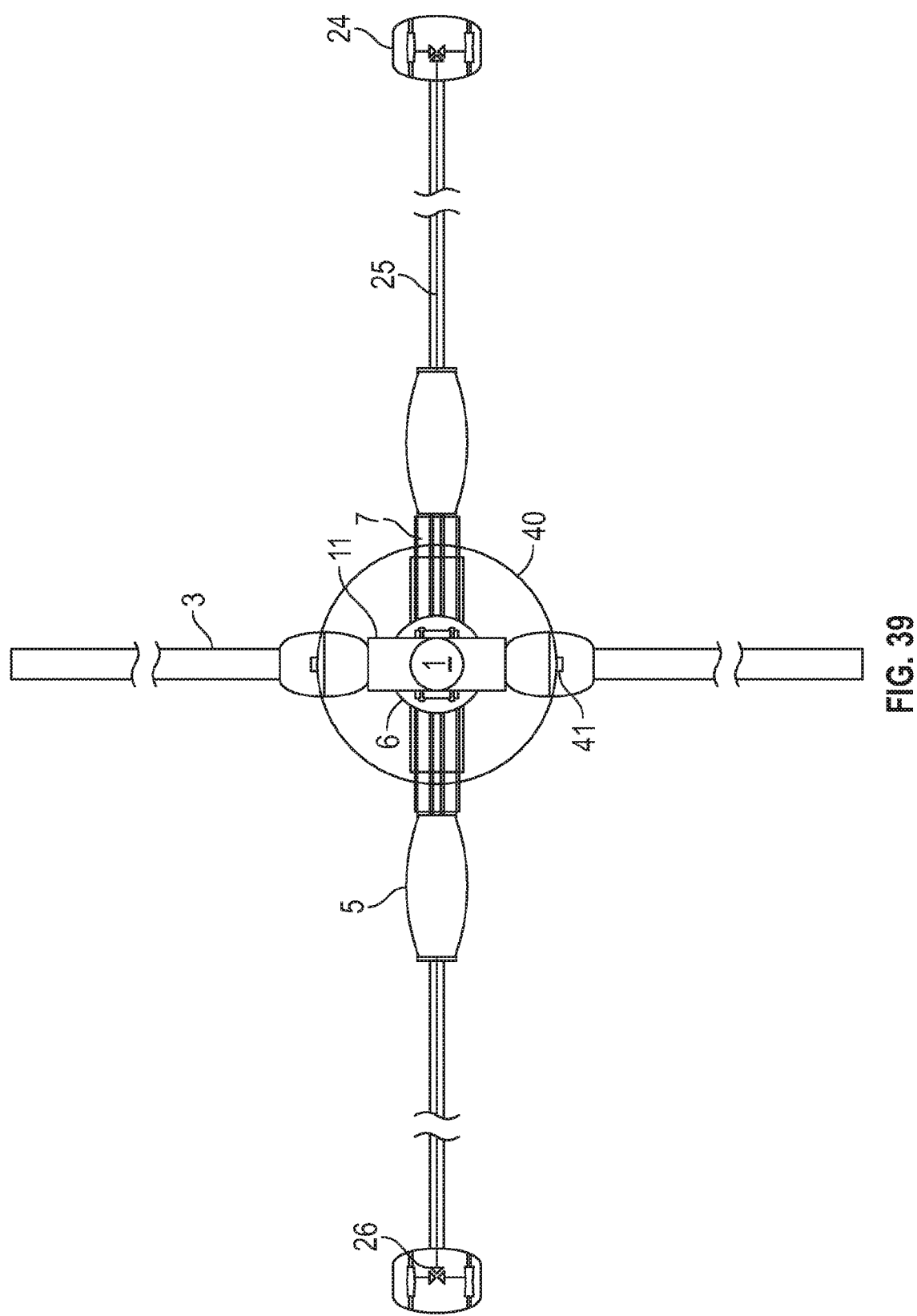
FIG. 39 is a top view of one embodiment consistent with the present disclosure in which one or more engines are directly integrated into a thrust support structure, which is directly connected to a rotor shaft.
Figure 47:
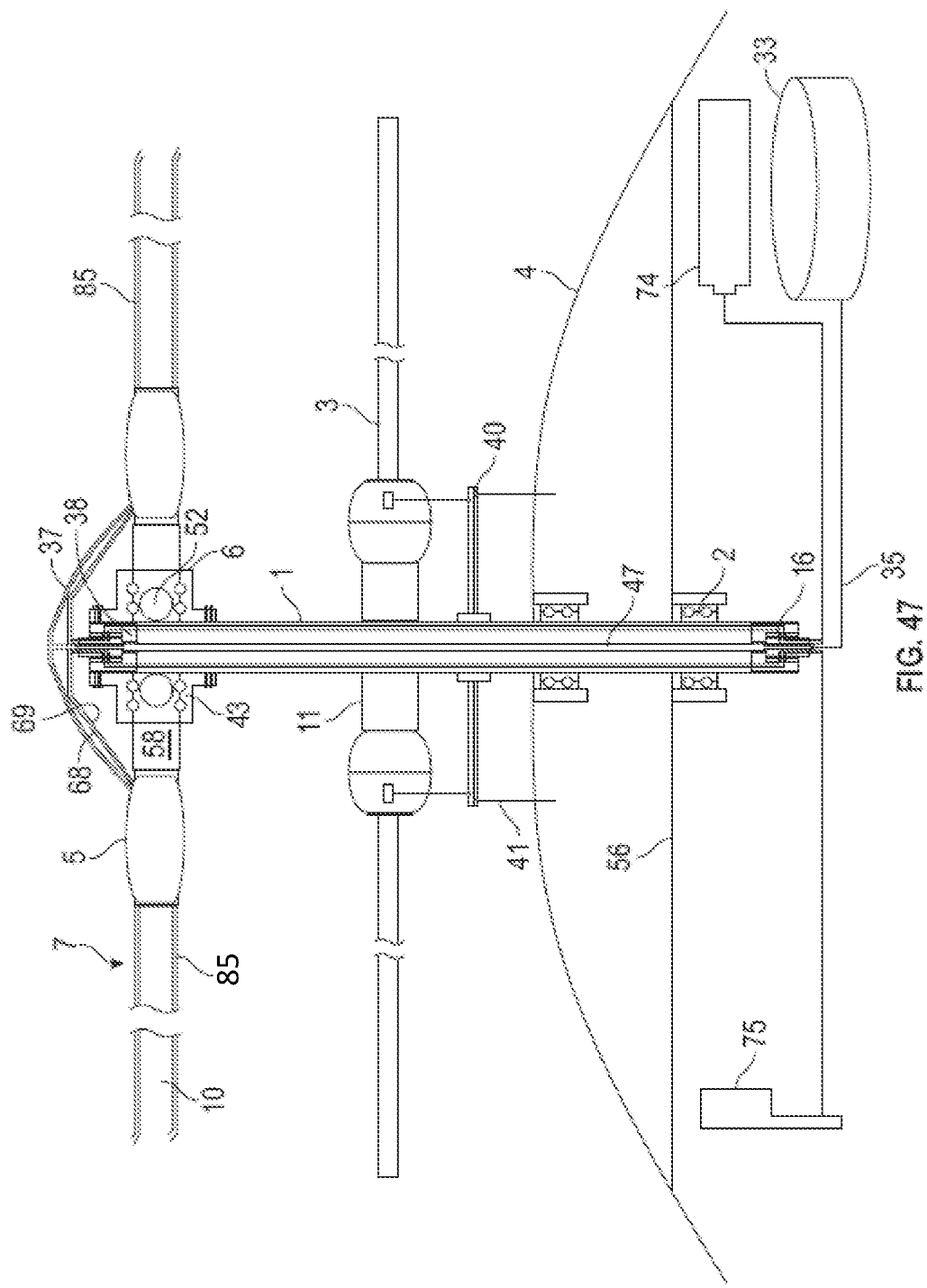
FIG. 47 is a schematic view of one example of a propulsion system consistent with the present disclosure, in which various components are cooled by an air flow.
Figure 51:
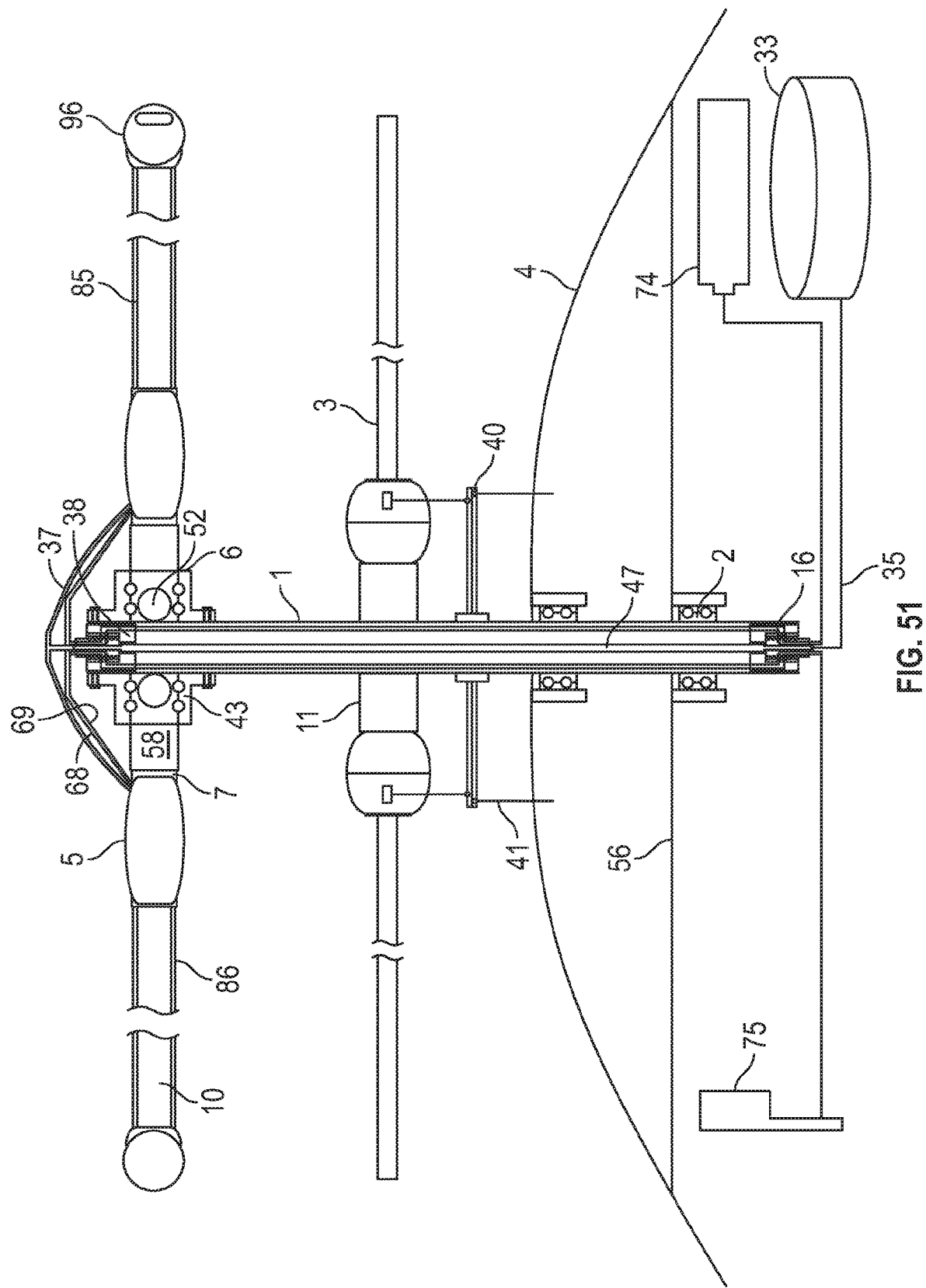
FIG. 51 is a side view of one example a propulsion system including a thrust support structure that includes one or more articulating nozzles.

Various embodiments of propulsions systems that include engine(s) 5 that are directly incorporated into a thrust support structure have been described above. For example, FIG. 47 depicts an embodiment wherein one or more jet engines is/are integrated into a thrust support structure 7 to provide thrust through ducting 10 to cause the thrust support structure to rotate. Although thrust produced by such engine(s) may be directed in a fixed direction (e.g., through a fixed nozzle), in some instances it may be desirable to control the direction of thrust exiting thrust support structure 7. In that regard reference is made to FIG. 51, which is a side view of one example a propulsion system including a thrust support structure that includes one or more articulating nozzles that permit directional thrust control. As shown, articulating nozzles 96 are coupled to corresponding extremities of thrust support structure 7, and are configured to receive thrust from ducting 10. Nozzles 96 each include an outlet (not separately labeled) through which thrust flows. The nozzles 96 may be articulated (e.g., by one or more drive motors) so as to re-position or re-orient their respective outlets, thus enabling direct control over the thrust line exiting thrust support structure 7. FIG. 36 and FIG. 37 show another embodiment in which engine(s) 5 are directly integrated into thrust support structure 7, and are located just outboard from the clutch 6. Engines 5 provide power to drive shafts 27 which are connected to gear boxes 26 to drive one or more ducted fans or propellers 24. In the embodiment of FIGS. 38 and 39, engine(s) 5 are directly integrated into thrust support structure 7 which is directly connected to rotor shaft 1. Engine(s) 5 provide power to drive shafts 27 which are connected to gear boxes 26 in order to drive ducted fans or propellers 24. Clutch 6 is integrated into rotor hub 11, thereby allowing rotor blades 3 to rotate independent of drive system components when the clutch is in a disengaged state.

Figure 52:
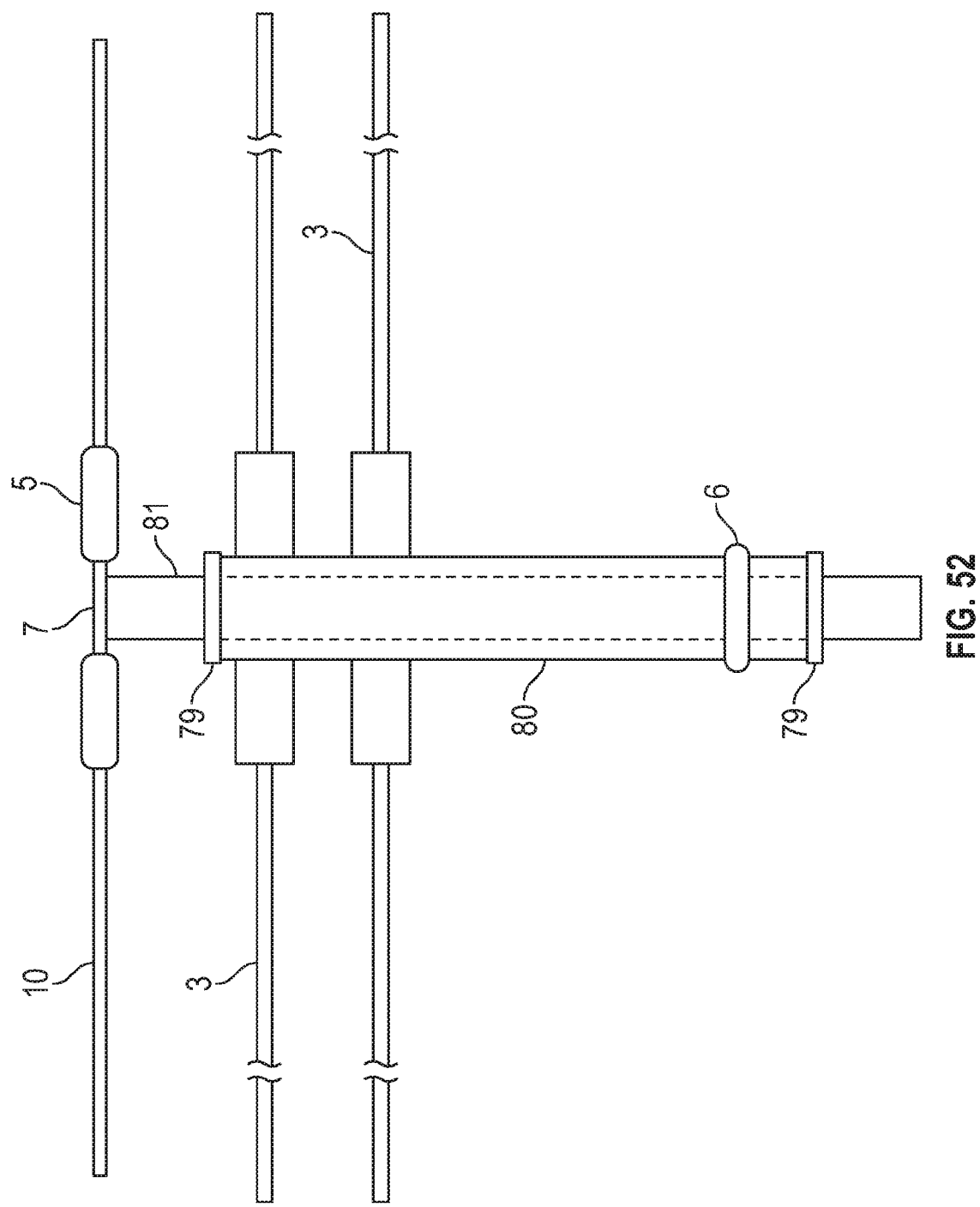
FIG. 52 depicts one example of a propulsion system that includes multiple sets of rotor blades driven by a single thrust support structure, consistent with the present disclosure.

Much of the present disclosure focuses on embodiments in which a single set of rotor blades is utilized. Such a configuration is not required, and any suitable number of rotor blades may be used. For example, one, two, three, four or more sets of rotor blades may be utilized in the aircraft propulsion systems described herein. To illustrate that concept reference is made to FIG. 52, which depicts one example of a propulsion system that includes multiple sets of rotor blades driven by a single thrust support structure, consistent with the present disclosure. In this embodiment, thrust support structure 7 provides torque through the inner shaft 81. The torque is transmitted by the inner shaft 81 to the outer shaft 80 via clutch 6 to drive multiple sets of rotor blades 3, each of which is attached to outer shaft 80. The position of each set of rotor blades may vary, and may be set to achieve desired flight characteristics. In the embodiment of FIG. 52, for example, the two sets of rotor blades 3 may be mounted parallel, but offset on the same axis from each other (e.g., by about 1 to about 10 degrees), e.g., to improve aerodynamic and acoustic performance. Such an arrangement can also generate greater lift by allowing the lower set of rotors 3 to capture the wake of the upper set of rotors 3. Moreover, both sets of rotors may be driven in the same direction to avoid wake interference issues encountered with counter rotating blades. And the use of multiple sets of rotors 3 may allow the generation of an equivalent amount of lift as a single set of rotor blades 3, but within a smaller footprint.

The technologies described herein may be implemented in a wide variety of aircraft designs, and are not limited to use in relatively conventional helicopter designs such as those illustrated in many of the figures. Indeed the technologies described herein have utility in any type of aircraft design that could benefit from their use. For example, the technologies of the present disclosure may be used in hybrid aircraft such as compound helicopters, compound gyroplanes, either of which may be referred to as a heliplane. In such aircraft lift a helicopter like rotor system may be used during takeoff and landing, and a secondary propulsion system (e.g., a push or pull propeller, one or more jet engines, one or more turbofan engines, or the like) is used to provide horizontal (forward and/or backward) thrust during flight. Lift may also be generated by wings during forward/reverse flight, allowing the speed of the helicopter like rotor blades to be reduced.

Figure 53:
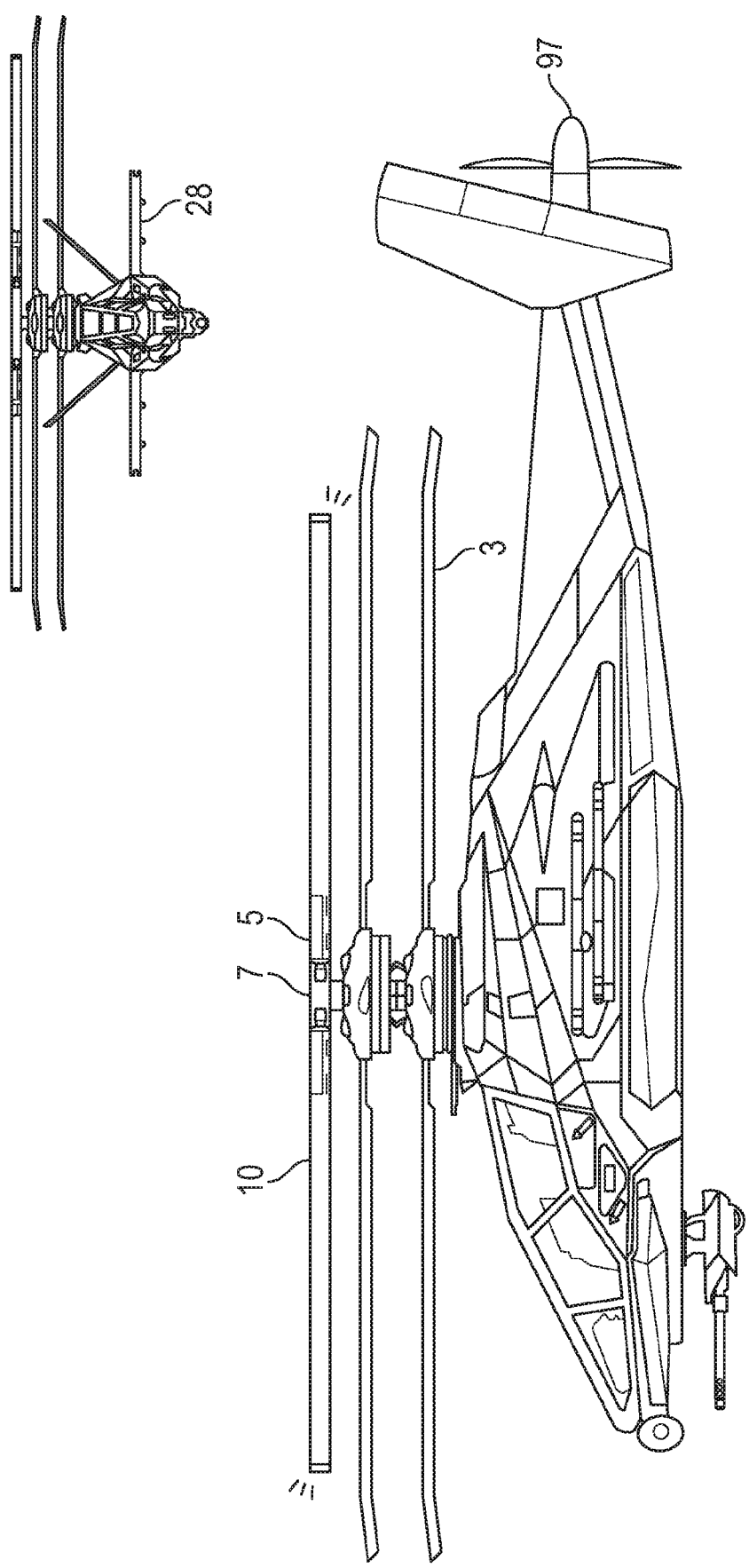
FIG. 53 depicts one example of the use of the technologies of the present disclosure in the context of a compound helicopter.

FIG. 53 depicts one example of the use of the technologies of the present disclosure in the context of a compound helicopter. In the illustrated embodiment, the aircraft is a compound helicopter that includes a multiple sets of coaxial rotor blades 3 that are driven by thrust support structure 7 (including engines 5 and ducting 10). The aircraft further includes a thruster 97 to provide forward thrust during flight. In this embodiment thruster 97 is a single push propeller, but it should be understood that any suitable type and number of thrusters may be used. For example, thruster 97 may be one or more jet engines, turbofan engines, rocket engines, fans, propellers, combinations thereof, and the like.

In operation the coaxial rotor blades 3 may be used for lift and the thruster 97 may be used to accelerate, decelerate, or keep the aircraft stationary depending on the desired flight condition. When the aircraft is in forward flight lift may also be provided by wings 28. In such embodiments, due to the reduced need for lift provided directly by the rotors 3 in forward flight the speed of rotors 3 may be reduced, e.g., by throttling back the engine(s) 5 and/or temporarily shutting them down. In such instances the motor(s) (not shown) used in hover for yaw control may be re-tasked to provide constant low power to the rotor shaft 1 (not labeled in FIG. 53) to maintain stability and control. Yaw movement (if any) occurring in such a condition may be offset by the use of stabilizers (e.g., vertical stabilizers—not shown), which may be trimmed accordingly.

Figure 54:
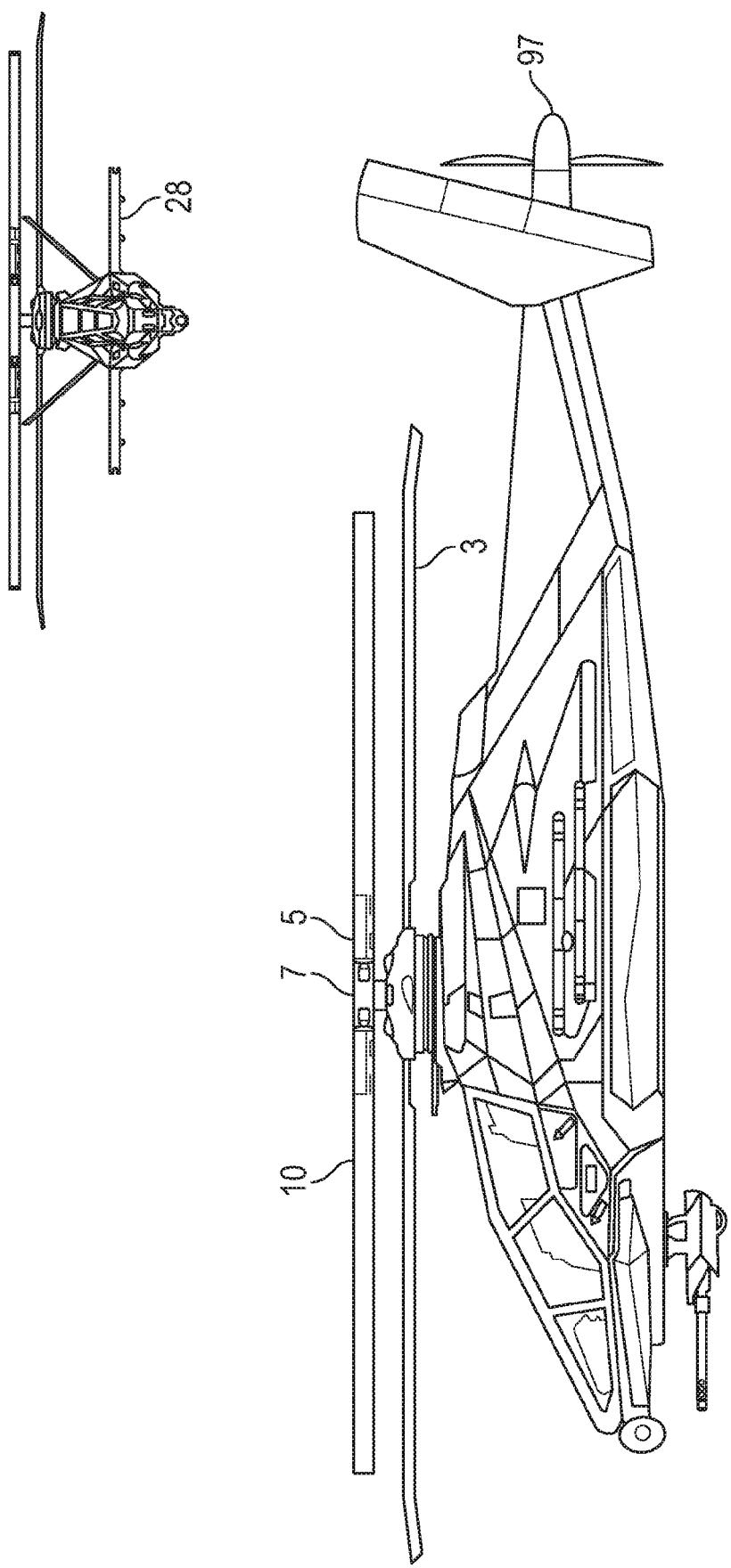
FIG. 54 depicts another example of the use of the technologies of the present disclosure in the context of a compound helicopter.

FIG. 54 depicts another example of the use of the technologies of the present disclosure in the context of a compound helicopter. This example is substantially similar to the embodiment of FIG. 53, except that a single set of rotor blades 3 is used, instead of a plurality of coaxial rotor blades as was used in the embodiment of FIG. 53. As the nature and function of the elements of FIG. 54 are the same as shown and described above regarding FIG. 53, they are not reiterated here in the interest of brevity.

Figure 55:
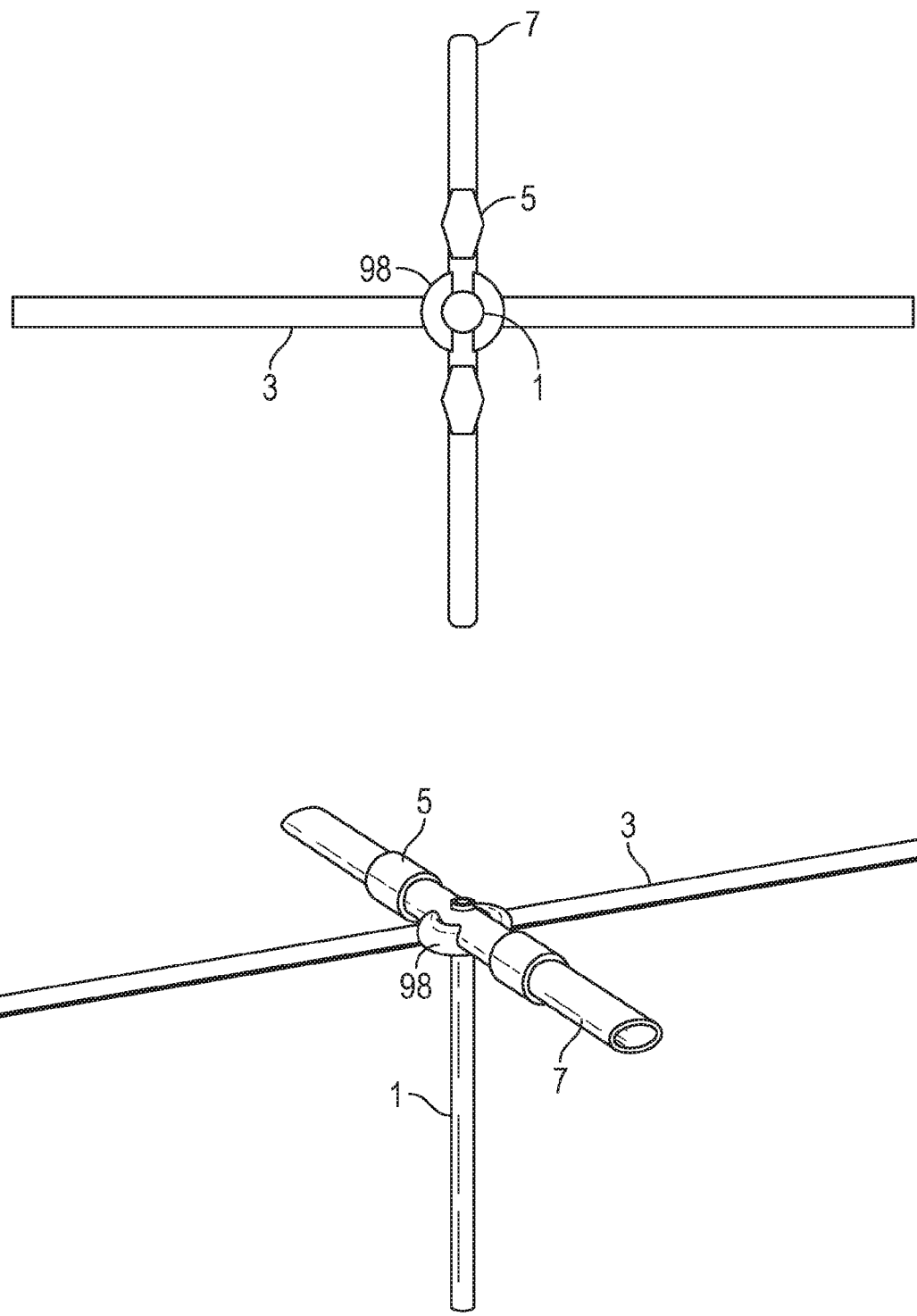
FIG. 55 depicts top and side views of one example of a propulsion system consistent with the present disclosure, wherein the propulsion system does not include a clutch and includes a thrust support structure and rotor blades that are within the same plane.

Many of the foregoing embodiments utilize a propulsion system that includes a clutch 6, a thrust support structure 7, and one or more sets of rotor blades 3, wherein the thrust support structure 7 and rotor blades 3 are coupled to and vertically offset from one another along the rotor shaft 1. Such a configuration is not required, and the present disclosure encompasses embodiments in which clutch 6 is not used, and/or wherein rotor blades 3 and thrust support structure are coupled to rotor shaft 1 and are located in the same plane. One example of this concept is shown in FIG. 55, which depicts top and side views of one example of a propulsion system consistent with the present disclosure, wherein the propulsion system does not include clutch 6 but includes a thrust support structure 7 and rotor blades 3 that are in the same plane. More particularly, in this embodiment thrust support structure 7 and rotor blades 3 are integral with or coupled common structural hub 98, which in turn is integral with or coupled to rotor shaft 1. The common structural hub 98 is integral with or otherwise fixedly attached to rotor shaft 1 by any suitable means, such as via one or more fasteners, mechanical interference joints, welds, bonds, combinations thereof, and the like. More particularly, common structural hub is integral with or coupled to rotor shaft 1 such that its position remains fixed relative to the position of rotor shaft 1 (i.e., common structural hub 98 does not rotate independently of rotor shaft 1). Likewise, thrust support structure 7 and rotor blades 3 may be integral with or coupled to common structural hub 98 by any suitable means, such as via one or more fasteners, mechanical interference joints, welds, bonds, combinations thereof, and the like. In operation engines 5 cause thrust support structure 7 to rotate. The resulting torque is transferred thrust support structure 7 to common structural hub 98, and then to rotor shaft 1, causing rotor shaft 1 to rotate. Because common structural hub 98 is fixedly attached to rotor shaft 1, rotation of the rotor shaft 1 ultimately causes rotor blades to rotate.

Various embodiments have been described above in which jet or other engines are coupled to or integral with a thrust support structure, and are operable to generate thrust in the form of an air flow that is directed through ducting to cause the thrust support structure to rotate. While such embodiments are useful, the use of ducted air flows through a thrust support structure is not required and other configurations may be used. For example, one or more engines coupled to or integral with a thrust support structure may be coupled to one or more drive shafts, which in turn may be coupled to one or more fans. In operation, the engine(s) may cause the drive shafts to drive the fan(s) to produce an airflow, which may be expelled in a fixed or variable direction to cause the thrust support structure to rotate.

Figure 56:
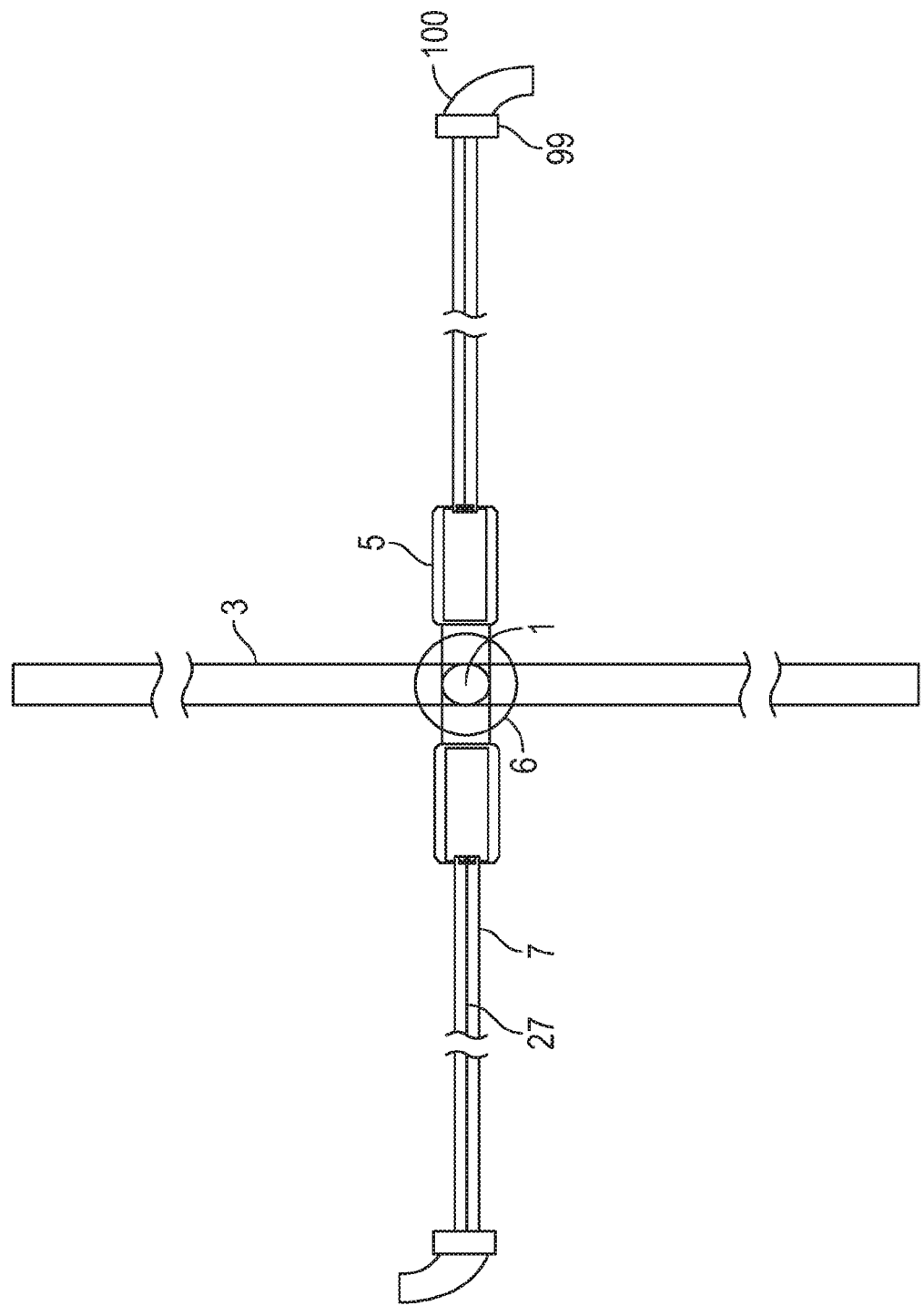
FIG. 56 depicts one embodiment of the present disclosure wherein one or a plurality of fan units is driven by an engine to produce an air flow that may be directed in a fixed or variable direction.

FIG. 56 depicts one embodiment of the present disclosure wherein one or a plurality of fans is driven by a motor to produce an air flow that may be directed in a fixed or variable direction. More specifically, FIG. 56 depicts an embodiment wherein a plurality of engines 5 are coupled to or integral with a proximal end of thrust support structure 7, and are disposed proximate to rotor hub 1. A first (proximal) end of a drive shaft 27 is coupled to each engine 5. Each drive shaft 27 may be disposed external to thrust support structure 7, or may run through a channel within thrust support structure 7. In any case, a second (distal) end of each drive shaft 27 is coupled to a fan unit 99 that is located at a distal end of thrust support structure 7. In operation, engines 5 cause drive shafts 27 to cause fan units to produce an air flow. Each fan unit 99 is oriented to produce an airflow that is in the same or substantially the same plane as thrust support structure 7. Doing so may facilitate even loading on the fan blades and fan blade hub (not shown) of each fan unit while the thrust support structure 7 is in motion.

In this embodiment, airflow guide vane nozzles 100 are coupled to each fan unit 99, and are configured to direct the air flow produced by each fan unit 99. In the illustrated embodiment, airflow guide vane nozzles 100 are static nozzles that are configured to redirect airflow from fan units 99 to a desired exit angle, in this case roughly 90 degrees relative to a plane of the thrust support structure 7. The illustrated configuration is for the sake of example only, and guide vane nozzles 100 may be configured to redirect an air flow produced by fan units 99 to any desired exit angle. And in embodiments, the guide vane nozzles 100 and/or the outlets thereof may be articulated (e.g., by one or more motors, not shown), thereby enabling dynamic control over the airflow exit angle. Control over the exit angle may be exercised to redirect airflow to a desired angle to produce thrust to move thrust support structure 7 and clutch 6. For example, use of guide vane nozzle 100 may enable the air flow produced by fan units 99 to be redirected from 0 to 180 degrees or more, relative to the plane of the thrust support structure.

One advantage of locating engine(s) 5 proximate to rotor shaft 1 and fan units 99 near the distal end of thrust support structure 7 is that centripetal force applied while the thrust support structure 7 is in motion may be partially offset by blade-loading created from the production of thrust by fan units 99. Such blade-loading may pull fan blades of the fan units 99 back towards the drive shaft 27 and engine(s) 5. Moreover, because drive shafts 27 may be much thinner than thrust support structure 7, the configuration of FIG. 56 may allow the use of a thinner intermediate portion of thrust support structure 7, relative to the portion of the thrust support structure 7 that includes ducting 10.

Figure 57:
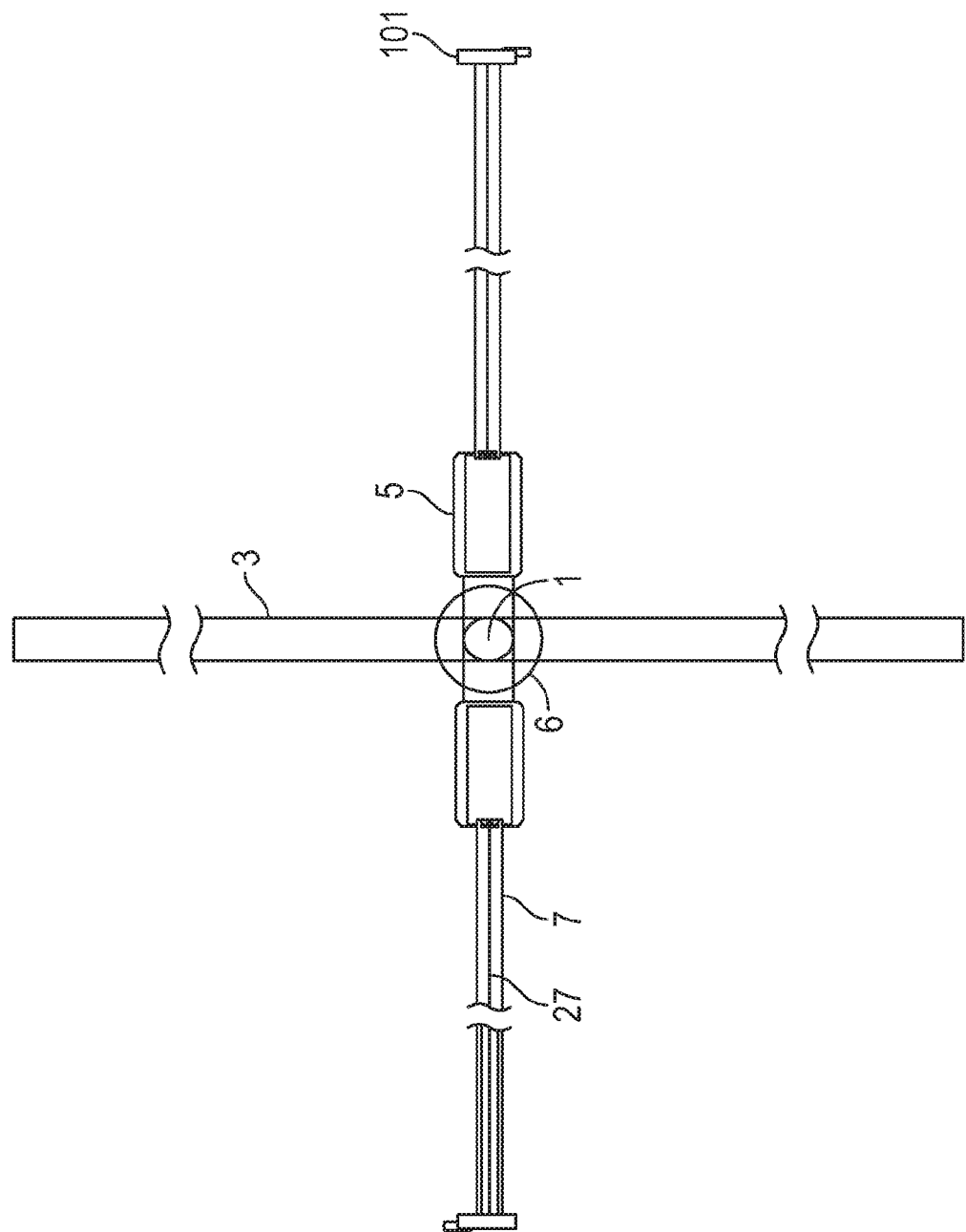
FIG. 57 depicts another example of the present disclosure in which one or a plurality of fan units is driven by an engine to produce an air flow that may directed in a fixed or variable direction.

FIG. 57 depicts another example of the present disclosure in which one or more fan units located on or proximate to a distal end of a thrust support structure 7 are utilized to generate thrust to cause the thrust support structure to rotate. In this embodiment the fan units 99 are in the form of centrifugal blowers 101. Like fan units 99, centrifugal blowers 101 are driven by a drive shaft 27, which in turn is driven by one or more engine(s) 5. In operation, each centrifugal blower 101 is driven by drive shaft 27 to produce an air flow that creates torque to drive the thrust support structure 7 and, in turn, causes the rotor blades 3 to rotate. The orientation of the centrifugal blowers 101 may be set so as to achieve a desired aerodynamic condition. For example and as shown in FIG. 57, centrifugal blowers 101 may be relatively long along a first axis, but relatively thin along a second axis that is transverse to the first axis. In such instances the centrifugal blowers 101 may be oriented such that their long dimension (along the first axis) is transverse (e.g., perpendicular or substantially perpendicular) to an axis extending along the length of thrust support structure 7. In contrast, the short dimension of the centrifugal blowers 101 may be oriented parallel or substantially parallel to the axis extending along the length of thrust support structure 7. In such a configuration the relatively thin dimension of the centrifugal blowers 101 is presented in the direction of rotation of thrust support structure 7, which may reduce or minimize induced drag created by the centrifugal blowers 101 as thrust support structure 7 rotates.

Like FIG. 56, the embodiment of FIG. 57 allows the use of drive shaft(s) 27, enabling the use of a lower profile thrust support structure 7, relative to that of a thrust support structure that includes ducting 10. And like guide vane nozzles 100, the orientation of centrifugal blowers 101 may be fixed or articulated. In the latter instance, articulation of the centrifugal blowers 101 may enable dynamic control over the exit angle of the air flow they produce.

Figure 41:
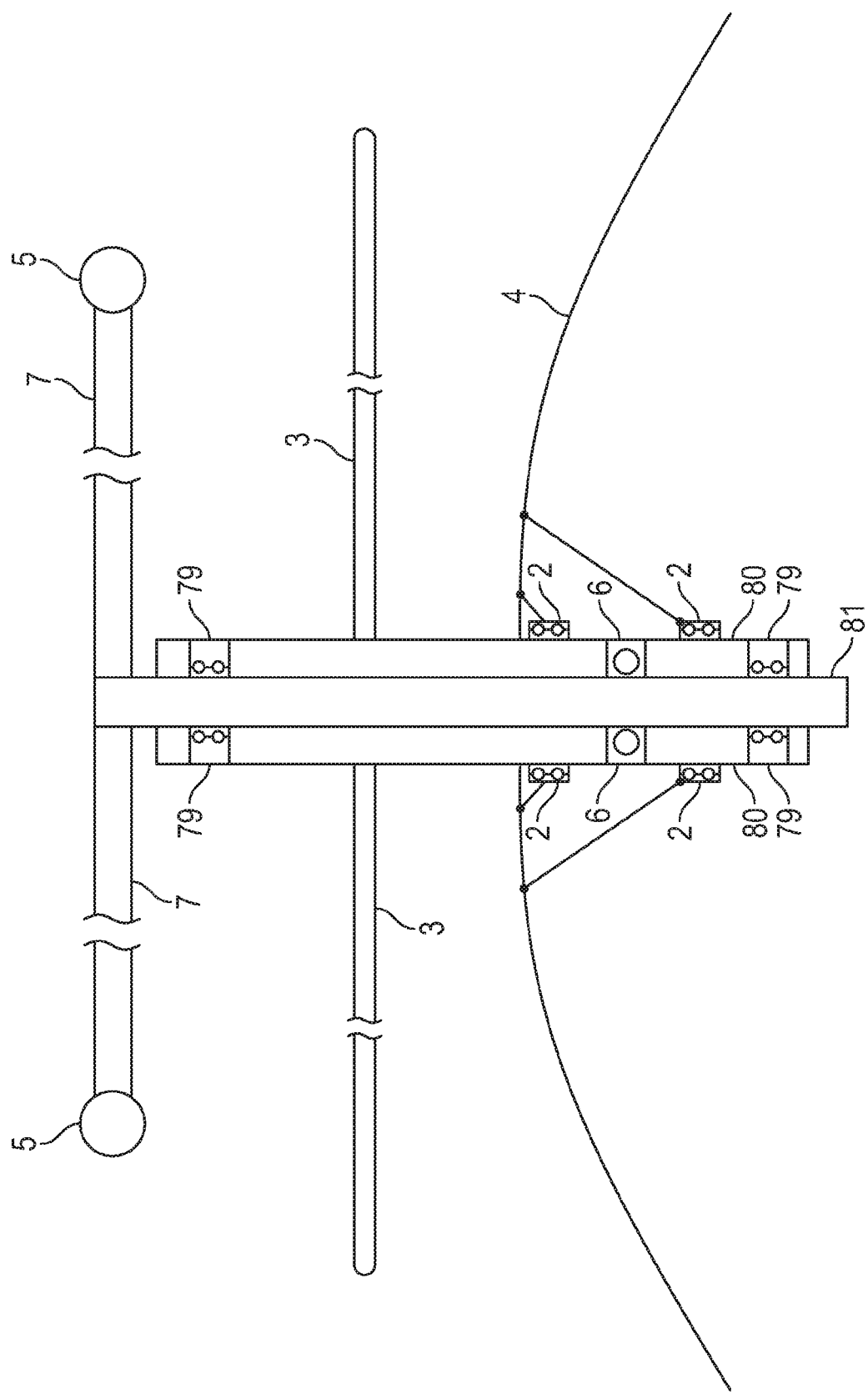
FIG. 41 is a schematic side view illustrating an embodiment of the present disclosure in which concentric inner and outer shafts are used to support and/or isolate various components of an aircraft.

FIG. 41 depicts another embodiment in accordance with the present disclosure, wherein concentric shafts are used to support and isolate various components of an aircraft. As shown, outer shaft 80 is directly connected to rotor blades 3, and is supported and isolated from the fuselage by support bearings 2. Inner shaft 81 is disposed within outer shaft 80 and is directly connected to thrust support structure 7, which in turn is connected to engine(s) 5. Inner shaft 81 is supported and isolated from outer shaft 80 by concentric shaft bearings 79, which are disposed between an inner surface of outer shaft 80 and an outer surface of inner shaft 81. Clutch 6 is configured to engage or disengage the inner shaft 81 and/or outer shaft 80, and may be disposed at any suitable location. For example and as shown in FIG. 41, clutch 6 may be disposed within the outer shaft 80 (i.e., between outer shaft 80 and inner shaft 81), and configured to engage and disengage with the inner shaft 81. While FIG. 41 depicts an embodiment in which thrust support structure 7 is coupled to inner shaft 81 and rotor blades 3 are coupled to outer shaft 80, such a configuration is not required and it should be understood that thrust support structure and rotor blades 3 may each be coupled to the inner shaft 81 or the outer shaft 80.

Figure 58:
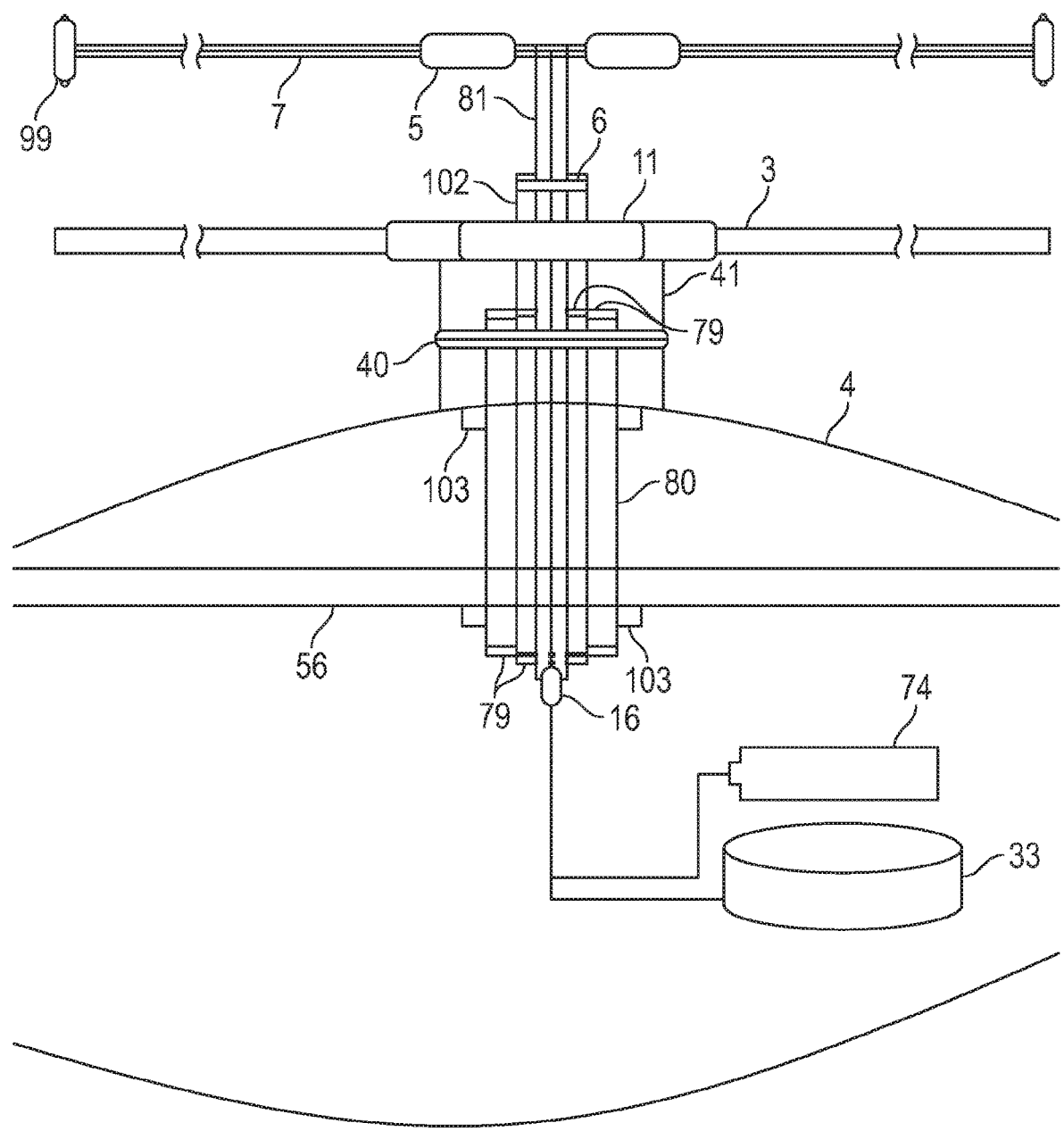
FIG. 58 is a side view of another example embodiment of the present disclosure, wherein separate shafts are utilized for different components of an aircraft propulsion system.

FIG. 58 is a side view of another embodiment of the present disclosure, wherein separate shafts are utilized for different components of an aircraft propulsion system, such as the control system, rotor system, and drive system. The nature and function of many of the elements of FIG. 58 is the same as described above in connection with other embodiments, and so is not reiterated in the interest of brevity. In this embodiment the illustrated propulsion system includes an outer shaft 80, an inner shaft 81, and a middle shaft 102. The middle shaft 102 is disposed between the outer shaft 80 and the inner shaft 81. The outer shaft 80 is affixed to fuselage structural member 56 (e.g., by shaft mounts 103) such that it does not rotate. Pitch control rods 41 are connected to swash plate 40 which is linked to the rotor blades 3 to provide rotor control. The middle shaft 102 is isolated from outer shaft 80 by concentric bearings 79. The rotor hub 11 and rotor blades 3 are directly connected to and supported by the middle shaft 102. The inner shaft 81 is isolated from middle shaft 102 by concentric shaft bearings 79 and is only connected to the middle shaft 102 by a clutch 6 when torque from thrust support structure 7 and engine(s) 5 driving fan units 99 generate thrust—causing the inner shaft 81 and the middle shaft 102 to rotate in unison. This arrangement provides a robust support system for various components of the propulsion system and allows for direct replacement or servicing of such components. This also allows the components to be modular upgraded independently as improvements or the mission of the aircraft changes. Fuel tank 33 and battery 74 are connected to engine(s) 5 through lower rotary union 16 and connections that run along the interior of inner shaft 81. The other components shown in FIG. 58 are described in other embodiments, and are merely shown to illustrate a complete embodiment in which multiple shafts may be used. Of course, multiple shafts may be used in other embodiments as well. One advantage of the use of multiple shafts is that it permits the components of the propulsion system to be modular and upgradeable independently or as a unit.

Figure 59:
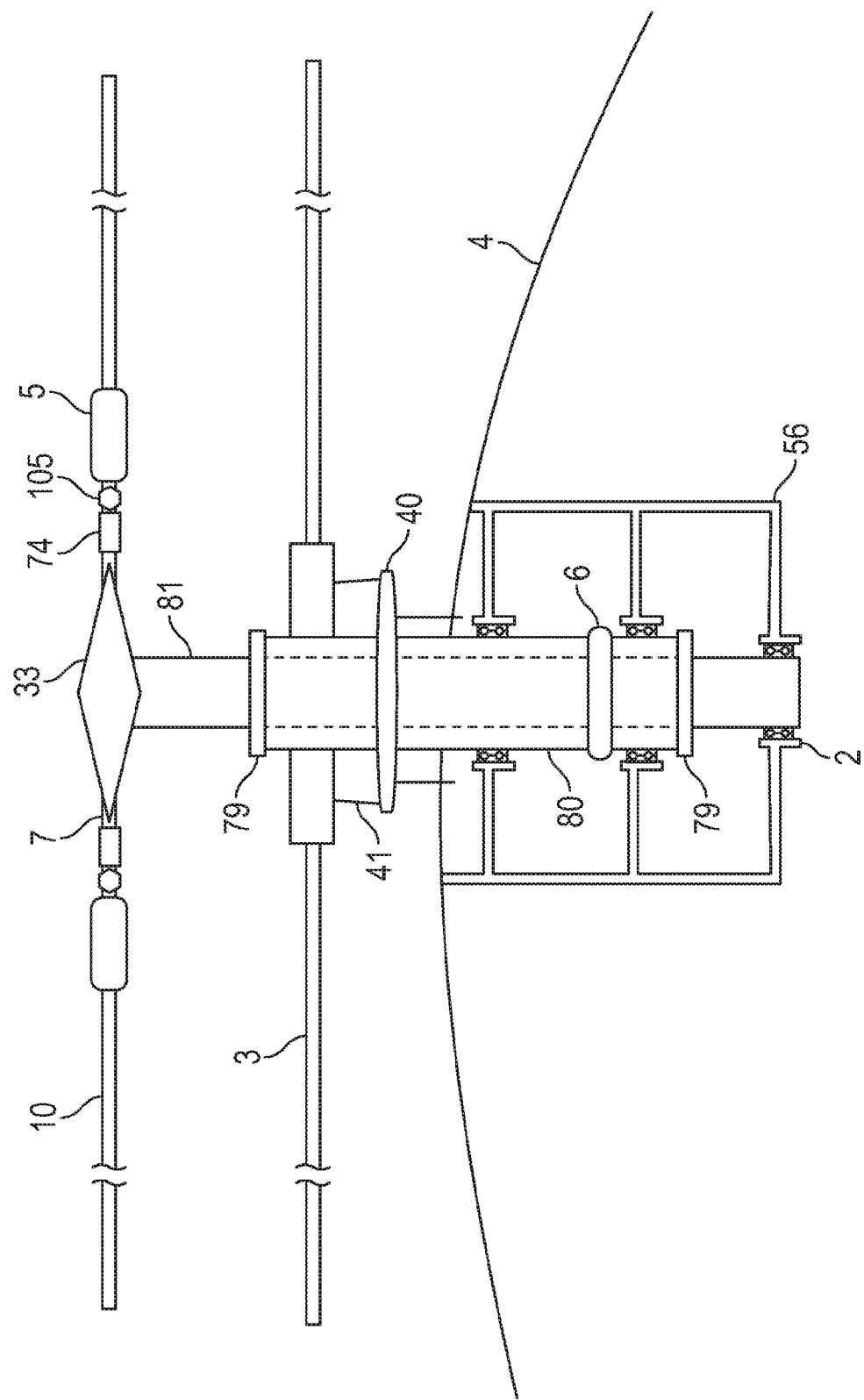
FIG. 59 is a side view of another example embodiment of the present disclosure, wherein a fuel tank, battery, and engines are coupled to a thrust support structure.
Figure 60:
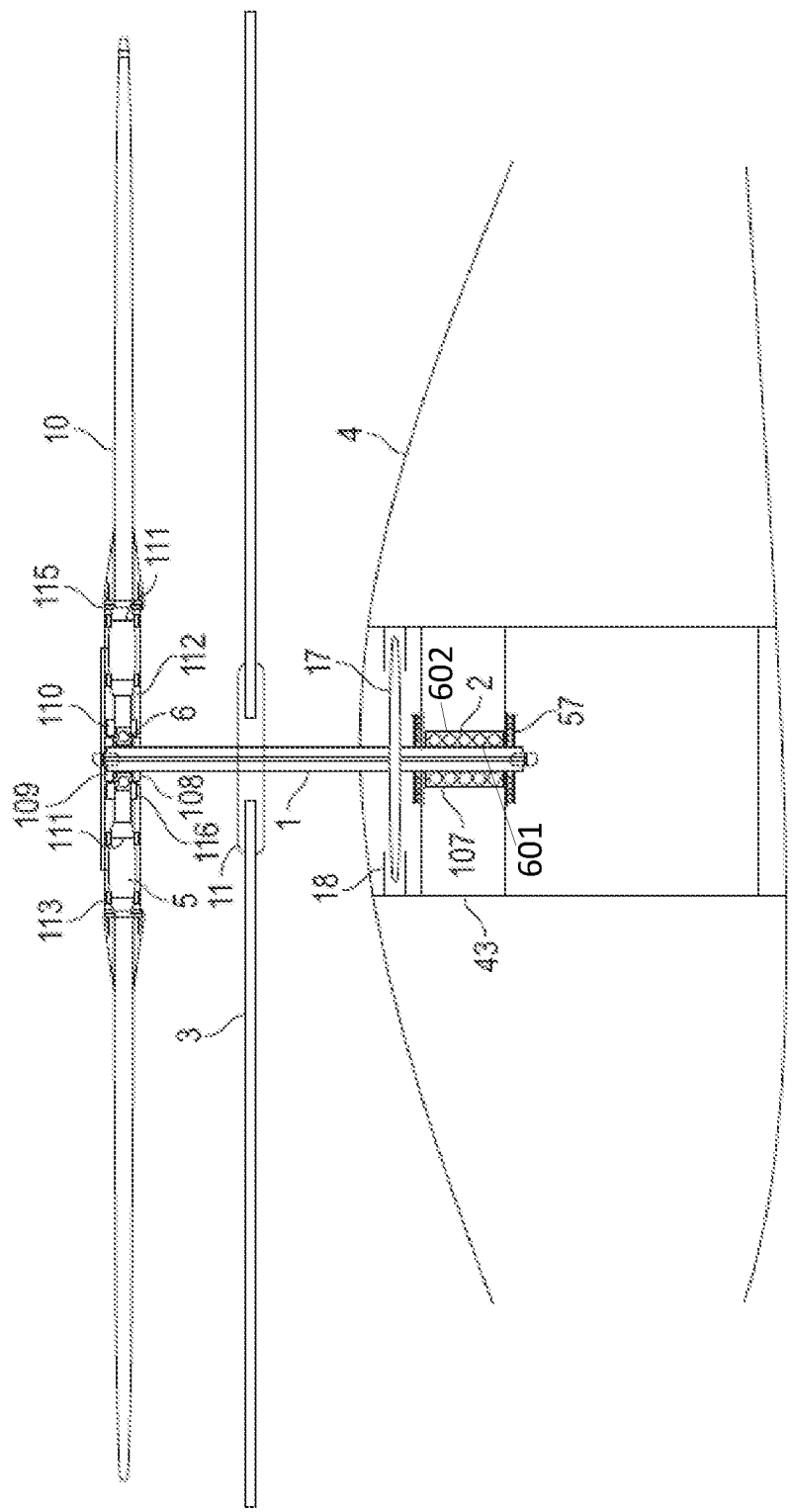
FIG. 60 is a schematic side cross sectional view of another embodiment of an aircraft including a propulsion system consistent with the present disclosure.

In many of the above embodiments, energy sources such as fuel tanks and batteries are located within the fuselage of an aircraft, and are coupled to components external to the fuselage visa fuel lines, wires, and the like. Such a configuration is not required, and energy sources such as batteries, fuel tanks, and the like may be located elsewhere. In that regard reference is made to FIG. 59, which depicts a side view of one example of an aircraft propulsion system in which energy sources such as fuel tanks and batteries are integral with or coupled to a thrust support structure. Rotor blades 3 and swash plate 40 connect to outer shaft 80 are supported by a separate set of support bearings 2 that are connected to fuselage structural member 56. Fuel tank 33, battery(ies) 74 and engine(s) 5 are all attached to thrust support structure 7, eliminating the need to run power lines, fuel lines, and the like through inner shaft 81. In addition, wireless control/telemetry module(s) 105 allow communication and signaling data for engines(s) 5. Consequently, inner shaft 81 may be serviced without the need to remove or move fuel lines, power cables, control lines, etc. that may otherwise be routed there through. For example, inner shaft 81 may be removed from fuselage 4 by disconnecting connections at support bearings 2, concentric shaft bearings 79 and clutch 6. Such a configuration may also eliminate the need for shaft seals and/or slip rings that may be used to route fuel lines, control lines, power lines, etc. between shafts. FIG. 60 is a schematic side cross sectional view of another embodiment of an aircraft including a propulsion system consistent with the present disclosure. In this embodiment rotor shaft 1 extend into fuselage 4 and is supported by a bearing support structure 43 and one or more support bearings 2 within thrust bearing assembly 57. In this embodiment the support bearings 2 are disposed within a bearing housing 107, and include ball bearings that are between an inner and outer race cage 601, 602. In any case, the support bearings 2 inner and outer races 602, 603 are configured to support the loads of the rotor shaft 1.

Support bearings 2 are coupled to bearing support structure 43 by any suitable means, such as by bearing housing 107 that is attached (e.g., by a weld, a mechanical fastener, or the like) to bearing support structure 43. In embodiments, bearing support structure 43 is in the form of a hollow tubular frame that is formed from any suitable material such a metal, alloy, composite or other appropriate material having sufficient strength and properties to support the loads transferred from rotor shaft 1 to the support bearing(s) 2. Bearing support structure 43 is attached to fuselage 4 in any suitable manner (e.g., by a weld, a mechanical fastener, or the like).

In embodiments the outer race of support bearing(s) 2 is coupled to bearing support structure 43 via bearing housing 107, and the inner race of support bearing(s) 2 is coupled to the outer surface of rotor shaft 1 (e.g., via a mechanical fastener, a weld, or other suitable fastening means). In such embodiments the rotational torque produced by rotation of rotor shaft 1 does not exceed the ability of support bearing(s) 2 to isolate fuselage 4 from such torque.

The embodiment of FIG. 60 further includes rotor magnets 17 and a stator 18. The rotor magnets 17 are arranged on a disk shaped structure that is coupled at its hub to rotor shaft 1, such that the disk shaped structure and the rotor shaft can rotate together in unison. The stator 18 in this embodiment is in the form of a pair of (e.g., metal) plates and metal (e.g., copper) coils, which are located above and below rotor magnets 17 and are coupled to the fuselage 4 by baring support structure 43. Of course the stator 18 is not limited to the illustrated configuration, and may include one or more than one pair of plates and coils, depending on the amount of yaw control needed for the aircraft.

In this embodiment rotor blades 3 are coupled to rotor hub 11, which in turn is coupled to rotor shaft 1. Consequently, rotation of rotor shaft 1 causes rotor blades 3 to rotate. The illustrated embodiment also includes a lower shaft flange collar 108 and upper shaft flange collar 109, which are coupled to the rotor shaft 1 near an upper extremity thereof. In this embodiment the lower shaft flange collar 108 and the upper shaft flange collar 109 are above the rotor blades 3, and provide an attachment point for clutch 6 to rotor shaft 1.

The clutch 6 is configured to engage/disengage the rotor shaft 1 with/from the thrust support structure 7. As discussed above, clutch 6 can be a one way bearing or other similar device that can engage and disengage two rotating structural members. An inner race of clutch 6 is coupled between lower shaft flange collar 108 and upper shaft flange collar 109, e.g., via a mechanical fastener or through other means, so that it is attached to upper frame rail flange 110 lower frame rail flange 116 and can rotate with rotor shaft 1.

In the embodiment of FIG. 60 the thrust support structure 7 includes upper frame rail flange 110, lower frame rail flange 116, frame rail(s) 112, cross member(s) 111, engine mount(s) 113, engine(s) 5, ducting flange 115, and ducting 10. The centerlines of the thrust support structure 7 extend perpendicular to rotor shaft 1 and are 180 degrees apart. The upper frame rail flange 110 and lower frame rail flange 116 may be constructed of any suitable material, such as one or more metals, alloys, composites, or the like. The upper frame rail flange 110 and lower frame rail flange 116 are coupled to the outer race of clutch 6 in any suitable manner, such as via a weld, a mechanical fastener, or the like.

In general, frame rail(s) 112 provide structural support and couple to engine mount(s) 113, which are fastened to frame rail(s) 113 in any suitable manner. In embodiments the frame rail(s) 112 are formed from one or multiple structural rails that include any suitable number of reinforcing cross members 111. Engine(s) 5 are mounted longitudinally and between the frame rail(s) 112. For example, engine(s) 5 may include mounting points on both sides thereof (e.g., near both their intake and exhaust sections), and may be mounted between the frame rail(s) 112 via such mounting points. The frame rail(s) 112 are also coupled to ducting flange 115. The ducting flange 115 encompasses the exhaust path of the engine(s) 5 and allows their thrust to be transferred to ducting 10. Ducting 10 can be a simple round, oval, or streamlined shaped hollow tube made of metal or composite materials or other material that is adequate to entrain airflow and maintain structural integrity against heat and centripetal forces. In embodiments ducting 10 extends from ducting flange 115 near the exhaust path of engine(s) 5 to an appropriate length in order to allow the high velocity airflow emerging from engine(s) 5 to provide thrust at the outer extremities of ducting 10 in order to generate the rotational torque required to power rotor blades 3 and provide adequate lift for flight.

Rotation of a thrust support structure consistent with the present disclosure may in and of itself provide lift that may be utilized to promote flight of an aircraft, reducing or even eliminating the need for a rotor blade separate from the thrust support structure. Put in other terms, the thrust support structures consistent with the present disclosure may be configured to serve as a rotor blade for an aircraft. Such configurations may provide various advantages, including but not limited to eliminating, reducing, or optimizing drag associated with structures above the aircraft fuselage. For example, when the thrust support structure functions as a rotor blade for an aircraft, the need for a separate rotor blade may be reduced or even eliminated, limiting or even eliminating drag and other inefficiencies attributable to the use of a separate rotor blade. Elimination of the separate rotor blade may also reduce or eliminate the need for a clutch to engage and disengage the rotor blade from the rotor shaft—avoiding the mechanical complexity and efficiency considerations associated with the use of a clutch. Accordingly, embodiments of the present disclosure relate to a propulsion system for an aircraft, wherein a thrust support structure is configured to function as a rotor blade.

Example of that concept are shown in FIGS. 61-64, which depict various embodiments of a propulsion system consistent with the present disclosure, wherein the propulsion system includes a thrust support structure 7 that is configured to function as a rotor blade. In such embodiments the propulsion system includes a rotor hub 11 or common structural hub 98, as described previously. Engine(s) 5 are coupled to the rotor hub 11 or common structural hub 98, such that a proximal end(s) thereof is/are disposed close to (i.e., proximal to) the rotor hub 11 or common structural hub 98. Thus, it should be understood that at least a portion of engine(s) 5 is fully or partially supported by common structural hub 98/rotor hub 11. Engine(s) 5 are also coupled to ducting 10. Alternatively, engine(s) 5 may be integral with (e.g., housed within) rotor hub 11 or common structural hub 98.

Ducting 10 including one or more channels 10' therein. As shown, a proximal end of ducting 10 is coupled to the distal end engine(s) 5. For the sake of illustration, the embodiments of FIGS. 61-64 show engine(s) 5 as being disposed in the same plane as ducting 10 and common structural hub 98/rotor hub 11, such that a proximate end of ducting 10 is directly coupled to a distal end of engine(s) 5. That configuration is not required, and engine(s) 5 and ducting 10 may be arranged in any suitable manner. For example, engine(s) 5 may be offset above or below or to the side of the rotor hub 11/common structural hub 98, and ducting 10 may be coupled thereto by a connection member comprising one or more channels that may be fluidly coupled to channel(s) 10'.

More generally, engine(s) 5 may be coupled to ducting 10 in any suitable manner. For example and as shown in FIGS. 61-64, engine(s) 5 may be coupled to ducting 10 via coupler 120, as shown. In general, coupler 120 functions to fluidly couple ducting 10 to engine(s) 5, e.g., via a rotating joint, gas seal, or blade grip. In any case, coupled 120 may include at least one through channel (not shown) that is configured to fluidly couple with engine(s) 5 and channel(s) 10' of ducting 10. Consequently, thrust produced by engine(s) 5 may flow through the through channel(s) of coupler 120 and into channel(s) 10'. In embodiments, coupler 120 permits thrust generated by engine(s) to be transmitted into channel(s) 10' while still permitting ducting 10 to pivot about an axis, e.g., in the same manner as an articulatable rotor blade. In that regard coupler 120 may be in the form of a rotatable joint, rotatable gas seal, or rotatable blade grip. In such instances, the orientation of ducting 10 may be controlled via control arms 41 or a swash plate 40, as shown.

Ducting 10 may have any external shape that is capable of generating lift as the thrust support structure rotates. For simplicity and ease of illustration, ducting 10 is illustrated in FIG. 61 in the form of a hollow ellipsoid, but any other suitable shape may be used as would be understood by those of skill in the art. In embodiments, ducting 10 is in the form of an airfoil having one or more channels 10' therein, but any known or hereafter developed rotor blade shape may also be used. In embodiments the external shape of ducting 10 is configured such that a portion thereof generates a majority of the lift as thrust support structure 7 is rotated about the axis of rotor hub 11/common structural hub 98. For example, the external shape of ducting 10 may be configured such that an outer third of ducting 10 provides a majority of the lift. In such embodiments, the external shape of the ducting may be the same as or similar to the shape of the rotor blade used in the tip-jet driven Sud-Ouest Djinn helicopter.

Figure 62:
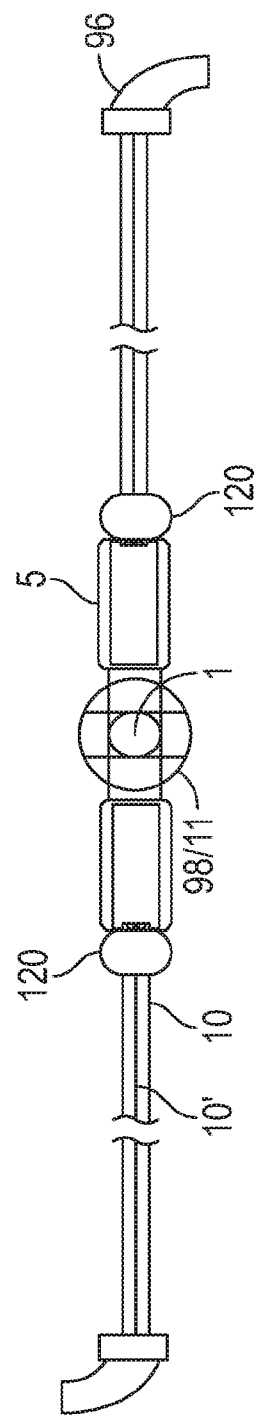
FIG. 62 depicts one embodiment of the present disclosure wherein a thrust support structure consistent with the present disclosure is configured to function as a rotor blade for an aircraft, and an airflow produced by one or more engines is directed in a fixed or variable direction.

In any case, the ducting 10 may be fluidly coupled to engine(s) 5, such that thrust (e.g., in the form of exhaust, compressor bleed air, or the like) is directed through the channels 10', e.g., towards a distal end of ducting 10. The thrust (air flow) may be directed out of the channel(s) 10' in such a way as to cause the thrust support structure to rotate. For example and as shown in FIG. 62 (and consistent with the description of FIG. 56 above), the propulsion system may be configured to generate an air flow that is the same or substantially the same plane as thrust support structure 7. To that end and as shown in FIG. 62, in embodiments the propulsion system includes airflow guide vane nozzles 100 that are coupled to the distal end of ducting 10. Consistent with the description of FIG. 56, air flow guide vane nozzles 100 are configured to direct the air flow produced by engine(s) 5 and flowing through channels 10'. In the embodiment of FIG. 62, airflow guide vane nozzles 100 are static nozzles that are configured to redirect airflow from ducting 10' to a desired exit angle, e.g., about 90 degrees relative to a plane of the thrust support structure 7. The illustrated configuration is for the sake of example only, and guide vane nozzles 100 may be configured to redirect an air flow produced by engine(s) 5 to any desired exit angle. In embodiments, the guide vane nozzles 100 and/or the outlets thereof may be articulated (e.g., by one or more motors, not shown), thereby enabling dynamic control over the airflow exit angle. Control over the exit angle may be exercised to redirect airflow to a desired angle to produce thrust to move thrust support structure 7 and clutch 6 (when used). For example, use of guide vane nozzle 100 may enable the air flow produced by engine(s) 5 to be redirected from about 0 to about 180 degrees or more, relative to the plane of the thrust support structure 7.

Figure 63:
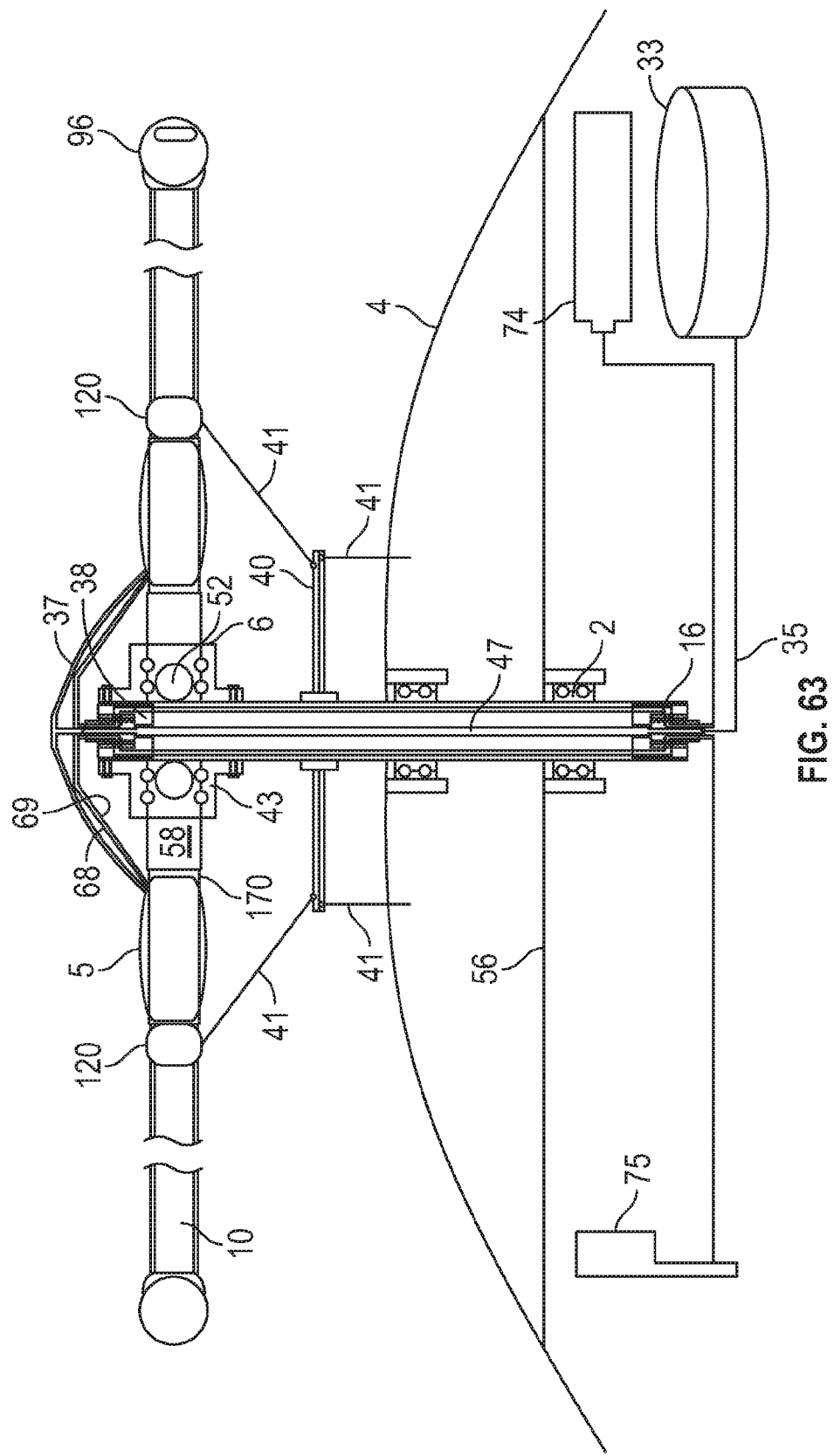
FIG. 63 is a schematic side cross sectional view of another embodiment of an aircraft including a propulsion system consistent with the present disclosure, wherein the propulsion system includes a thrust support structure configured to function as a rotor blade of the aircraft.

FIG. 63 is a side view of one example a propulsion system including a thrust support structure that functions as a rotor blade, and which includes one or more articulating nozzles that permit directional thrust control. As shown, articulating nozzles 96 are coupled to corresponding extremities of ducting 10, and are configured to receive and thrust from channel(s) 10'. Nozzles 96 each include an outlet (not separately labeled) through which thrust flows. The nozzles 96 may be articulated (e.g., by one or more drive motors) so as to re-position or re-orient their respective outlets, thus enabling direct control over the trust line of air (thrust) exiting thrust support structure 7. The other components shown in FIG. 63 have been described in other embodiments, and so are not re-described here in the interest of brevity.

Figure 64:
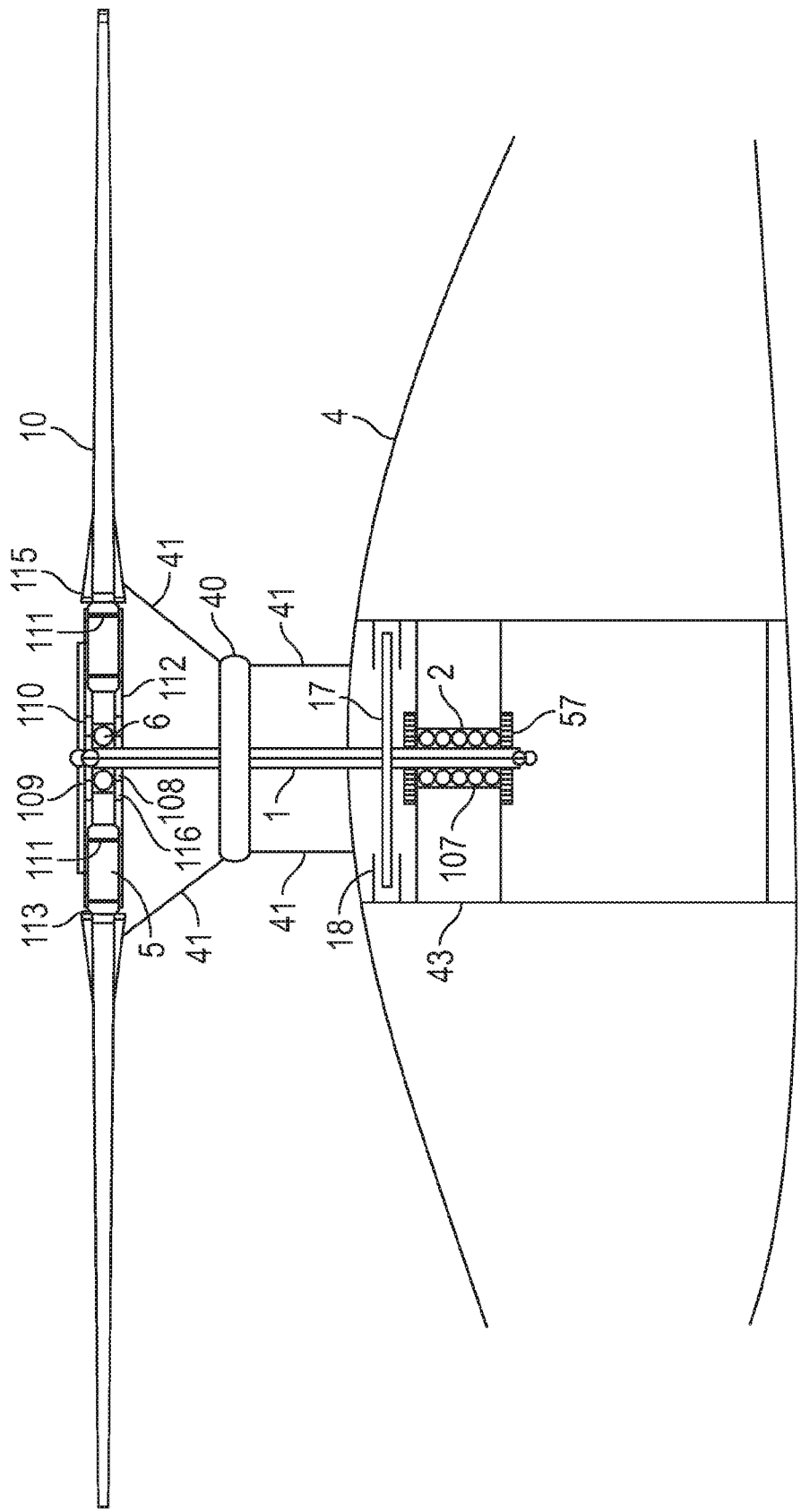
FIG. 64 is a schematic side cross sectional view of another embodiment of an aircraft including a propulsion system consistent with the present disclosure, wherein the propulsion system includes a thrust support structure configured to function as a rotor blade of the aircraft and includes one or more articulating nozzles.

FIG. 64 depicts another embodiment of a propulsion system including a thrust support structure that functions as a rotor blade, consistent with the present disclosure. The nature and function of many of the components of FIG. 64 are described above in connection with FIG. 60, and so are not represented in the interest of brevity. Unlike the embodiment of FIG. 60, however, the embodiment of FIG. 64 lacks a separate rotor blade 3, and instead utilizes ducting 10 (or, more generally, thrust support structure 7) as a rotor blade. The embodiments of FIGS. 63 and 64 also differ from the embodiment of FIGS. 61 and 62, in that they include a clutch 6. Illustration of the use of clutch 6 is provided in the interest of demonstrating its use in the context of a thrust support structure that functions as a rotor blade, but is not required as shown in FIGS. 61 and 62.

Another embodiment of a propulsion system consistent with the present disclosure includes one or more thrust support structures that each act as a rotor blade, wherein air flow from one or more fuselage mounted engines is redirected through a rotor shaft and through a duct inside one or more of the rotor blades. Such a system may be used with or without a thrust support structure that includes one or more engine(s) that is/are coupled to the ducting, as shown in FIGS. 63, 64 and described above. In any case, one or more thrust diverter(s) may be located in the exhaust stream of the fuselage mounted engine(s), and is/are configured to control the flow of an airflow generated thereby. More specifically, the thrust diverter(s) is/are configured to control an amount of the air flow generated by the fuselage mounted engine(s) that is/are directed (channeled) into a rotor shaft and distributed into ducting inside one or more rotor blades.

During vertical flight all or a significant portion of the airflow generated by the fuselage mounted engine(s) may be channeled by the thrust diverter(s) into the rotor shaft, and then directed (e.g., by plenums) into one or more rotor blades. The air flow so directed may exit the rotor blades via openings proximate the extremities thereof, to accelerate or decelerate rotation of the rotor blades and generate a desired amount of lift. During forward flight the thrust diverter(s) may be actuated to allow a substantial amount of air flow to exit directly aft of the thrust diverter(s) (i.e., without being diverted into the rotor shaft), increasing the velocity of the aircraft. Notably, during forward flight less rotor power is needed for lift and the majority of the engine(s) thrust may be utilized for forward propulsion.

Figure 65A:
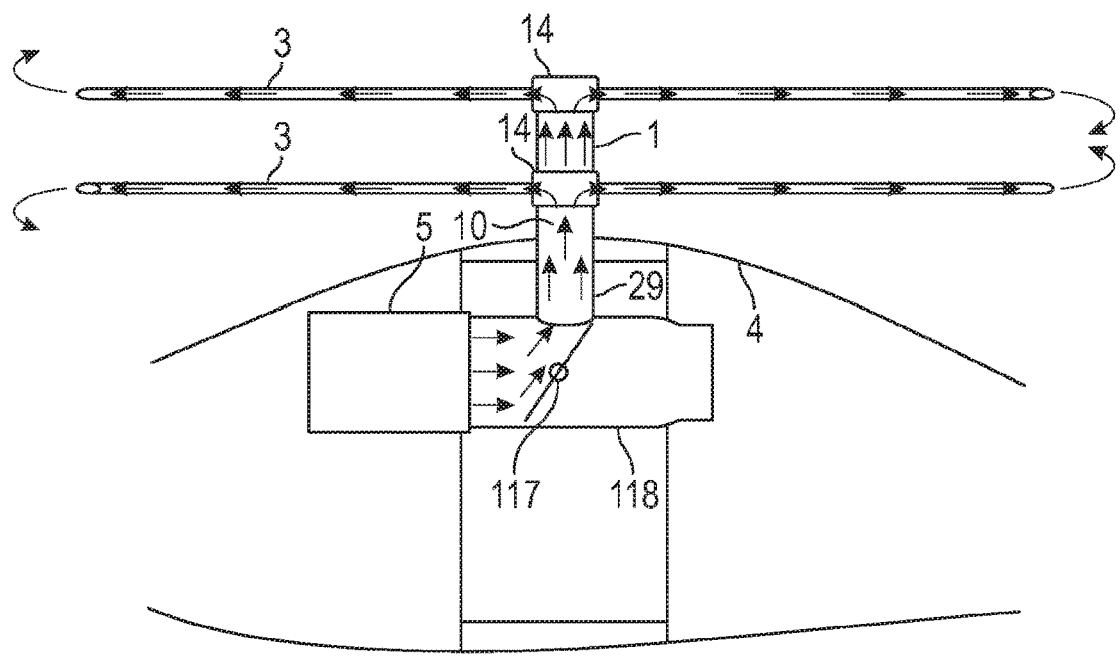
FIG. 65A is a schematic side cross sectional view of another embodiment of an aircraft including a propulsion system consistent with the present disclosure, wherein airflow from one or more fuselage mounted engines is channeled to ducting within a pair of counter rotating rotor blades.
Figure 65B:
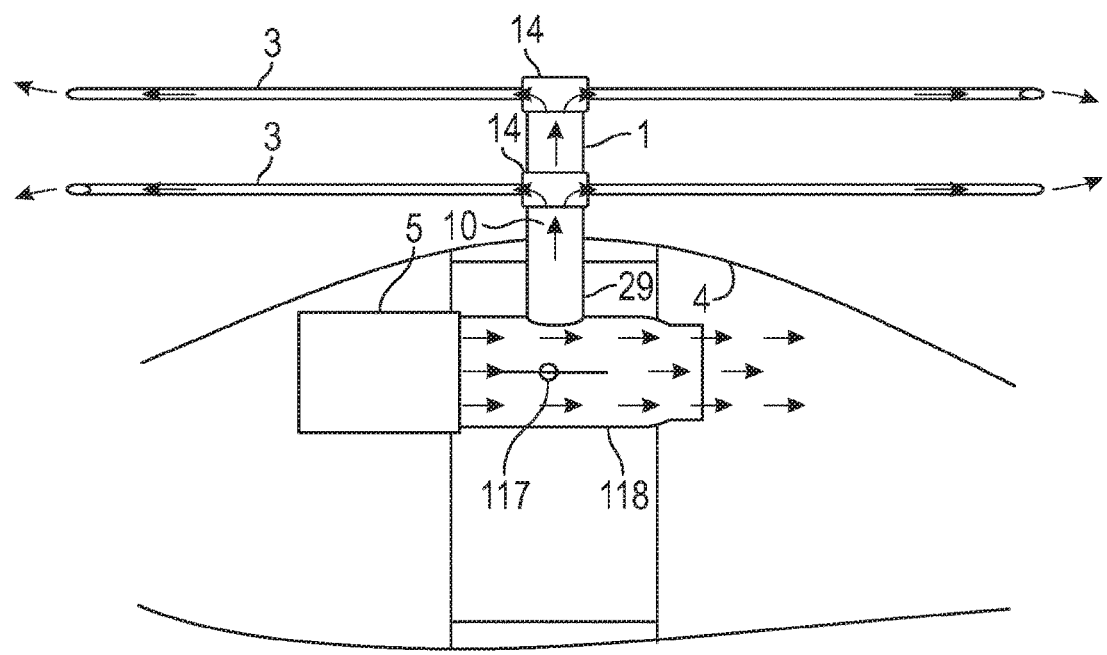
FIG. 65B is a schematic side cross sectional view of another embodiment of an aircraft including a propulsion system consistent with the present disclosure, wherein part of the airflow from one or more fuselage mounted engines is directed towards an aft of the aircraft.

To illustrate this concept reference is made to FIGS. 65A and 65B, which depict one example of aircraft propulsion system consistent with the present disclosure, wherein all or a portion of airflow from one or more fuselage mounted engines is channeled to ducting within a pair of counter rotating rotor blades. Such a system may be referred to herein as a reaction drive system. In the embodiment of FIGS. 65A and 65B, engine(s) 5 can be either embedded or attached externally to the aircraft fuselage 4. In either case thrust diverter(s) 117 may be located downstream of the engine(s) 5 and within a diverter manifold 118. Generally, thrust diverter(s) 117 is/are configured to redirect airflow generated by the engine(s) 5. The position of thrust diverter(s) 117 may impact the relative amount of airflow generated by the engine(s) 5 that is directed to the rotor blades 3 to produce lift, and/or which is directed past the diverters 117 to provide propulsion. The relative amount of airflow that is directed to or past rotor blades 3 may directly impact the flight characteristics of the aircraft, including vertical lift generation, forward speed, or a combination thereof.

In such embodiments, air flow ducting 29 within the fuselage is configured to allow air to be diverted into the rotor shaft 1. Air flow entering rotor shaft 1 is conveyed to plenums 14, and is then distributed by plenums 14 into ducting within the rotor blades 3. In embodiments, plenums 14 are configured to evenly distributed such air flow. Such a configuration is not required, however, and plenums 14 may be individually controllable to allow for more granular control over the distribution of airflow to individual rotor blades. Air flow entering the rotor blades 3 may exit the rotor blades 3 near the extremities, producing thrust to rotate rotor blades 3 as discussed above. When the aircraft is engaged in vertical flight, the system may be configured as shown in FIG. 65(A), where a bulk of the airflow from engine(s) 5 is directed to rotor blades 3 to generate vertical lift. When the aircraft transitions to forward flight, the thrust diverter(s) 117 may be actuated to decrease the amount of airflow that is directed to rotor blades 3 and to increase the amount of airflow that is directed aft of the aircraft, as shown in the example of FIG. 65(B). Put differently, as the aircraft transitions to forward flight the amount of airflow directed aft may increase as the amount of airflow directed to rotor blades 3 decreases. In such instances, the amount of airflow directed to rotor blades 3 may be adjusted (by actuation of thrust diverter(s) 117) to maintain lift, stability and control of the aircraft.

Figure 66:
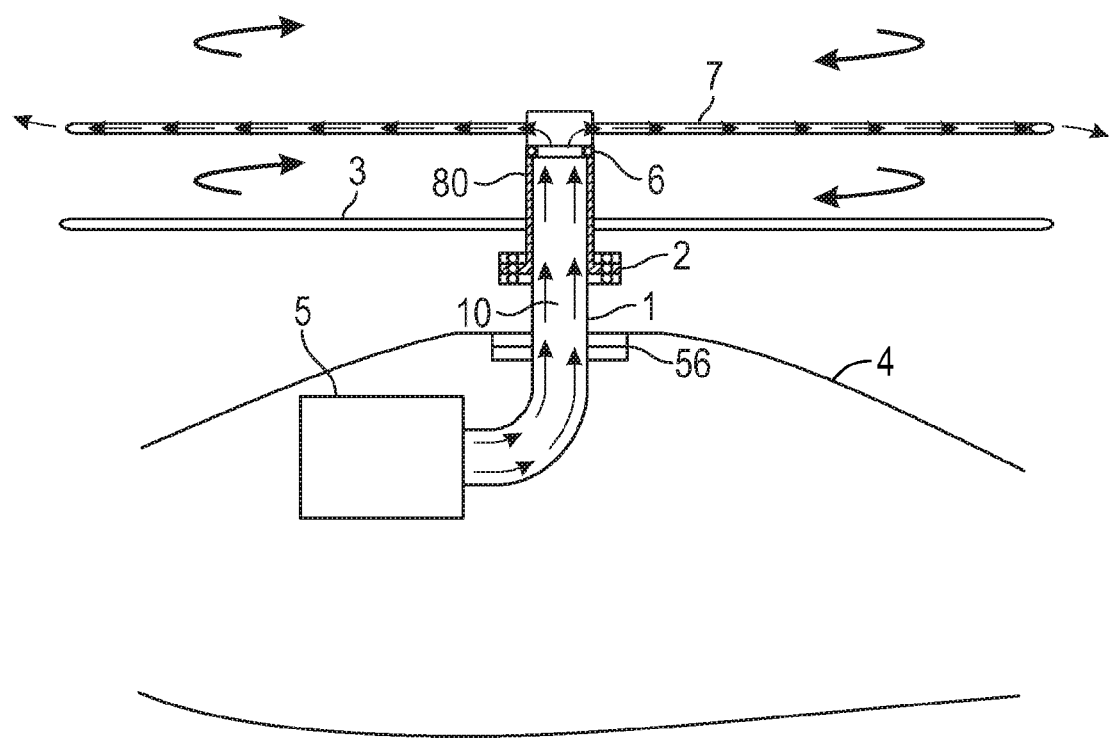
FIG. 66 is a schematic side cross sectional view of another embodiment of an aircraft consistent with the present disclosure.

FIG. 66 illustrates another embodiment of an aircraft consistent with the present disclosure. Similar to the aircraft of FIGS. 65A and 65B, the aircraft of FIG. 66 utilizes air flow from an engine to cause a thrust support structure (and consequently, one or more rotor blades) to rotate. For example in the embodiment of FIG. 66, a stationary (i.e. non-rotating) rotor shaft 1 is coupled at proximal end to one or more engine(s) 5, and includes one or more channels (shaft duct(s)) for receiving an air flow. A clutch 6 (e.g., a sealed clutch) coupled the rotor shaft 1 near the distal end thereof. An outer shaft 80 is disposed around the rotor shaft 1, and is positioned between the clutch 6 and the proximal end of rotor shaft 1.

In an engaged state the clutch 6 couples to outer shaft 80, whereas in a disengaged state the clutch 6 is decoupled from outer shaft 80. As further shown, a thrust support structure 7 is coupled to the rotor shaft 1 via the clutch 6. Like rotor shaft 1, thrust support structure 7 in this embodiment includes at least one channel (thrust duct) for receiving an air flow. In addition, thrust support structure includes at least one outlet (thrust outlet, not labeled) for directing the airflow at an angle (e.g., a perpendicular angle) relative to clutch 6 and/or an upward extending part of rotor shaft 1. Clutch 6 can be any suitable clutch that can releasably engage (and disengage) the outer shaft 80, such as but not limited to the clutch shown and described above in connection with FIGS. 19 and 20. Of course, other clutch types and structures may also be used.

For the sake of ease of understanding, operation of the aircraft of FIG. 66 will now be described, where clutch 6 has the same or similar structure as the clutch shown and described above in connection with FIGS. 19 and 20. In such instances, operation of engine(s) 5 generates an airflow (denoted by arrows) that is directed into an inlet opening within rotor shaft 1. The airflow passing through the inlet opening flows into the one or more rotor ducts in rotor shaft 1 toward a distal end thereof. Proximate the distal end of rotor shaft 1, at least a portion of the airflow flows from the rotor duct(s) into one or more inlet openings within thrust support structure 7. In the illustrated embodiment, thrust support structure 7 includes at least two inlet openings, each leading to a corresponding thrust channel within opposing sides of thereof.

Airflow passing through the inlet openings flows into a corresponding thrust channel toward the distal end of each side of thrust support structure 7. Airflow within the thrust channel(s) eventually exits the thrust support structure 7 via one or more outlet openings, as shown. In the illustrated embodiment the thrust support structure 7 includes a single outlet opening at each of its two distal ends, but it should be understood that any suitable number (e.g., 2, 3, 4, 5, 10, etc.) of outlet openings may be used, and that such openings may be positioned at any suitable location or combination of locations along the length of thrust support structure 7. Moreover, thrust support structure 7 is not limited to two distal ends, and may include any suitable number (e.g., 3, 4, 5, 10, etc.) of distal ends.

In any case, the outlet opening(s) may be configured to direct the airflow such that it exits thrust support structure 7 at a desired exit angle. In embodiments the outlet openings are configured to direct the airflow such that the exit angle is perpendicular or substantially perpendicular to clutch 6 and/or an upward extending portion of rotor shaft 1. Alternatively or additionally, in embodiments the outlet openings are configured such that air flow exits thrust support structure 7 at an angle ranging from greater than 0 to 180 degrees, such as from greater than 0 to 120 degrees, or even greater than 0 to 90 degrees, relative to clutch 6 and/or an upward extending position of rotor shaft 1. In embodiments the exit angle may be fixed, whereas in other embodiments the exit angle may be variable. In the latter instance, the exit openings may be in the form of or include articulating nozzles that may be moved such that the airflow exits thrust support structure 7 at a desired angle, as previously described in connection with FIGS. 51, 56, 62, 63.

In any case, airflow through the at least one outlet opening causes thrust support structure 7 to rotate, as illustrated by the curved arrows in FIG. 66. Torque generated by the rotation of thrust support structure 7 is conveyed to clutch 6, and causes clutch 6 to engage with outer shaft 80. For example, torque imparted to clutch 6 may cause clutch movable bearings 52 to ride along a ramp of the clutch outer case until the clutch movable bearings 52 are engaged with the surface of the ramp and a surface of a clutch inner race 114 (which is coupled to outer shaft 80, similar to the engagement of the inner race 114 with rotor shaft 1 in the context of previous embodiments—see FIGS. 19 and 20). When the clutch 6 is so engaged, torque imparted by rotation of the thrust support structure 7 is conveyed via clutch 6 (or, more specifically, via inner race 114) to outer shaft 80, causing outer outer shaft 80 to rotate as shown in FIG. 66. Rotation of the outer shaft 80 in turn causes rotor blade 3 to rotate. A support bearing 2 functions to isolate torque generated by rotation of rotor blade 3 and outer shaft 80 from fuselage 4, as described above in connection with other embodiments.

When rotational momentum of clutch 6 (or, more specifically outer case 58) is absent or diminished, clutch outer case 58 starts to decelerate in its relation to outer shaft 80. Clutch movable bearings 52, because of their momentum and centrifugal force move away from and loosen their grip on clutch inner race 114 (which again, is attached to outer shaft 80), thus decoupling outer shaft 80 from clutch outer case 58 and allowing outer shaft 80 to rotate freely in relation to clutch 6. Also, when the outer shaft 80 speed is greater than the rotational speed of clutch 6, clutch 6 is disengaged from outer shaft 80. The disengaged condition of clutch 6 allows outer shaft 80 to rotate freely and allow auto rotation without any induced drag from the thrust support structure 7 and the power system. Also during auto rotation any time the speed of outer shaft 80 is equal to or less than the rotational speed of clutch 6, the stored inertia of the power system will be transferred to outer shaft 80. In that condition, the transfer of power system inertia can provide more time for lowering the collective pitch to a safe angle needed for auto rotation of the aircraft.

Examples

The following examples are additional non-limiting embodiments of the present disclosure.

Example 1: According to this example there is provided an aircraft including: a fuselage; a support bearing coupled to the fuselage; a rotor shaft attached to the fuselage by the support bearing, wherein the rotor shaft can rotate about a first axis extending through the rotor shaft, and the support bearing always allows the rotor shaft to rotate about the first axis and relative to the fuselage; a rotor blade coupled to the rotor shaft, such that rotation of the rotor shaft causes the rotor blade to rotate about the first axis; a thrust support structure coupled to the rotor shaft; and an engine coupled to the fuselage or the thrust support structure; wherein in operation: the engine causes the thrust support structure to rotate about the first axis; rotation of the thrust support structure causes the rotor shaft to rotate about the first axis, which in turn causes the rotor blade to rotate about the first axis; and the support bearing isolates the fuselage from torque generated by rotation of at least the rotor blade.

Example 2: This example includes any or all the features of example 1, and further includes a clutch coupled to the rotor shaft or a rotor hub coupled to the rotor shaft, the clutch having an engaged state and a disengaged state.

Example 3: This example includes any or all the features of example 2, wherein in operation, the engine causes the thrust support structure to rotate about the first axis at a first rotational speed that is greater than or equal to a second rotational speed of the rotor shaft, and causes the clutch to enter the engaged state and grip the rotor shaft.

Example 4: This example includes any or all the features of example 3, wherein when the first rotational speed is less than the second rotational speed, the clutch enters or is in the disengaged state.

Example 5: This example includes any or all the features of example 2, wherein: the clutch includes a clutch outer case, a clutch inner race coupled to the rotor shaft, and a clutch movable bearing; the clutch outer case includes a ramp and a cavity; in the engaged state, the clutch movable bearing is disposed between and contacts both the ramp and the clutch inner race, thereby engaging the clutch outer case and the clutch inner race; and in the disengaged state, the clutch movable bearing is disposed in the cavity and is only in contact with the clutch outer case.

Example 6: This example includes any or all the features of example 2, wherein the clutch is coupled to the rotor shaft.

Example 7: This example includes any or all the features of example 2, wherein the clutch is coupled to the rotor hub.

Example 8: This example includes any or all the features of any of examples 1 to 7, wherein: the support bearing includes a bearing housing having an inner and outer race cage, and at least one bearing between the inner and outer race cage; and the rotor shaft extends into the fuselage and into the support bearing.

Example 9: This example includes any or all the features of example 8, further including a bearing support structure, wherein the support bearing is coupled to the bearing support structure and the bearing support structure is coupled to the fuselage.

Example 10: This example includes any or all the features of 9, wherein the rotor shaft is coupled to the fuselage only by the support bearing and the bearing support structure.

Example 11: This example includes any or all the features of any of examples 1 to 10, wherein the engine is coupled to the thrust support structure.

Example 12: This example includes any or all the features of example 11, wherein: the thrust support structure includes a proximal portion coupled to the rotor shaft, and a distal portion coupled to the engine.

Example 13: This example includes any or all the features of any one of examples 1 to 12, wherein thrust in the form of air flow generated by the engine is directed generally along a thrust line extending horizontally above the rotor blade, below the rotor blade, or above and below the rotor blade.

Example 14: This example includes any or all the features of example 13, wherein the air flow disrupts the formation of vortices above the rotor blade.

Example 15: This example includes any or all the features of any one of examples 1 to 14, and further includes a yaw control device.

Example 16: This example includes any or all the features of example 15, wherein: the yaw control device includes an electrically reversible motor including a motor shaft; and the motor shaft is the rotor shaft.

Example 17: This example includes any or all the features of example 16, wherein the yaw control device includes a rotor and a stator, wherein when the stator is energized, a force is applied to the rotor magnets, which in turn imparts a force to the fuselage that causes the fuselage to rotate around the first axis.

Example 18: This example includes any or all the features of example 17, wherein: the yaw control device includes a spacer that is coupled to the rotor shaft; the rotor magnets are coupled to the spacer; and the stator is coupled to the fuselage.

Example 19: This example includes any or all the features of example 15, wherein the yaw control device includes a rudder.

Example 20: This example includes any or all the features of example 16, wherein the aircraft lacks a tail.

Example 21: This example includes any or all the features of any one of examples 1 to 20, wherein the rotor shaft is movable between a first position and a second position relative to the fuselage.

Example 22: This example includes any or all the features of example 21, wherein an angle is defined between the rotor shaft in the first position and the rotor shaft in the second position, the angle being less than or equal to about 90 degrees.

Example 23: This example includes any or all the features of example 21, and further includes a pivot coupled to the fuselage, wherein: the rotor shaft is coupled to the pivot; the pivot is rotatable about a second axis; and rotation of the pivot about the second axis causes the rotor shaft to move between the first position and the second position.

Example 24: This example includes any or all the features of example 23, wherein: an angle is defined by the rotor shaft in the first position and the rotor shaft in the second position, relative to the pivot; and the angle is less than or equal to about 90 degrees.

Example 25: This example includes any or all the features of example 21, and further includes: a frame rail guide coupled to the exterior of the fuselage; and a rotor system cart housing coupled to the frame rail guide; wherein: the rotor shaft is coupled to the rotor system cart housing; and the rotor system cart housing is configured to move along the frame rail guide, so as to cause the rotor shaft to move from the first position to the second position, and vice versa.

Example 26: This example includes any or all the features of example 2, wherein: the fuselage defines an interior volume and includes at least one fuselage structural member; and the aircraft further includes a dampening element between the support bearing and the fuselage structural member.

Example 27: This example includes any or all the features of example 26, wherein the dampening element is an active dampening element or a passive dampening element.

Example 28: This example includes any or all the features of example 27, wherein the dampening element is a passive dampening element, the passive dampening element being a gas shock absorber, liquid shock absorber, mechanical shock absorber, or a combination thereof.

Example 29: This example includes any or all the features of example 28, wherein the dampening element includes a gas strut, a liquid strut, a dampening spring, an elastic substance, or a combination thereof.

Example 30: This example includes any or all the features of example 27, wherein the dampening element is an active dampening element.

Example 31: This example includes any or all the features of example 30, wherein the active dampening element is configured to match or offset a harmonic frequency or vibration produced by the rotor blade, the thrust support structure, or a combination thereof.

Example 32: This example includes any or all the features of any one of examples 1 to 31, wherein the rotor blade has a fixed length or a variable length.

Example 33: This example includes any or all the features of example 32, wherein the rotor blade has a variable length.

Example 34: This example includes any or all the features of example 32, and further includes a blade grip including a motor, wherein: the blade grip is coupled to the rotor blade; and operation of the motor causes the rotor blade to change in length.

Example 35: This example includes any or all the features of any one of examples 1 to 34, wherein: the thrust support structure includes at least one duct and a distal end including an opening, wherein the at least one duct is to receive a thrust air flow generated by the engine and convey the airflow to the opening.

Example 36: This example includes any or all the features of example 35, wherein: the thrust air flow has a first temperature T1; the engine is further configured to produce a compressor bleed air flow having a second temperature T2, wherein T2 is less than T1; and the at least one duct is further configured to receive the compressor bleed air flow, such that in operation, the compressor bleed air flow is injected into the thrust air flow to produce a mixed airflow with a temperature T3, wherein T2 is less than T1.

Example 37: This example includes any or all the features of example 35, wherein: the thrust air flow has a first temperature T1; the engine is further configured to produce a compressor bleed air flow having a second temperature T2, wherein T2 is less than T1; and the at least one duct is further configured to receive the compressor bleed air flow, such that in operation, the compressor bleed air flow is directed around the thrust air flow.

Example 38: This example includes any or all the features of any one of examples 1 to 37, wherein the thrust support structure has an airfoil shape.

Example 39: This example includes any or all the features of any one of examples 1 to 38, and further includes an airfoil shaped fairing disposed around the thrust support structure.

Example 40: This example includes any or all the features of example 39, further including a fairing positioning motor coupled to the airfoil shaped fairing, wherein the fairing positioning motor is operable to change an orientation of the airfoil shaped fairing.

Example 41: This example includes any or all the features of example 1, wherein: the thrust support structure includes a distal end including a first opening, and at least one duct; the engine is coupled to or integrated into the thrust support structure; and in operation, an airflow generated by the engine is directed through the at least one duct and through the first opening in the thrust support structure.

Example 42: This example includes any or all the features of example 41, and further includes a nozzle in fluid communication with the first opening, wherein the nozzle is configured to receive and redirect the airflow passing through the first opening.

Example 43: This example includes any or all the features of example 42, wherein: the nozzle includes an outlet; airflow passing through the first opening flows through the nozzle and through the outlet; the nozzle is configured to articulate between at least a first nozzle position and a second nozzle position, wherein an orientation of the outlet in the first nozzle position is different than the orientation of the outlet in the second nozzle position.

Example 44: This example includes any or all the features of example 43, and further includes a drive motor coupled to the nozzle, the drive motor operable to articulate the nozzle between at least the first nozzle position and the second nozzle position.

Example 45: This example includes any or all the features of any one of examples 1 to 44, wherein: the rotor shaft includes a first shaft and a second shaft, wherein the first shaft is disposed within a lumen of the second shaft; the thrust support structure is coupled to the first shaft; and the aircraft further includes a clutch having an engaged state in which the second shaft is coupled to the first shaft, and a disengaged state in which the second shaft is decoupled from the first shaft; in operation, rotation of the thrust support structure about the first axis causes the clutch to enter the engaged state, which in turn causes the second shaft and the rotor blade to rotate about the first axis.

Example 46: This example includes any or all the features of example 45, wherein: the aircraft includes a first rotor blade coupled to the second shaft and a second rotor blade coupled to the second shaft above the first rotor blade, each of the first and second rotor blades configured to rotate about the first axis; in operation, rotation of the thrust support structure about the first axis causes the clutch to enter the engaged state, which in turn causes the second shaft and the first and second rotor blades to rotate about the first axis.

Example 47: This example includes any or all the features of example 45, and further includes a third shaft, wherein the second shaft is disposed within a lumen of the third shaft; the third shaft is coupled to the fuselage and does not rotate; and at least one concentric bearing is disposed between the second shaft and the third shaft, isolating the second shaft from the third shaft.

Example 48: This example includes any or all the features of any one of examples 1 to 47, and further includes a thruster to provide horizontal thrust during flight of the aircraft.

Example 49: This example includes any or all the features of example 48, wherein the thruster includes a second rotor blade that is configured to rotate about a second axis that is transverse to the first axis.

Example 50: This example includes any or all the features of example 45, and further includes further including a thruster to provide horizontal thrust during flight of the aircraft.

Example 51: This example includes any or all the features of example 50, wherein the thruster includes third rotor blade that is configured to rotated about a second axis that is transverse to the first axis.

Example 52: This example includes any or all the features of any one of examples 1 to 51, wherein the thrust support structure is coupled to the rotor shaft above or below the rotor blade.

Example 53: This example includes any or all the features of any one of examples 1 to 52, wherein the thrust support structure and rotor blade are coupled to the rotor shaft and are disposed in substantially the same plane.

Example 54: This example includes any or all the features of example 53, and further includes a common structural hub coupled to the rotor shaft, wherein the thrust support structure and the rotor blade are coupled to the rotor shaft and are disposed in substantially the same plane.

Example 55: This example includes any or all the features of example 54, wherein: the common structural hub is coupled to a distal end of the rotor shaft; and a proximal end of the rotor shaft is disposed within the fuselage.

Example 56: This example includes any or all the features of any one of examples 1 to 55, wherein the engine includes a fan that is coupled to a distal end of the thrust support structure.

Example 57: According to this example there is provided an aircraft including: a fuselage; a rotor shaft; a rotor hub coupled to the rotor shaft; and an engine coupled to the rotor hub; and a thrust support structure coupled to a distal end of the engine; wherein: the thrust support structure is configured to function as a rotor blade of the aircraft; the thrust support structure includes ducting having a proximal end, a distal end, and at least one channel; the at least one channel is fluidly coupled to the engine such that in operation, thrust generated by the engine is received and redirected by the channel, causing the thrust support structure to rotate.

Example 58: This example includes any or all the features of example 57, wherein the aircraft lacks a rotor blade other than the thrust support structure.

Example 59: This example includes any or all the features of example 57, and further includes a support bearing coupled to the fuselage, wherein the support bearing isolates the fuselage from torque generated by rotation of at least the thrust support structure.

Example 60: According to this example there is provided an aircraft including: a fuselage; an engine mounted to the fuselage; a diverter manifold coupled to the engine; a thrust diverter disposed in the diverter manifold; and a rotor shaft coupled to the engine, the rotor shaft including a shaft duct in fluid communication the diverter manifold; wherein in operation: the engine generates an airflow that is directed into the diverter manifold; and the thrust diverter is configured to control a relative amount of the airflow within the diverter manifold that is directed to the shaft duct.

Example 61: This example includes any or all the features of example 60, and further includes: a plenum coupled to the rotor shaft and in fluid communication with the shaft duct; and a rotor blade coupled to the plenum, the rotor blade including a blade duct in fluid communication with the plenum, the rotor blade further including an opening; wherein the plenum is configured to direct at least a portion of the airflow directed to the rotor duct to the blade duct, such that all or a portion of the airflow exits the opening.

Example 62: This example includes any or all the features of example 60, wherein: the engine is disposed on or within the fuselage.

Example 63: This example includes any or all the features of example 61, and further includes a support bearing coupled to the fuselage, wherein the support bearing isolates the fuselage from torque generated by rotation of at least the rotor blade.

Example 64: According to this example there is provided an aircraft including: a fuselage; an engine; a stationary rotor shaft coupled to the fuselage, the stationary rotor shaft including a proximal end, a distal end, and shaft duct extending from the proximal end to the distal end, wherein the shaft duct is in fluid communication with the engine; a thrust support structure coupled to the stationary rotor shaft, the thrust support structure including an inlet opening in fluid communication with the rotor duct, an outlet opening, and a thrust duct in fluid communication with the inlet opening and the outlet opening; a rotatable outer shaft disposed around at least a portion of the distal end of the rotor shaft; and a clutch coupled to the stationary rotor shaft, the clutch having an engaged state and a disengaged state; wherein in operation: airflow from engines 5 is directed through the rotor duct, through the inlet opening, through the thrust duct, and through the outlet opening, thereby causing the thrust support structure to rotate; and rotation of the thrust support structure causes the clutch to enter the engaged state in which it is coupled to the outer shaft, such that torque generated by rotation of the thrust support structure is conveyed to the outer shaft, causing the outer shaft and the rotor blade to rotate.

Example 65: This example includes any or all the features of example 64, and further includes a support bearing coupled to the stationary rotor shaft and the outer shaft, the support bearing to isolate at least the fuselage from torque generated by rotation of the outer shaft and the rotor blade.

Example 66: This example includes any or all the features of example 64, wherein in operation, the engine causes the thrust support structure to rotate about a first axis at a first rotational speed that is greater than or equal to a second rotational speed of the outer shaft, causing the clutch to enter the engaged state and grip the outer shaft.

Example 67: This example includes any or all the features of example 66, wherein when the first rotational speed is less than the second rotational speed, the clutch enters or is in the disengaged state.

Example 68: This example includes any or all the features of example 64, wherein: the clutch includes a clutch outer case, a clutch inner race coupled to the outer shaft, and a clutch movable bearing; the clutch outer case includes a ramp and a cavity; in the engaged state, the clutch movable bearing is disposed between and contacts both the ramp and the clutch inner race, thereby engaging the clutch outer case and the clutch inner race; and in the disengaged state, the clutch movable bearing is disposed in the cavity and is only in contact with the clutch outer case.

Example 69: This example includes any or all the features of any one of examples 1 to 67, wherein the aircraft does not include a counter-torque mechanism.

While the principles of the present disclosure have been described herein, it is to be understood by those skilled in the art that this description is made only by way of example and not as a limitation as to the scope of the claimed invention. The features and aspects described with reference to particular embodiments disclosed herein are susceptible to combination and/or application with various other embodiments described herein. Such combinations and/or applications of such described features and aspects to such other embodiments are contemplated herein. Modifications and other embodiments are contemplated herein and are within the scope of the present disclosure.

What is claimed is:

1. An aircraft comprising:
a fuselage;
a support bearing coupled to the fuselage;
a rotor shaft attached to the fuselage by the support bearing, wherein the rotor shaft can rotate about a first axis extending through the rotor shaft, and the support bearing always allows the rotor shaft to rotate about said first axis and relative to the fuselage;
a rotor blade coupled to the rotor shaft, such that rotation of the rotor shaft causes the rotor blade to rotate about said first axis;
a thrust support structure coupled to the rotor shaft; and
an engine coupled to the thrust support structure, the engine configured to receive fuel and combust the fuel to generate a thrust air flow,
wherein the thrust support structure further comprises at least one duct and a distal end comprising an opening, the at least one duct is configured to receive the thrust air flow generated by the engine and convey the thrust air flow to the opening, wherein the opening is configured to receive and redirect the thrust air flow passing through the first opening to the atmosphere to cause the thrust support structure to rotate about said first axis;
wherein in operation:
rotation of the thrust support structure causes the rotor shaft to rotate about said first axis, which in turn causes the rotor blade to rotate about said first axis; and
the support bearing isolates the fuselage from torque generated by rotation of at least the rotor blade.

2. The aircraft of claim 1, further comprising a clutch coupled to the rotor shaft or a rotor hub coupled to the rotor shaft, the clutch having an engaged state and a disengaged state.

3. An aircraft comprising:
a fuselage;
a support bearing coupled to the fuselage;
a rotor shaft attached to the fuselage by the support bearing, wherein the rotor shaft can rotate about a first axis extending through the rotor shaft, and the support bearing always allows the rotor shaft to rotate about said first axis and relative to the fuselage;
a rotor blade coupled to the rotor shaft, such that rotation of the rotor shaft causes the rotor blade to rotate about said first axis;
a thrust support structure coupled to the rotor shaft;
an engine coupled to the fuselage or the thrust support structure; and
a clutch coupled to the rotor shaft or a rotor hub coupled to the rotor shaft, the clutch having an engaged state and a disengaged state;
wherein in operation:
the engine causes the thrust support structure to rotate about the first axis at a first rotational speed that is greater than or equal to a second rotational speed of the rotor shaft, and causes the clutch to enter the engaged state and grip said rotor shaft; and when the first rotational speed is less than the second rotational speed, the clutch enters or is in the disengaged state;
rotation of the thrust support structure causes the rotor shaft to rotate about said first axis, which in turn causes the rotor blade to rotate about said first axis; and
the support bearing isolates the fuselage from torque generated by rotation of at least the rotor blade.

4. An aircraft comprising:
a fuselage;
a support bearing coupled to the fuselage;
a rotor shaft attached to the fuselage by the support bearing, wherein the rotor shaft can rotate about a first axis extending through the rotor shaft, and the support bearing always allows the rotor shaft to rotate about said first axis and relative to the fuselage;
a rotor blade coupled to the rotor shaft, such that rotation of the rotor shaft causes the rotor blade to rotate about said first axis;
a thrust support structure coupled to the rotor shaft;
an engine coupled to the fuselage or the thrust support structure; and
a clutch coupled to the rotor shaft or a rotor hub coupled to the rotor shaft, the clutch having an engaged state and a disengaged state;
wherein the clutch comprises a clutch outer case, a clutch inner race coupled to the rotor shaft, and a clutch movable bearing;
the clutch outer case comprises a ramp and a cavity;
in the engaged state, the clutch movable bearing is disposed between and contacts both the ramp and the clutch inner race, thereby engaging the clutch outer case and the clutch inner race; and
in the disengaged state, the clutch movable bearing is disposed in the cavity and is only in contact with the clutch outer case.

5. The aircraft of claim 1, wherein:
the support bearing comprises a bearing housing having an inner and outer race cage, and at least one bearing between the inner and outer race cage; and
the rotor shaft extends into said fuselage and into said support bearing.

6. The aircraft of claim 5, further comprising a bearing support structure, wherein:
the support bearing is coupled to the bearing support structure and the bearing support structure is coupled to the fuselage; and
the rotor shaft is coupled to the fuselage only by the support bearing and the bearing support structure.

7. The aircraft of claim 1, wherein the engine is coupled to the thrust support structure, wherein the thrust support structure comprises a proximal portion coupled to the rotor shaft, and a distal portion coupled to said engine.

8. The aircraft of claim 1, wherein thrust in the form of air flow generated by said engine is directed generally along a thrust line extending horizontally above the rotor blade, below the rotor blade, or above and below the rotor blade.

9. The aircraft of claim 1, further comprising a yaw control device.

10. The aircraft of claim 9, wherein:
the yaw control device comprises an electrically reversible motor comprising a motor shaft; and
the motor shaft is the rotor shaft.

11. An aircraft comprising:
a fuselage;
a support bearing coupled to the fuselage;
a rotor shaft attached to the fuselage by the support bearing, wherein the rotor shaft can rotate about a first axis extending through the rotor shaft, and the support bearing always allows the rotor shaft to rotate about said first axis and relative to the fuselage;

a rotor blade coupled to the rotor shaft, such that rotation of the rotor shaft causes the rotor blade to rotate about said first axis;
a thrust support structure coupled to the rotor shaft;
an engine coupled to the fuselage or the thrust support structure; and
a yaw control device, the yaw control device comprising:
an electrically reversible motor comprising a motor shaft, wherein the motor shaft is the rotor shaft; and
a plurality of rotor magnets and a stator, wherein when the stator is energized, a force is applied to the plurality of rotor magnets, which in turn imparts a force to the fuselage that causes the fuselage to rotate around the first axis.

12. The aircraft of claim 11, wherein:
the yaw control device comprises a spacer that is coupled to the rotor shaft;
the rotor magnets are coupled to the spacer; and
the stator is coupled to the fuselage.

13. The aircraft of claim 1, wherein the rotor blade has a variable length.

14. The aircraft of claim 13, wherein the rotor blade has a variable length, and the aircraft further comprises a blade grip comprising a motor, wherein:
the blade grip is coupled to the rotor blade; and
operation of the motor causes the rotor blade to change in length.

15. The aircraft of claim 1, wherein:
the thrust air flow has a first temperature $T1$;
the engine is further configured to produce a compressor bleed air flow having a second temperature $T2$, wherein $T2$ is less than $T1$.

16. The aircraft of claim 15, wherein in operation:
the at least one duct is further configured to receive said compressor bleed air flow, such that in operation, the compressor bleed air flow is injected into the thrust air flow to produce a mixed airflow with a temperature $T3$; or
the at least one duct is further configured to receive said compressor bleed air flow, such that in operation, the compressor bleed air flow is directed around the thrust air flow.

17. The aircraft of claim 1, wherein the opening includes an articulating nozzle configured to receive and redirect the airflow passing through the first opening.

* * * * *